United States Patent
Lupton et al.

(10) Patent No.: US 7,909,155 B2
(45) Date of Patent: Mar. 22, 2011

(54) CONVEYOR SYSTEMS

(75) Inventors: Clinton R. Lupton, Caledonia, MI (US); Kenneth D. Kane, Grand Rapids, MI (US); Phillip C. Butler, Middleville, MI (US); Charles J. DeWildt, Wyoming, MI (US)

(73) Assignee: Dematic Corp., Grand Rapids, MI (US)

( * ) Notice: Subject to any disclaimer, the term of this patent is extended or adjusted under 35 U.S.C. 154(b) by 158 days.

(21) Appl. No.: 12/206,011

(22) Filed: Sep. 8, 2008

(65) Prior Publication Data

US 2009/0065330 A1 Mar. 12, 2009

Related U.S. Application Data

(60) Provisional application No. 60/981,534, filed on Oct. 22, 2007, provisional application No. 60/979,415, filed on Oct. 12, 2007, provisional application No. 60/978,573, filed on Oct. 9, 2007, provisional application No. 60/970,762, filed on Sep. 7, 2007.

(51) Int. Cl.
*B65G 47/46* (2006.01)
(52) U.S. Cl. ........................ 198/357; 198/448
(58) Field of Classification Search .................. 198/357, 198/358, 444, 448
See application file for complete search history.

(56) References Cited

U.S. PATENT DOCUMENTS

| | | | |
|---|---|---|---|
| 3,000,490 A | 9/1961 | Sebastian |
| 3,062,359 A | 11/1962 | Olk |
| 3,136,406 A | 6/1964 | Hidden |
| 3,170,561 A | 2/1965 | Schnieder |
| 3,338,382 A | 8/1967 | Fogg |
| 3,420,355 A | 1/1969 | De Good |
| 3,420,356 A | 1/1969 | De Good |
| 3,724,642 A | 4/1973 | De Good |
| 3,730,330 A | 5/1973 | De Good |
| 3,747,781 A | 7/1973 | Daigle et al. |
| 3,854,576 A | 12/1974 | Bowman |
| 3,934,707 A | 1/1976 | Bowman |

(Continued)

FOREIGN PATENT DOCUMENTS

WO WO9941169 8/1999

OTHER PUBLICATIONS

Current claims of commonly-assigned, common co-inventor published application US 2007/0129843 A1.

*Primary Examiner* — James R Bidwell
(74) *Attorney, Agent, or Firm* — Van Dyke, Gardner, Linn & Burkhart, LLP

(57) ABSTRACT

Systems and methods for accumulating articles on transport conveyors, for efficiently merging articles, and for automatically controlling sortation speed are disclosed. Transport conveyor beds upstream of an accumulation conveyor bed may be controlled to more densely pack articles, as well as to more timely deliver articles to the downstream subsystem when accumulation terminates. Slugs of articles in a merge subsystem may be released based on a prioritization scheme that heavily weighs the ability of the slug to attach to the next-most downstream slug. A combination of closed and open-looped control of the slug's movement may be used to accurately position slugs on the merge bed. A downstream sortation speed may be automatically adjusted based on the amount of merge traffic.

29 Claims, 22 Drawing Sheets

U.S. PATENT DOCUMENTS

| | | |
|---|---|---|
| 4,223,780 A | 9/1980 | Saur |
| 4,336,589 A | 6/1982 | Smith et al. |
| 4,361,224 A | 11/1982 | Bowman |
| 4,361,225 A | 11/1982 | Saur |
| 4,441,607 A | 4/1984 | Bowman et al. |
| 5,191,967 A | 3/1993 | Woltjer et al. |
| 5,358,097 A | 10/1994 | Bakkila et al. |
| 5,429,225 A | 7/1995 | Schiesser et al. |
| 5,540,323 A | 7/1996 | Schiesser et al. |
| 5,588,520 A * | 12/1996 | Affaticati et al. ........ 198/370.06 |
| 5,810,158 A | 9/1998 | Schiesser et al. |
| 6,513,641 B1 * | 2/2003 | Affaticati et al. ............. 198/357 |
| 6,808,058 B2 * | 10/2004 | Shiohara ....................... 198/357 |
| 6,918,484 B2 * | 7/2005 | Affaticati et al. ............. 198/357 |
| 6,923,307 B2 * | 8/2005 | Haan et al. .................. 198/347.4 |
| 6,951,274 B2 | 10/2005 | Zeitler et al. |
| 7,121,398 B2 | 10/2006 | Affaticati et al. |
| 7,128,197 B2 | 10/2006 | Haan et al. |
| 2006/0086590 A1 * | 4/2006 | Bonham et al. .......... 198/370.09 |
| 2007/0119690 A1 | 5/2007 | Lupton |
| 2007/0129843 A1 | 6/2007 | Lupton et al. |

\* cited by examiner

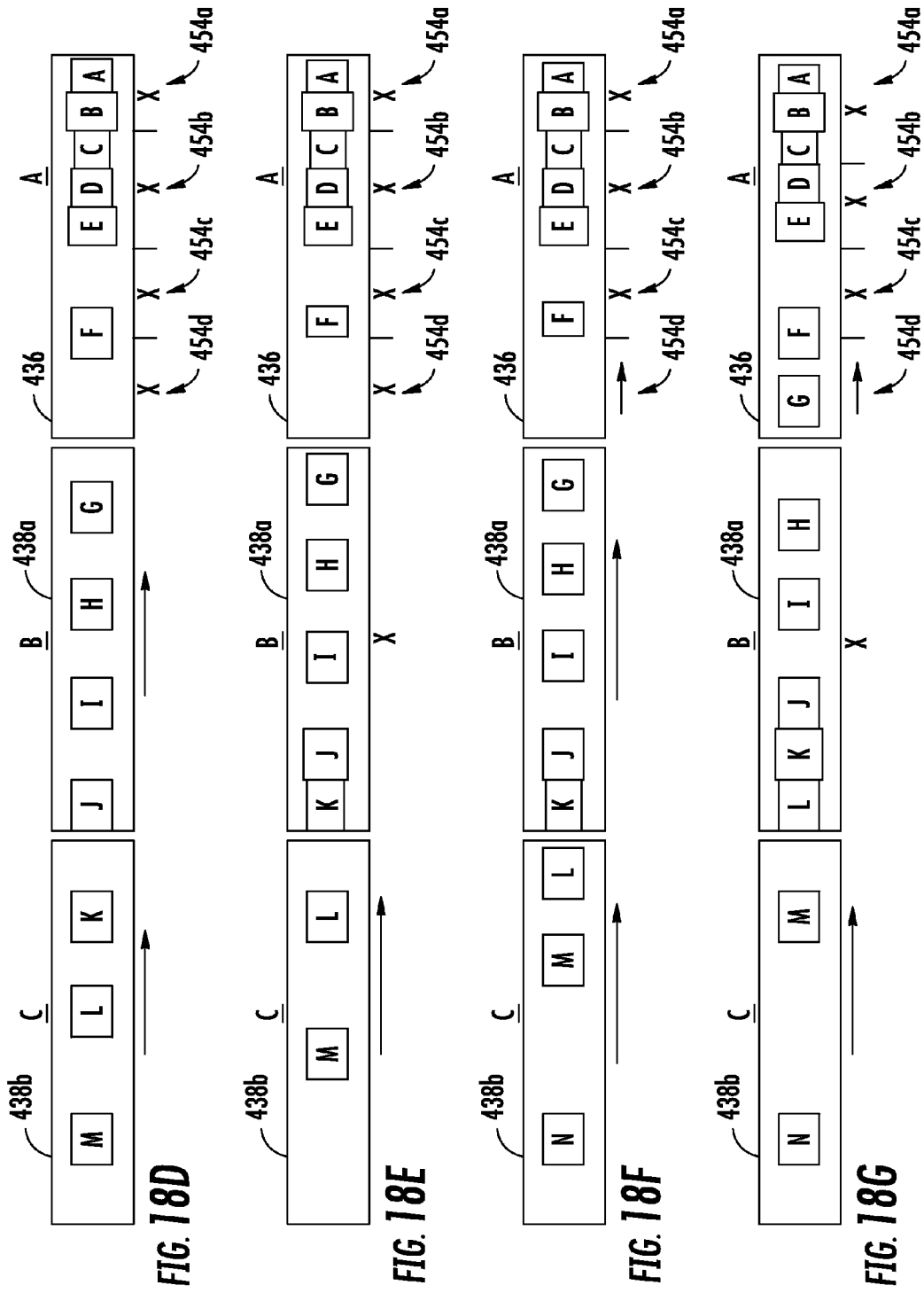

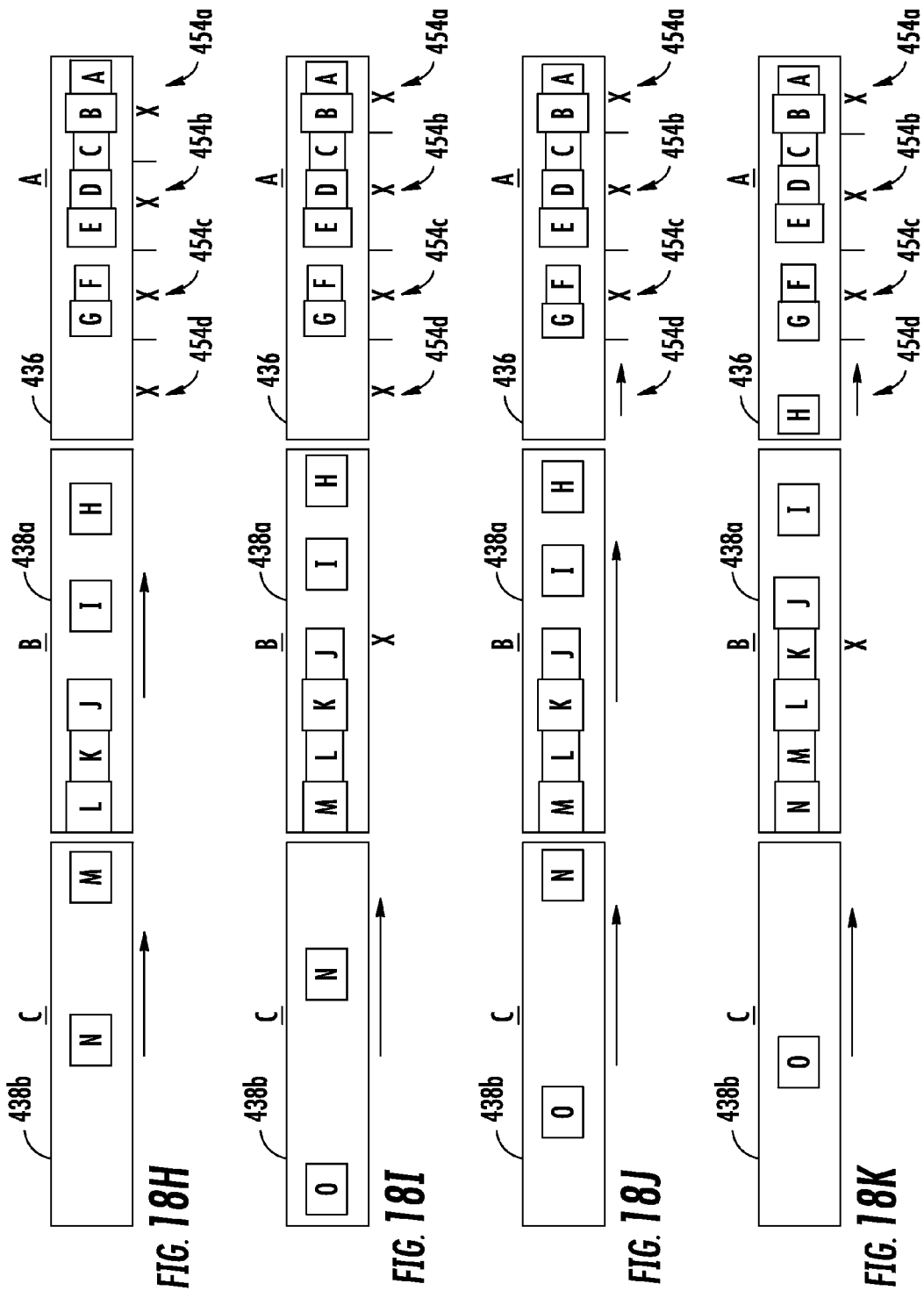

CONVEYOR SYSTEMS

CROSS-REFERENCE TO RELATED APPLICATION

This application claims priority to commonly assigned U.S. provisional application Ser. No. 60/970,762, filed Sep. 7, 2007, and entitled CONVEYOR SYSTEM INCLUDING ARTICLE MERGE AND SORTATION; U.S. provisional application Ser. No. 60/978,573, filed Oct. 9, 2007, and entitled CONVEYOR SYSTEM INCLUDING ARTICLE MERGE AND SORTATION; U.S. provisional application Ser. No. 60/979,415, filed Oct. 12, 2007, and entitled MERGE SUBSYSTEM AND METHOD FOR CONVEYOR SYSTEM; and U.S. provisional application Ser. No. 60/981,534, filed Oct. 22, 2007, and entitled CONVEYOR SYSTEM AND METHOD FOR ACCUMULATING ARTICLES; the complete disclosures of all of which are hereby incorporated in their entirety by reference herein.

BACKGROUND OF THE INVENTION

The present invention relates to conveyor systems, and more particularly to conveyor systems having a plurality of feed conveyors that release articles to a merge conveyor, wherein the articles are eventually delivered to a sortation conveyor.

Conveyor systems used for transporting articles throughout a warehouse, factory, or other business facility generally include a pick area, transport conveyors, a merge subsystem, and a sortation conveyor that sorts articles onto a plurality of takeaway conveyors that subsequently transport the articles to their intended destination within the facility. The pick area (or areas) generally refer to areas where articles are initially loaded onto the conveyor system, either manually or by machines. After the articles are loaded onto the conveyors in the pick area, they are often transported to an area of the facility where multiple lines of conveyors merge from the different pick areas of the facility. Typically, articles are accumulated upstream of this merge area so that the articles may be more efficiently merged onto one or more merge conveyors. Once the articles are merged, they are transported to one or more sortation conveyors where the articles are sorted according to their intended destination.

The various aspects of the present invention relate to the accumulation of articles, as well as the merging of the articles and the subsequent sortation of the articles.

SUMMARY OF THE INVENTION

In various embodiments, the present invention provides an improved conveyor system that merges articles in a more efficient manner. In other embodiments, it provides automatic control for the speed of the sortation conveyor. In other embodiments, it provides improved accumulation of articles on transport conveyors. In still other embodiments, various of these features are combined together in any suitable fashion.

According to one aspect of the present invention, a conveyor system is provided that includes a merge subsystem, a sortation conveyor, a plurality of sensors, and a speed controller. The merge subsystem is adapted to merge articles from a plurality of feed conveyors onto a merge conveyor. The sortation conveyor is located downstream of the merge subsystem and is adapted to transport articles that have passed through the merge subsystem onto selected ones of a plurality of takeaway conveyors. The sensors are adapted to detect a usage level of the merge subsystem, and the controller is adapted to automatically adjust the speed of the sortation conveyor based upon the usage level of the merge subsystem.

According to another aspect of the present invention, a method for controlling a sortation conveyor is provided. The method includes determining a usage level of a merge subsystem using a plurality of sensors, wherein the merge subsystem is located upstream of the sortation conveyor. The speed of the sortation conveyor is then adjusted based upon the usage level of the merge subsystem.

According to another aspect of the present invention, a method of merging articles from a plurality of feed conveyors onto a merge conveyor is provided. The method includes accumulating articles on the plurality of feed conveyors and releasing a first slug of articles from a selected one of the feed conveyors. Thereafter, a set of feed conveyors is determined that include a second slug of articles able to be delivered to the merge conveyor such that a leading article in the second slug is able to be positioned on the merge conveyor at a specified distance behind the trailing article in the first slug. The second slug is released such that its leading article is positioned at the specified distance behind the trailing article of the first slug.

According to another aspect of the present invention, a conveyor system is provided that includes a plurality of feed conveyors, a merge conveyor, a plurality of sensors, and a controller. The feed conveyors each have an upstream end and a downstream end and are adapted to transport articles from their upstream end toward their downstream end. The merge conveyor is positioned in the vicinity of the downstream end of the feed conveyors. The sensors are adapted to determine the location of the articles on the feed conveyors and the merge conveyor. The controller controls the feed conveyors such that slugs of articles tend to accumulate on the feed conveyors. The controller also determines a set of feed conveyors that have a slug that is able to be positioned on the merge conveyor at a specified distance behind a particular article on the merge conveyor. The controller further selects from the set of feed conveyors a particular conveyor to release its slug based upon a priority level assigned to each feed conveyor in the set.

According to another aspect of the present invention, a method of controlling a merge section of a conveyor system is provided. The merge section includes a plurality of feed conveyors that build slugs of articles for intermittent release onto a merge conveyor. The method includes adjusting a speed of the feed conveyors such that gaps between articles within the slugs are adjusted toward a non-zero target length while the slugs are being generated on the feed conveyors. The non-zero target varies in relation to the length of one or both of the articles adjacent to the gap. Thereafter, the slugs are released from the feed conveyors onto the merge conveyor.

According to another aspect of the invention, a merge subsystem for a conveyor system is provided. The merge subsystem includes a plurality of feed conveyors, a merge conveyor, a plurality of sensors, and a controller. Each of the feed conveyors have an upstream end and a downstream end, and each of the feed conveyors transport articles from their upstream end to their downstream end. The merge conveyor is positioned downstream of the downstream ends of the feed conveyors such that articles exiting from the feed conveyors will be carried by the merge conveyor. The sensors are used to determine the locations of articles on the feed conveyors and the merge conveyor. The controller controls the feed conveyors such that slugs of articles tend to accumulate on the feed conveyors. The controller also uses the sensors to control the speeds of the feed conveyors such that gaps between articles within the slugs are adjusted toward a non-zero target length while the slugs are on the feed conveyors. The non-zero target varies in relation to the length of one or both of the articles adjacent to the gap.

According to another aspect of the present invention, a method of merging articles from a plurality of feed conveyors onto a merge conveyor is provided. The method includes accumulating slugs of articles on the plurality of feed conveyors, releasing a slug of articles from a selected one of the feed conveyors, and controlling a speed of the selected one of the feed conveyors during the release of the slug of articles in order to position a leading article of the slug on the merge conveyor at a target location. The method further includes determining an actual location of the leading article on the merge conveyor and comparing the actual location to the target location, and using the comparison to adjust an aspect of a subsequent release of the selected one of the feed conveyors.

According to another aspect of the present invention, a method of releasing slugs of articles from a first conveyor onto a second conveyor is provided wherein the second conveyor is located downstream of the first conveyor. The method includes transporting a leading article of a first slug from the first conveyor to the second conveyor and determining a distance between the actual position of the leading article of the first slug and a target position for the leading article. This distance defines an error value. The speed of the first conveyor is then controlled based on the error value when the first conveyor releases a later slug from the first conveyor onto the second conveyor.

According to still another aspect of the invention, a method of merging a slug of articles from a feed conveyor onto a merge conveyor is provided. The method includes determining a leading target position for a leading article in the slug, determining an estimated position for the leading article on the merge conveyor, comparing the leading target position to the estimated position, and adjusting the speed of the feed conveyor in a manner such that any differences between the estimated position and the leading target position are reduced.

According to another aspect of the present invention, a method of accumulating articles on a plurality of conveyors is provided. The method includes providing a first and second conveyor wherein the second conveyor is positioned upstream of the first conveyor. Articles are accumulated on the first conveyor while the second conveyor transports articles without accumulation. When articles have accumulated to a first threshold level on the first conveyor, accumulation of articles on the second conveyor is commenced. The first threshold level is less than an entirety of the first conveyor. That is, accumulation of articles on the second conveyor commences before the first conveyor fills completely.

According to another aspect of the present invention, a conveyor accumulation system is provided having a first conveyor and a second conveyor upstream of the first conveyor. A plurality of sensors are used to detect articles on the first and second conveyors. A controller controls the operation of the first and second conveyors such that articles are accumulated on the first conveyor until a first threshold level is reached. The first threshold level is less than an entirety of the first conveyor. The controller commences accumulation of articles on the second conveyor after articles have accumulated to the first threshold level on the first conveyor.

According to another aspect of the present invention, a method of accumulating articles on a plurality of conveyors is provided. The method includes providing a first conveyor, a second conveyor upstream of the first conveyor, and a third conveyor upstream of the second conveyor. The first, second, and third conveyors are all aligned with each other such that articles will travel downstream from the third conveyor to the second conveyor and to the first conveyor. Articles are accumulated on the first conveyor while the second and third conveyors are transporting articles toward the first conveyor. The first conveyor is stopped when articles have accumulated to a first threshold level on the first conveyor wherein the first threshold level is less than an entirety of the first conveyor. Articles are then accumulated on the second conveyor from the third conveyor until an article reaches a downstream end of the second conveyor. When an article reaches the downstream end of the second conveyor, the article is transferred from the second conveyor to the first conveyor.

According to other aspects of the present invention, the second controller may adjust the speed of the sortation conveyor between a minimum and maximum speed that is set by the user of the conveying system. The speed controller may also automatically adjust the speed of the sortation conveyor based upon an average of the usage level taken over a time period, or a plurality of averages of the usage level taken over different time periods. The usage level may be based upon a determination of the number of feed conveyors with slugs of articles that can be transported onto the merge conveyor at a given moment such that the leading article in the slug can be positioned within a desired distance from a trailing article in an adjacent downstream slug. The usage level may alternatively be based upon a degree of article accumulation upstream of the feed conveyors, or a degree of article traffic or accumulation at a location between the merge subsystem and the sortation conveyor. The priority levels assigned to the different feed conveyors may be based upon a combination of criteria chosen from a list that includes: a degree of upstream article accumulation, a number of remaining articles to be transported in a wave, a size of a slug at a given feed conveyor, and an amount of time a slug has remained on a given feed conveyor.

According to other aspects of the present invention, the non-zero target length of the gaps between articles within a slug may be variable, and the variable non-zero target length may be based upon the length of an article adjacent to a particular gap. The releasing of slugs from the feed conveyor may be performed in a closed loop manner such that an expected position for the leading article in the slug on the merge conveyor is adjusted to match, to the extent possible, a target position on the merge conveyor. The release of the slugs may also be done in a stages wherein the during the first stage, the speed of the feed conveyor is controlled in an open loop manner, and during the second stage, the speed of the conveyor is controlled in a closed loop manner. The release of the slugs may further be controlled such that, after the leading article has arrived on the merge conveyor, the feed conveyor speed is controlled such that the trailing article in the slug is positioned on the feed conveyor near or at a target location. The use of the error value in releasing subsequent slugs from a particular feed conveyor may involve adjusting the timing of the subsequent slug's release, or the speed at which the subsequent slug is released, a combination of the two, or any other aspects of the speed profile of the feed conveyor.

According to other aspects of the present invention, the second and third conveyors may be belt conveyors. The first threshold level may be about 40-60% full, although other levels can be used. The first, second, and/or third conveyors may be positioned upstream of a merge subsystem that merges a plurality of feed conveyors onto a merge conveyor. Multiple sets of the first, second, and third conveyors may be provided. A fourth conveyor may be provided upstream of the third conveyor and accumulation on the fourth conveyor may commence when articles have accumulated to a third threshold level on the third conveyor wherein the third threshold level is less than an entirety of the third conveyor. The first accumulation conveyor may be a rollered accumulation conveyor that defines a plurality of zones wherein the rollers in any zone may be operated at different speeds from the rollers in other zones.

In some aspects, the present invention provides methods and systems for more economically merging articles from multiple feed lines onto a merge conveyor, as well as automatic control of the speed of the sortation conveyor based upon system traffic upstream of the sortation conveyor. In other aspects, more accurate placement of articles on the merge conveyor can be achieved, allowing for closer packing of articles without collision (which, in turn, helps the throughput of the system) and/or helps facilitate the gapping of articles, which may help reduce the workload of the downstream gapping conveyors within the induct area and help improve the overall operation of the conveying system. These and other benefits will be apparent to one skilled in the art upon a review of the following written description and the accompanying drawings.

DETAILED DESCRIPTION OF THE EMBODIMENTS

The various embodiments are described below in different sections according to the various subject areas to which the embodiments relate. It will be understood that the headings applied to the various sections are not intended to be limiting upon the scope of the claims, nor are the headings intended to suggest that the various concepts are not combinable with others of the concepts.

Merge Release Priority

Figure 1:
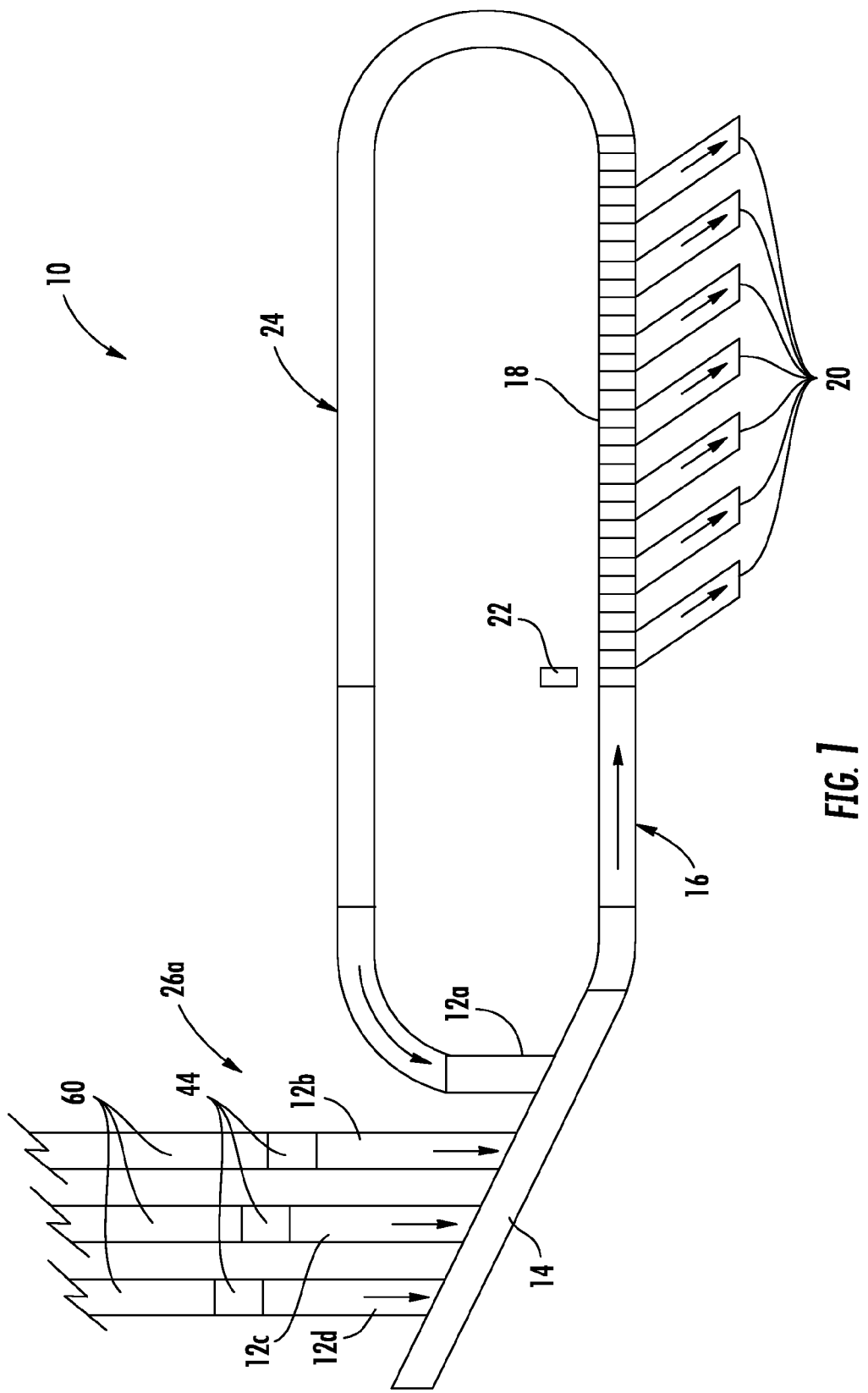
FIG. 1 is a plan view of an illustrative conveyor system that may incorporate one or more aspects of the present invention.

A conveyor system 10 that may incorporate one or more embodiments is depicted in plan view in FIG. 1. Conveyor system 10, as illustrated, includes a plurality of feed conveyors 12 that deliver articles to a merge conveyor 14. Merge conveyor 14 carries the articles it receives from feed conveyors 12 to an induct area 16 where the articles are then fed to a sortation conveyor 18. Sortation conveyor 18 delivers the articles to selected ones of a plurality of takeaway conveyors 20, according to the articles' intended destinations. The articles' intended destinations may be determined by a bar code, radio frequency identification (RFID) tag, or other suitable indicia on the article itself. The indicia may be read by any suitable sensor, such as a scanner 22 positioned at a suitable location upstream of sortation conveyor 18 for reading the bar code, or an antenna for sensing the RFID. Scanner 22 may be in electrical communication with a controller (such as controller 36 discussed below, or a separate controller) that is able to determine the particular takeaway conveyor 20 that is appropriate for a given article. Sortation conveyor 18 then diverts the article onto the particular takeaway conveyor 20 where the article is conveyed to its ultimate destination within the facility, such as, but not limited to, a loading dock area of the facility where the articles are loaded onto a suitable vehicle for transporting to locations external of the facility. Any articles that are not delivered to a takeaway conveyor 20 are transported to a recirculation line 24 that feeds the articles back onto merge conveyor 14.

Figure 2:
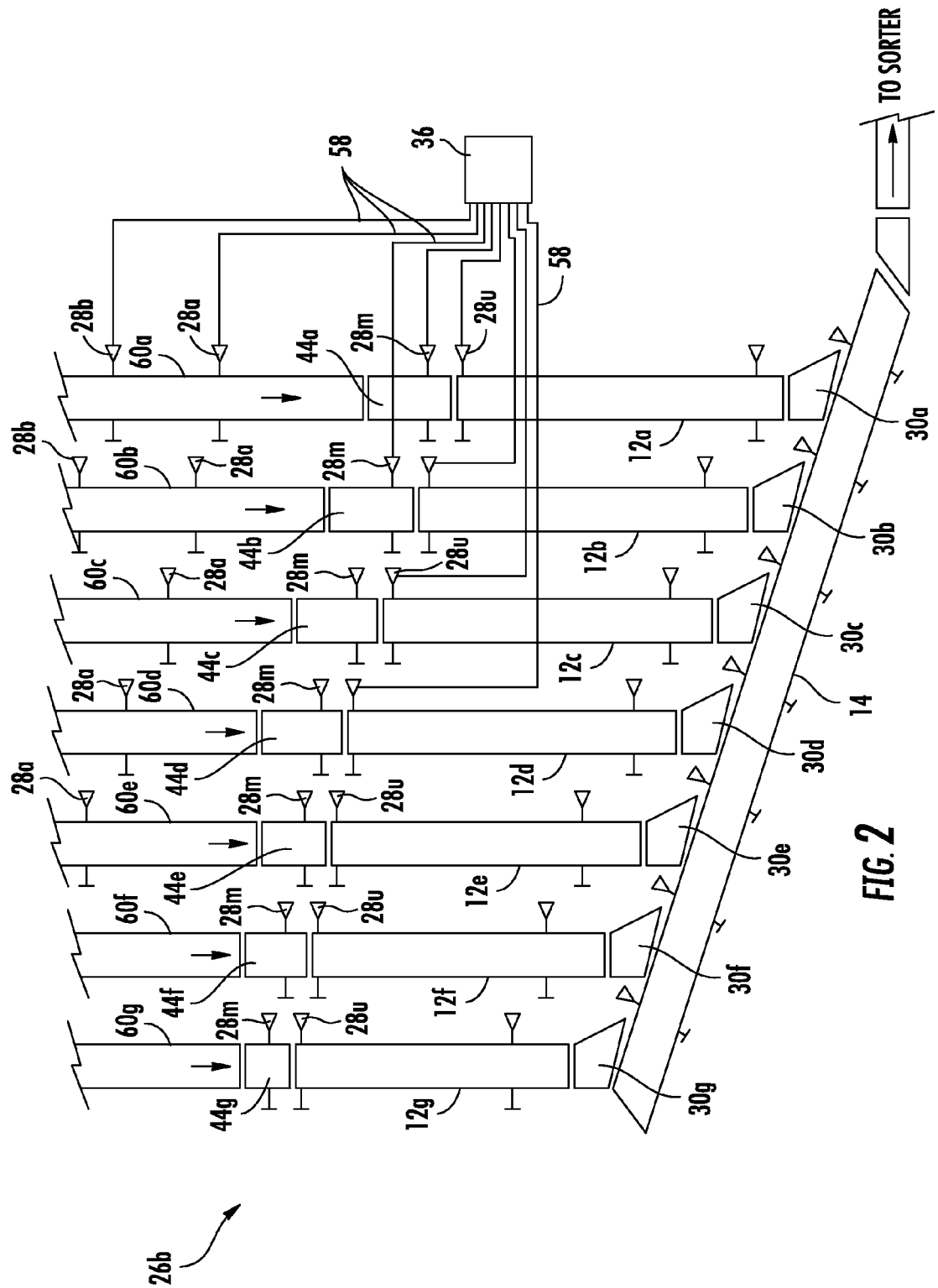
FIG. 2 is a plan view of an empty (no articles) merge subsystem with its associated controller wherein some, but not all of, the controller's wired connections are depicted.

A merge subsystem 26a according to one embodiment is depicted in FIG. 1. A merge subsystem 26b according to another embodiment is depicted in FIG. 2. Other arrangements and configurations of merge subsystems may be used. Merge subsystems 26a and b comprise feed conveyors 12 and merge conveyor 14. Merge subsystems 26a and b may optionally also include a plurality of wedge conveyors 30a-30g (shown in FIG. 2) located in-between merge conveyor 14 and each of feed conveyors 12. Wedge conveyors 30a-30g provide an angled junction between feed conveyors 12 and merge conveyor 14. Merge subsystems 26a and b are controlled by a controller 36, which may be a conventional programmable logic controller, a Personal Computer (PC), a plurality of distributed circuit boards with appropriate electronic circuitry, a combination of any of these items, or any other suitable electrical or electronic structure suitable for carrying out the control logic described herein.

Controller 36 is in communication with a plurality of sensors, such as, but not limited to, photoeyes 28 and/or pulse-position indicators (not shown). Controller 36 is also in communication with motor controllers (not shown) for controlling the various feed conveyors 12, merge conveyor 14, wedge conveyors 30, meter conveyors 44, and accumulation conveyors 60 positioned upstream of the meter conveyors 44. This communication may be accomplished by any suitable wire or wireless technique. FIG. 2 depicts a plurality of wires 58 connecting controller 36 to several of the photoeyes 28. For purposes of clarity, not all of the wires 58 connecting controller 36 to photoeyes 28 are shown, nor are the wires connecting controller 36 to the various motors and motor controllers shown. Further, for purposes of avoiding undue clutter, controller 36 and its associated wires are omitted entirely from FIGS. 3 and 5.

Figure 3:
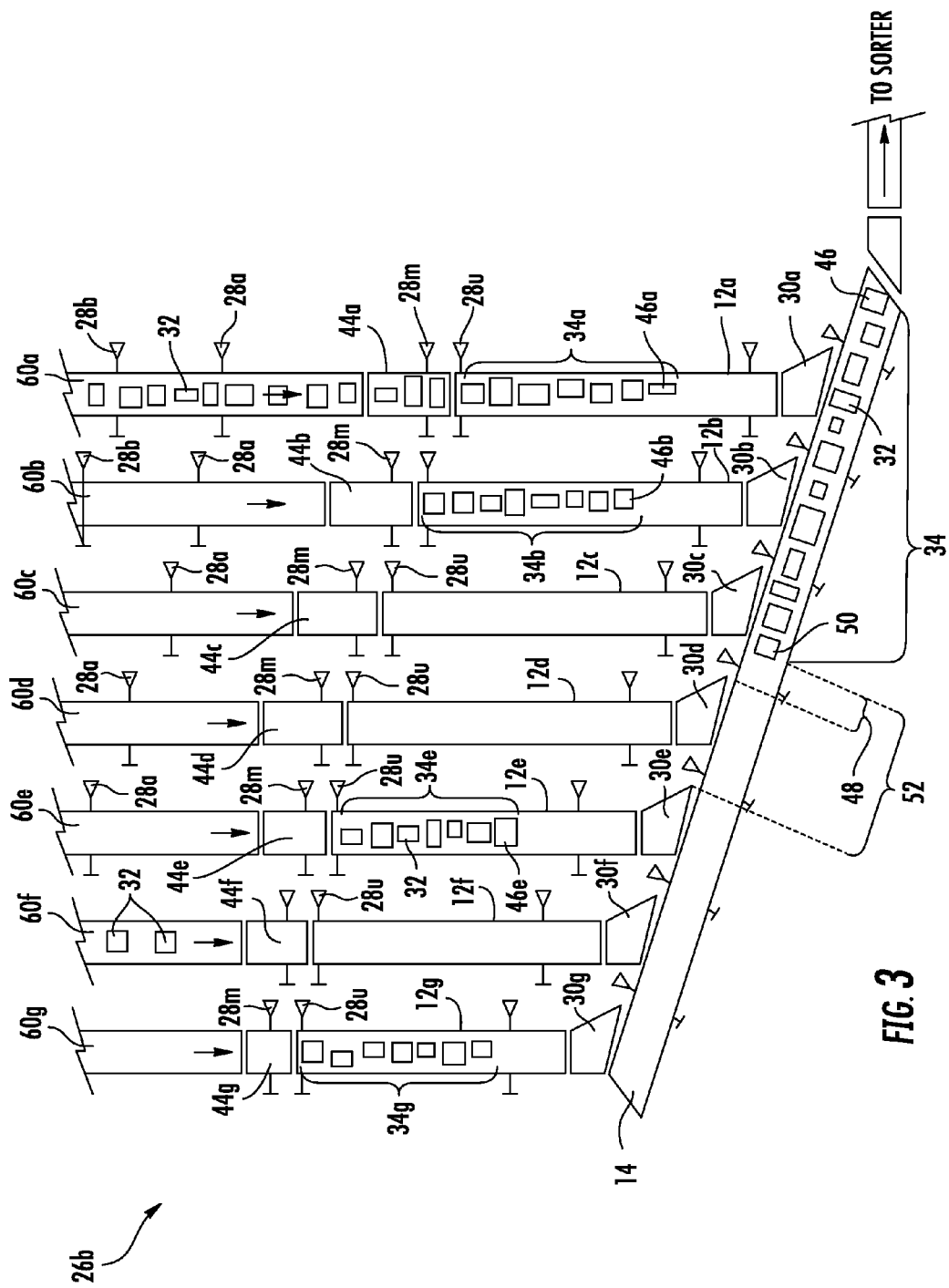
FIG. 3 is a plan view of the merge subsystem of FIG. 2 shown with articles wherein the controller and wired connections have been removed for greater visual clarity.
Figure 5:
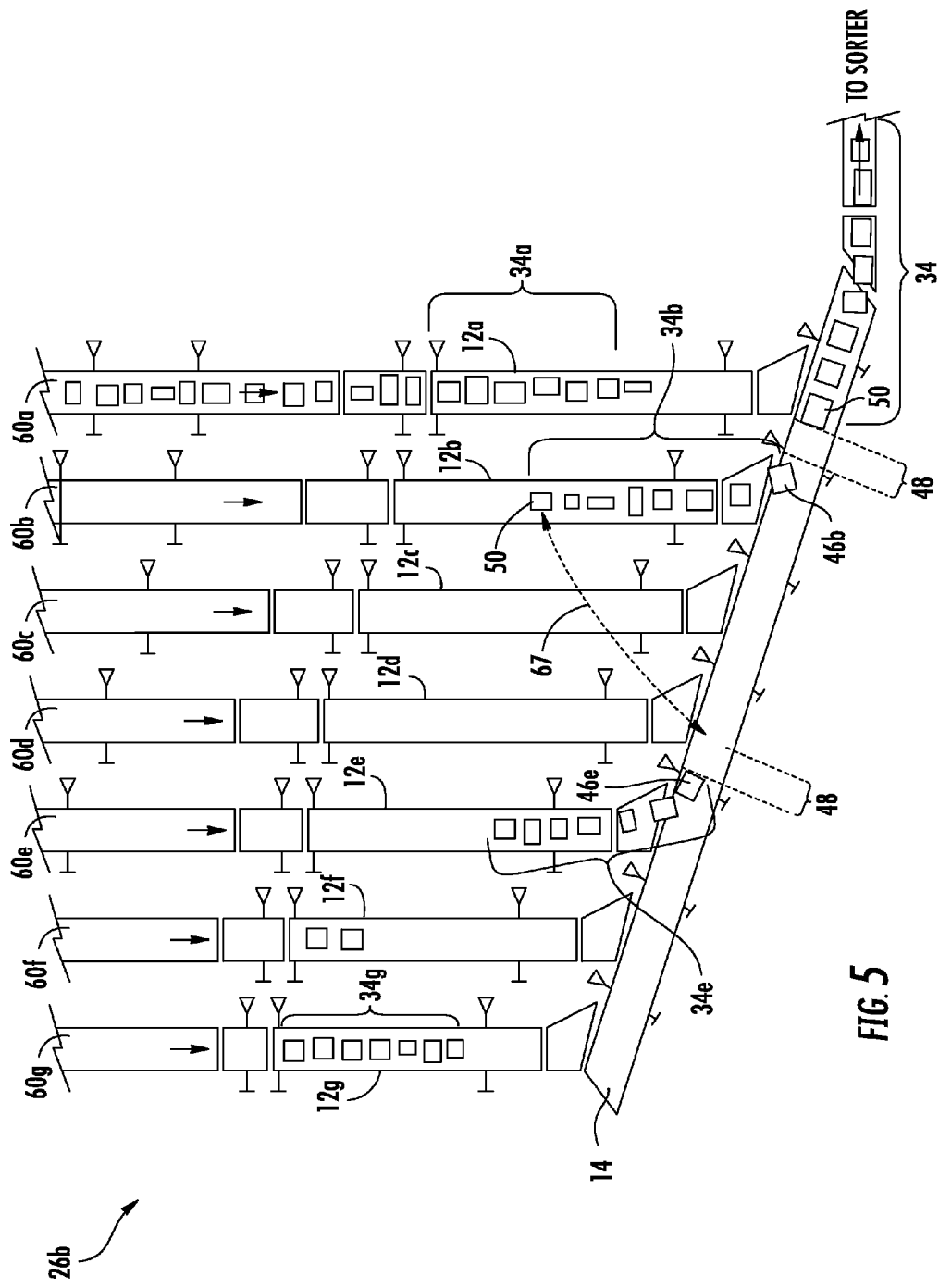
FIG. 5 is a plan view of the merge subsystem of FIG. 3 shown with the articles in positions that may occur at a moment subsequent to that of FIG. 3.

The layout of conveyor system 10 and merge subsystem 26a depicted in FIG. 1, as well as merge subsystem 26b depicted in FIGS. 2, 3, and 5, is intended to illustrate but one of the many possible layouts of a conveyor system with a merge subsystem in which one or more embodiments may be incorporated. Other embodiments may have a layout modified substantially from that shown in FIGS. 1-3 and 5, including, but not limited to, conveying systems having different numbers, locations, shapes, and configurations of feed conveyors 12, merge conveyors 14, induct areas 16, sortation conveyors 18, takeaway conveyors 20, wedge conveyors 30, meter conveyors 44, accumulation conveyors 60, and recirculation lines 24.

In operation, merge subsystems 26a and b deliver articles from feed conveyors 12 onto merge conveyor 14 in a controlled manner such that articles 32 (FIG. 3) from each of the feed conveyors 12 are merged onto merge conveyor 14 in a single file manner. Generally speaking, merge subsystems 26a and b merge articles onto merge conveyor 14 by building slugs 34 of articles 32 (such as slug 34a on feed conveyor 12a in FIG. 3) on each of feed conveyors 12. After the slugs 34 of articles have reached a predetermined size, they are eligible for being released onto merge conveyor 14.

Figure 4:
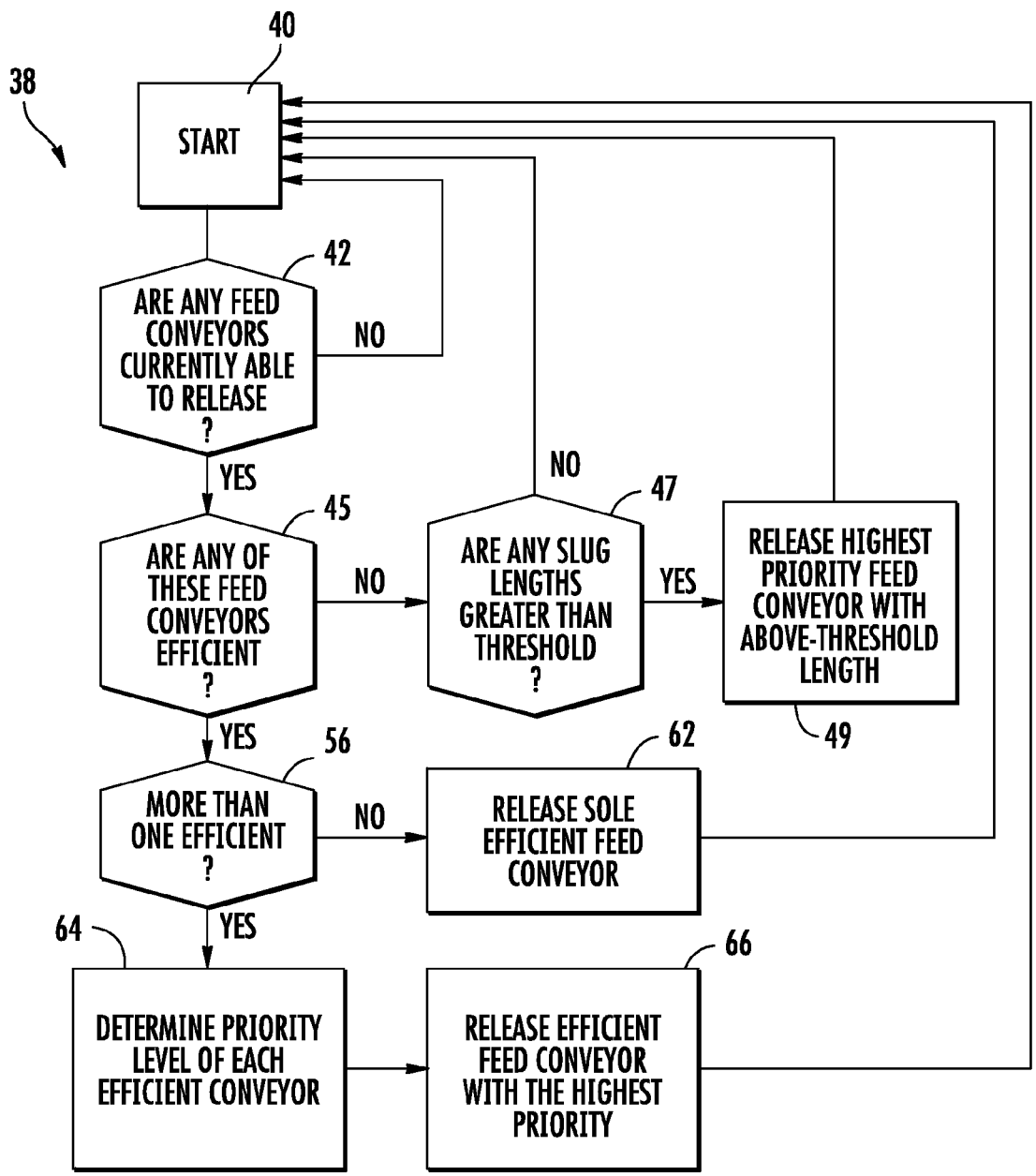
FIG. 4 is a flowchart of a merge subsystem release algorithm.

Controller 36, in one embodiment, determines which feed conveyor 12 will release its slug next based on a slug release timing method 38 illustrated in block diagram form in FIG. 4. If controller 36 is implemented as a programmable logic controller (PLC), then controller 36 may be programmed to perform all of the steps of method 38 for every scan of the PLC. Alternatively, if controller 36 is implemented as another suitable electronic device, the steps of method 38 may be repeated based on a different timing cycle. Regardless of the specific form of controller 36, method 38 is repetitively performed at a suitable rate for a given situation. Generally speaking, a rate of multiple times a second is suitable, such as once every 10-20 milliseconds, although other rates may be used.

Method 38 begins at start step 40 and proceeds to step 42, where controller 36 determines which of the feed conveyors 12 are currently able to release. As will be discussed more below, some feed conveyors 12 may not currently be able to release their respective slug of articles 34 because they are currently accepting another article from their associated upstream meter conveyor 44, or they haven't accumulated a slug 34 yet, or haven't accumulated a large enough slug 34 yet to be a candidate for release, or for other reasons. Controller 36 checks each of the feed conveyors 12 every time step 42 is repeated. Thus, for different installations having different numbers of feed conveyors, controller 36 will examine different numbers of feed conveyors at step 42. In the example illustrated in FIG. 1, controller 36 will check to see if any of the four feed conveyors 12a-d are currently able to release, while in the example illustrated in FIG. 2, controller 36 will check to see if any of the seven feed conveyors 12a-g are currently able to release.

If there are no feed conveyors 12 currently able to release their slug of articles, then method 38 starts over. That is, controls returns to start step 40 at a subsequent time determined by the frequency at which method 38 repeats. Controller 36 will thus repetitively check to see if any feed conveyors 12 are ready for release, and it will continue to perform this checking until it determines that at least one feed conveyor 12 is ready for release.

When controller 36 determines that at least one feed conveyor 12 is ready for release, it proceeds to step 45 where it determines whether any of the feed conveyors 12 that are ready for release are also "efficient." Whether or not a conveyor is efficient will be discussed more below, but generally speaking, a feed conveyor 12 is deemed efficient if it is able to be currently released such that a leading article 46 (see FIG. 3) in its associated slug 34 of articles can be placed on merge conveyor 14 at a specified distance behind a trailing article 50 of the slug of articles it will follow.

For example, in the situation illustrated in FIG. 3, slug 34a on feed conveyor 12a could be released such that its leading article 46a will be positioned on merge conveyor 14 within a specified distance 48 of a trailing article 50 in slug 34. This is because feed conveyor 12a (and wedge conveyor 30a) can be accelerated at the appropriate time and to the appropriate degree such that leading article 46a will reach and be transferred onto merge conveyor 14 at the moment when trailing article 50 has advanced distance 48 downstream of the junction of wedge conveyor 30a and merge conveyor 14. Controller 36, which knows the locations of all of the articles 32 on all of the feed conveyors 12 and merge conveyor 14, can control the acceleration, speed, and deceleration of feed conveyor 12a (and wedge conveyor 30a) such that article 46a will be deposited onto merge conveyor 14 a distance 48 behind trailing article 50. Similarly, slug 34b of feed conveyor 12b could also be released such that its leading article 46b was placed on merge conveyor 14 a distance 48 behind trailing article 50.

In contrast, article slug 34e could not, in the situation illustrated in FIG. 3, be transferred onto merge conveyor 14 such that its leading article 46e was positioned behind trailing article 50 a distance equal to distance 48. This is because article slug 34 has advanced too far down merge conveyor 14 for article slug 46e to catch up to slug 34. Even if feed conveyor 12e (and wedge conveyor 30e) were to theoretically undergo unrealistic levels of acceleration, leading article 46e of slug 34e would be placed on merge conveyor 14 behind trailing article 50 a distance at least as great as distance 52 (i.e. the distance from trailing article 50 to the junction of wedge conveyor 30e and merge conveyor 14). As can be seen, distance 52 is greater than distance 48. Thus, at the moment illustrated in the example of FIG. 3, slug 34e is not efficient with respect to slug 34 (though it may subsequently become efficient with respect to whatever slug follows slug 34, depending on what slug that is).

In the situation illustrated in FIG. 3, controller 36 would thus determine at step 45 (FIG. 4) that at least one feed conveyor 12 was efficient (e.g. either of feed conveyors 12a or 12b). Had controller 36 determined at step 45 that no feed conveyors were efficient, it would proceed to step 47 and, if appropriate, to step 49. A more detailed discussion of the actions undertaken at steps 47 and 49 is set forth below.

At step 56 (FIG. 4) controller 36 determines whether more than one feed conveyor 12 is efficient. If only a single feed conveyor 12 is currently efficient, controller 36 proceeds to step 62 where it releases the slug from the single feed conveyor 12 that is currently efficient. If controller 36 determines at step 56 that multiple feed conveyors 12 are currently efficient, controller 36 proceeds to step 64 where it determines which of the multiple efficient conveyors 12 to release next based upon a priority level it assigns to each of those multiple efficient conveyors 12. After determining the efficient feed conveyor 12 with the highest priority at step 64, controller 36 proceeds to step 66 where it releases the highest priority feed conveyor 12.

The priority system that controller 36 uses at step 64 may be the same as that used at step 47 (discussed more below), or it may be a different priority system. If the priority system used at step 64 (or step 47) results in a tie between multiple feed conveyors 12, controller 36 may resolve this tie in any suitable manner. One suitable manner is to choose from amongst the tied feed conveyors 12 the upstream-most feed conveyor 12 (i.e. the feed conveyor that merges with merge conveyor 14 at the upstream-most location). Such a choice tends to increase the likelihood of there being one or more efficient feed conveyors for the subsequent slug release because, generally speaking, there is more opportunity for a feed conveyor 12 to become efficient with respect to a slug 34 of articles released from an upstream feed conveyor 12 than a downstream feed conveyor 12.

In one embodiment, the priority system used by controller 36 at steps 47 and 64 is the degree of article accumulation upstream of the respective feed conveyor 12 (such as the degree of article accumulation on accumulation conveyor(s) 60 upstream of the respective feed conveyor). The feed conveyor 12 having the greater amount of article accumulation is given a higher priority than the other feed conveyors 12 being considered by controller 36 for release. The amount of article accumulation can be determined by any suitable means, one of which is the use of one or more photoeyes positioned alongside accumulation conveyors 60. When the photoeyes sense the presence of an article for more than the time it takes for the article to simply move by the photoeye, this is indicative of an accumulation of articles to at least the point of the photoeye. If multiple photoeyes are positioned at different locations along the accumulation conveyor 60 (or at different locations along a series of accumulation conveyors 60), the upstream-most photoeye that detects article accumulation will be indicative of the degree of article accumulation.

In the example illustrated in FIG. 3, each accumulation conveyor 60 includes a plurality of photoeyes 28a and b positioned alongside of it, although photoeyes 28a are only illustrated for accumulation conveyors 60a-e and photoeyes 28b are only illustrated for accumulation conveyors 60a and b. It will be understood that additional photoeyes 28c, d, etc. may be positioned further upstream of photoeyes 28a and b, either along accumulation conveyors 60, or along one or more conveyors upstream of conveyors 60. As shown in the example of FIG. 3, photoeyes 28a and b of accumulation conveyor 60a are both detecting article accumulation, while photoeyes 28a and b of accumulation conveyor 60b are not detecting any article accumulation. Thus, if controller 36 were to choose between releasing feed conveyor 12a or feed conveyor 12b at step 64 using an article accumulation priority system, it would choose feed conveyor 12a because it would be assigned a higher priority level (due to its greater upstream article accumulation). Controller 36 would also choose to release feed conveyor 12a even if photoeye 28a of accumulation conveyor 60b, but not photoeye 28b of accumulation conveyor 60b, were detecting article accumulation because accumulation conveyor 60a would still have more article accumulation. Were both photoeyes 28b of accumulation conveyors 60a and 60b to both detect article accumulation, the priority level, in this embodiment, would be a tie, and controller 36 could resolve the tie in the manner discussed above (such as by choosing the more upstream conveyor line, which, in this case, would be feed conveyor 12b). To the extent additional photoeyes 28c, d, etc. were used for article accumulation detection, controller 36 would use these photoeyes in determining the priority assignment at step 64 (and/or step 47) in a similar manner.

In another embodiment, the priority system can be based upon the number of articles remaining to be delivered by each of the feed conveyors 12 in a particular wave of articles. Article waves refer to groups of articles that must collectively be delivered to merge conveyor 14 before any additional articles (such as another wave) can be delivered to merge conveyor 14. Article waves can take on a wide variety of forms. As one example, an article wave may correspond to a particular destination for a given vehicle (such as a semi-trailer, airplane, etc.). If a given vehicle will be transporting articles to multiple locations, it naturally makes sense to load those articles first that will be delivered to its last destination, and to load those articles last that will be delivered to its first destination. Thus, it may be desirable to load the vehicle in a way such that the articles for a particular destination are grouped together and arranged in an order that makes sense for the planned route of the vehicle. Article waves may also correspond to different classes of goods intended for the same destination. Article waves may further correspond to whatever articles are processed during a particular time period, such as during a worker shift, a portion of a shift, a day, or some other time period. Article waves may correspond to still other things, as well.

Regardless of what constitutes a wave, controller 36 knows how many articles will be delivered to each of the feed conveyors 12. Controller 36 may be provided this information in any of a variety of suitable manners, such as from a human operator or a higher level controller that includes a database of what articles correspond to a particular wave. Further, controller 36 keeps track of the number of articles still to be delivered to each of the feed conveyors 12 for a given wave. Controller 36 may keep track of this information in any suitable manner, such as, but not limited to, utilizing a suitable photoeye that detects articles as they pass by. Photoeye 28m, for example, could be used to detect the passage of each article traveling onto a particular feed conveyor 12. After each article passed by photoeye 28m, controller 36 would decrement the number of remaining articles in the wave that still were to be delivered to the particular downstream feed conveyor 12. Other manners of keeping track of the number of article remaining in a given wave are also possible, including the use of different photoeyes 28 and/or different sensors.

When controller 36 reaches step 47 or step 64 in method 38 (FIG. 4), it assigns the highest priority to the feed conveyor 12 that has the highest remaining number of articles in the current wave still to be transported to merge conveyor 14. Thus, in this version of the priority system, if controller 36 were confronted with choosing between feed conveyors 12a and 12b (FIG. 3) at step 64, it would choose whichever of these feed conveyors had a greater remaining number of articles to be delivered for the wave of articles currently being processed by merge subsystem 26b. If feed conveyor 12b still had to process 200 articles in the current wave while feed conveyor 12a only had to process 50 articles in the current wave, controller 36 would choose feed conveyor 12b, despite the greater accumulation of articles upstream of feed conveyor 12a.

By assigning priority based on the number of articles remaining to be transported for a given wave, merge subsystem 26b may increase its efficiency. This increase in efficiency arises from the fact that it is generally desirable to have each of the feed conveyors 12 in a merge subsystem finish delivering all of their articles in a given wave at close to the same time. If all of the feed conveyors 12 do not finish delivering a given wave at about the same time, those feed conveyors 12 that have finished are prevented from releasing their article slugs 34 onto merge conveyor 14 until the other feed conveyors 12 have all completed their delivery of articles in that wave. Thus, if one or more feed conveyors 12 finish processing their wave of articles significantly sooner than the other feed conveyors 12, those feed conveyors 12 that finished early would otherwise sit idle (i.e. refrain from releasing their slugs) until the other conveyors finish processing the current article wave. Being in the idle state for extended periods of time may cause undesirable consequences, such as excessive upstream article accumulation, or reduced efficiency of the merge subsystem due to the fact that, generally speaking, a feed conveyor 12 that is efficient is more likely to be always found at step 46 when none of the feed conveyors 12 are idle. By assigning priority to the feed conveyor 12 that has the most articles left to be delivered in a given wave, merge subsystem 26 will generally have each feed conveyor 12 finish processing a given wave within a relatively short time period of each other, thus reducing the amount of time any feed conveyor 12 may remain idle.

In yet another embodiment, controller 36 may use a priority system at steps 47 and 64 that is based on a combination of different criteria. The different criteria may be a combination of the degree of article accumulation (discussed above) and the number of articles remaining to be delivered in a given wave (also discussed above). In such a system, controller 36 evaluates both the degree of upstream article accumulation and the number of remaining articles in a given wave, weights the two criteria according to a particular weighting scheme, and then chooses the feed conveyor 12 that results in a higher priority ranking from the blended criteria. The particular weighting scheme can be varied to suit a given facility, and may include an equal 50-50 weighting between the criteria, or any other desired weighting ratio.

The different criteria controller 36 may use to determine priority at steps 47 and 64 may also include such things as the amount of time a particular article slug 34 has been waiting to be released onto conveyor 14 (with the older slugs being given higher priority), as well as the size of a particular slug 34 (with the larger slugs given higher priority. Still other criteria may be used to determine priority at steps 47 and 64. The particular weighting of the different criteria (if more than one is used) can be a static weighting, i.e. the weighting doesn't change over time, or it may be a dynamic weighting that changes with respect to time.

In summary, the particular priority system used by controller 36 at steps 47 and 64 can be any one of the following criteria used by itself, or any one of the following criteria used in combination with one or more of the other following criteria (whether combined in a statically weighted manner or a dynamically weighted manner): (1) the degree of upstream article accumulation, (2) the number of articles remaining to be merged in a given wave of articles, (3) the amount of time a slug has been waiting to be merged, (4) the size of a slug, and (5) any other suitable criteria.

Returning to step 45, if controller 36 determines that no feed conveyors are currently efficient, it proceeds to step 47 (FIG. 4). At step 47, controller 36 determines if any of the feed conveyors 12 have slugs built up on them that are greater than a threshold amount. The threshold amount may be set to any suitable level and generally refers to a minimum length for slugs to attain before being candidates for discharge. In one embodiment, this threshold may be set to eighty-percent (i.e. the slug must occupy approximately eighty-percent of the feed conveyor 12), although other values may be used. If controller 36 determines at step 47 that no feed conveyors 12 have built up a slug that meets the threshold, controller 36 proceeds back to step 40 where method 38 is repeated.

If controller 36 identifies only one feed conveyor 12 at step 47 that has a slug greater than the threshold length, it proceeds to step 49 where it releases the one feed conveyor 12 having the slug greater than the threshold length. If controller 36 identifies multiple feed conveyors 12 at step 47 having slugs greater than the threshold length, controller 36 proceeds to step 49 where it determines which of the multiple feed conveyors 12 with above-threshold length slugs has the highest priority. The one with the highest priority is released, and controller 36 returns to step 40. The priority system used by controller 36 at step 49 may be any of the various priority systems discussed above.

As was mentioned above, controller 36 repetitively determines which feed conveyors 12 are currently able to release at step 42. A feed conveyor, in one embodiment, may be deemed ready to currently release if articles have accumulated past a minimum threshold and if no articles are currently being transferred to the feed conveyor 12 from its associated upstream meter conveyor 44 (or whatever other conveyor might be immediately upstream of feed conveyor 12). The minimum threshold may be varied to any suitable value. One such suitable value is thirty percent. That is, controller 36 may only deem a feed conveyor 12 to be a candidate for an efficient release if the feed conveyor 12 has accumulated articles to at least thirty percent of its length. It will be understood by one skilled in the art that this value can be varied substantially.

Controller 36 may also be configured, in one embodiment, to stop accumulating articles on feed conveyors 12 once articles have reached a maximum threshold. One such suitable maximum threshold is ninety-percent, although it will be again understood by those skilled in the art that this value can be varied substantially.

As was mentioned above, controller 36 may also be configured, in addition to the minimum and maximum thresholds, to utilize another threshold at step 47. This other threshold used at step 47 is an intermediate threshold that lies between the minimum and maximum thresholds. This intermediate threshold, as mentioned above, may be used to determine the release of feed conveyors when there are no articles currently on merge conveyor 14. When no articles are currently on merge conveyor 14, none of the feed conveyors 12 can be considered efficient (because none of them can attach to a previously released slug on merge conveyor 14 at a specified distance because there are no articles on merge conveyor 14 to attach to). Thus, controller 36 will proceed to step 47 in method 38 (FIG. 4). The use of the intermediate threshold causes controller 36 to consider at step 49 only those feed conveyors 12 that have accumulated articles to the intermediate threshold level. Thus, if no articles are currently on merge conveyor 14, controller 36 will only consider at step 49 those feed conveyors 12 that have achieved a level of article accumulation greater than or equal to the intermediate threshold. Of those feed conveyors 12 that have achieved this intermediate threshold, controller 36 will release the one with the highest priority. If none of them have achieved the intermediate threshold, controller 36 will not release any feed conveyor 12, but will instead skip from step 47 back to start step 40. As noted, the intermediate threshold can be set to any suitable value, one of which may be eighty percent, although it will be understood by those skilled in the art that this value can be varied substantially.

Controller 36 may determine the degree of article accumulation on feed conveyors 12 by way of an upstream photoeye 28u and any suitable sensors for measuring the amount of movement of feed conveyors 12. One such suitable sensor for measuring the amount of movement of feed conveyor 12 is a pulse-position indicator that counts the number of pulses output by feed conveyor 12 wherein a single pulse is output for a known and set amount of advancement of feed conveyor 12. For example, feed conveyors 12 may output a pulse for every inch that they advance. By counting the number of pulses output by feed conveyor 12, the pulse position indicator can determine how far a particular feed conveyor 12 has moved (and thus how far an article has traveled down the conveyor). Other sensors may be used besides pulse position indicators, such as Hall-effect sensors or sensors constructed as disclosed in commonly-assigned U.S. provisional patent application Ser. No. 60/952,022 filed Jul. 26, 2007 and entitled Roller Encoder, the complete disclosure of which is hereby incorporated herein by reference, or any other types of sensors suitable for measuring the degree of travel of a conveyor.

As can be seen in FIGS. 2 and 3, a photoeye 28u may be positioned at an upstream end of each feed conveyor 12. When an article enters feed conveyor 12 from its associated meter conveyor 44, photoeye 28u detects the leading edge of the article by way of its beam of light being interrupted by the article. Controller 36 records the moment the leading edge of the article is detected, keeps track of how far the conveyor is advancing (such as through the pulse position indicator or other sensor mentioned above), and also records the moment the trailing edge of the article is detected (which is detected by the photoeye 28u becoming unblocked). By recording the moments of detection of the leading and trailing edges of the article, as well as the distance the conveyor has traveled in the interim, controller 36 is able to calculate the length of the article. Controller 36 does this for each article it detects via photoeye 38u.

Controller 36 also continuously monitors the movement of feed conveyor 12 so that it is able to determine the location of each article on feed conveyor 12. Still further, by knowing the length of each feed conveyor 12, controller 36 is able to determine when any particular article has traveled down a given percentage of the length of the conveyor 12, such as thirty, eighty, ninety, or any other percentage of the conveyor. Thus, controller 36 is able to determine when articles have accumulated to the minimum, intermediate, and maximum thresholds for a particular conveyor system.

In general, controller 36 may control the movement of feed conveyors 12 in one of three different manners or modes. The first is an article accumulation mode. The second is a release mode. And the third is an idle mode. In the first mode, controller 36 accelerates whenever a meter conveyor photoeye 28m positioned alongside meter conveyor 44 detects the leading edge of an article. This acceleration creates space on feed conveyor 12 to accept the incoming article from the associated meter conveyor 40. Whenever photoeye 28m detects the trailing edge of the article, controller 36 begins to slow down feed conveyor 12. And when upstream photoeye 28u detects the trailing edge of the article, controller 36 stops feed conveyor 12 (unless another article has been detected by meter conveyor photoeye 28m, in which case feed conveyor 12 begins to accelerate again). In this manner, feed conveyor 12 advances sufficiently to receive a next article, but generally doesn't otherwise advance. This causes articles to accumulate on feed conveyor 12 starting at the upstream end of feed conveyor 12. The control of feed conveyor 12 during this accumulation mode may be carried out such that the accumulated articles have close to no gap (or in fact no gap) between each other, or have a non-zero gap of a target size between each other.

In the second mode, the release mode, controller 36 stops meter conveyor 44 to prevent more articles from being delivered onto feed conveyor 12. Further, controller 36 accelerates the feed conveyor 12 such that the articles that have accumulated on the feed conveyor 12 (i.e. the slug 34) are advanced onto merge conveyor 14. If wedge conveyors 30 are included in between the feed conveyor 12 and the merge conveyor 14, controller 36 also controls the speed of the wedge conveyors 30. The speed of the wedge conveyors may be controlled to operate at any suitable speed provided that controller 36 takes into account the speed of the wedge conveyors 30 when determining whether an article slug is efficient or not. In other words, controller 36 may to consider how fast wedge conveyor 30 will be running in deciding whether a particular slug can be delivered onto merge conveyor 14 at the specified distance 48 behind next-most downstream slug.

In one embodiment, wedge conveyors 30 may be set to run at a speed that is approximately ten percent slower than the speed of merge conveyor 14, and feed conveyors 12 can be controlled to deliver articles to wedge conveyors 30 at a speed that is approximately 20 percent less than that of merge conveyor 14. It will be understood by those skilled in the art, of course, that other speed arrangements may also be used.

Controller 36 may operate feed conveyors 12 in an idle mode when articles have accumulated on the feed conveyor 12 to the maximum threshold. That is, when articles have accumulated to the maximum threshold, feed conveyor 12 will sit idle and not accept any more articles from the upstream conveyor until after controller 36 decides to release it.

The length of distance 48 may be varied according to the particular goals and constraints of a given conveyor system installation. Generally speaking, the length of distance 48 is short enough such that the merge subsystem 26 does not end up delivering a greater amount of space between articles than is necessary for the downstream sortation conveyor 18. In one embodiment, distance 48 may be the about the same as the average amount of gap desired between articles for the particular sortation conveyor 18 being used in the system. In another embodiment, the length of distance 48 may be variable and based upon the length of the leading article 46a in a slug waiting to be released, or the length of the trailing article 50 in a slug that has already been released, or some combination of the two. As is known, some sortation conveyors require different amounts of gaps between articles depending upon the length of the article. Thus, distance 48 could be made a function of article length (leading article 46 or trailing article 50) in order to match the amount of gaps between articles that is desired for the particular sortation conveyor 18 being used in the conveyor system.

As yet another alternative, the size of distance 48 may be based upon the length of a particular slug, the number of articles in a particular slug, and/or the amount of gaps (if any) between the articles in the slugs. If the articles have no gaps between them, then distance 48 would generally be set larger so that the downstream induct area 16 would be able to efficiently create the desired gaps between the articles. If the articles already have gaps between them, then the size of distance 48 may generally be set smaller. Still further, the length and/or number of articles within the slug may be used in determining the size of distance 48 in any suitable manner where the general goal is to provide enough total gap (i.e. the total of the gaps in the slug) to match the sortation conveyor's needs for the articles in that slug.

It should be noted that, after controller 36 has released a slug of articles (at step 49, 62, or 66), controller 36 starts method 38 over again without waiting for the released slug of articles to finish being transported onto merge conveyor 14. This allows multiple slugs 34 to be releasing at overlapping time periods onto merge conveyor 14 in certain situations. For example, assuming that the next slug to be released in the situation depicted in FIG. 3 is slug 34*b*, it is possible that controller 36 might determine that slug 34*e* should be released following slug 34*b*. If controller 36 makes this determination, at some point during the release of slug 34*b*, slug 34*e* will also be releasing onto merge conveyor 14. This situation is illustrated in FIG. 5. As can be seen therein, controller 36 has started to release slug 34*e* such that its leading article will be positioned distance 48 behind trailing article 50 of slug 34*b* (when trailing article 50 of slug 34*b* actually reaches merge conveyor 14, which it hasn't yet done at the moment depicted in FIG. 5 but will, as indicated by the dashed arrow 67).

In some situations, it may even be possible for three or more feed conveyors 12 to be releasing articles at overlapping time periods, depending upon the number of feed conveyors 12, the configuration of merge subsystem 26, the size of the slugs, and other factors. By allowing for multiple feed conveyors 12 to be released at the same time, slug release timing method 38 prevents unwanted gaps between slugs on merge conveyor 14 while maintaining greater freedom for the choice of which feed conveyors 12 will follow a particular slug.

Release or merge method 38 can be modified in various manners from that described above. In one such modification, controller 36 modifies steps 49 and 66 of method 38 such that any feed conveyors 12 that have a priority level within a predetermined range of the highest priority feed conveyor 12 are considered to be tied. Thus, instead of releasing the highest priority feed conveyor 12 at step 49 or 66, controller 36 first identifies the highest priority feed conveyor 12 and then identifies all other feed conveyor 12 candidates, if any, that have a priority level that is within a specified degree of closeness to the highest priority feed conveyor 12. Controller 36 treats these additional feed conveyors 12 that have a suitably close level of priority as having the same level of priority as the highest priority feed conveyor 12. Consequently, steps 49 and 66, in modified method 38, involve not just identifying the highest priority level feed conveyor, but also all those that are within a specified range from the highest priority feed conveyor 12.

For example, controller 36 might be modified to consider all feed conveyors 12 having a priority level within ten percent of the highest priority feed conveyor 12 to be tied, in terms of priority. Other values for the specified range can also be used. Thus, if the highest priority feed conveyor 12 had a priority level of one-hundred, and another feed conveyor had a priority level of ninety, controller 36 would consider both of them to have the same priority level. In order to resolve this tie, controller 36 would utilize secondary criteria for determining a secondary level of priority, which would then be used such that the feed conveyor 12 having the highest secondary priority would be selected for release. The secondary criteria could involve whatever tie-breaking algorithm controller 36 had been programmed to utilize, such as choosing the most upstream of the tied feed conveyors 12. Alternatively, the secondary criteria could involve any of the other conditions upon which priority might be based (such as any of those discussed previously) that hadn't been used at steps 49 or 66. In other words, those feed conveyors 12 considered to be tied at steps 49 or 66 would have their ties broken by secondary priority criteria that was different from the primary criteria that was used to generate the tied scores.

By modifying method 38 at steps 49 and 66 such that the feed conveyors 12 within a specified range of the highest priority feed conveyor are considered to be of equal priority, modified method 38 helps ensure that the priority criteria used to determine which conveyor 12 to release next is more meaningful. This is because, when multiple feed conveyors 12 have priority levels that are close to each other (i.e. within a specified range), it likely does not make a significant difference as to which one of the multiple feed conveyors 12 is chosen to be released next, at least in terms of the primary criteria that was used to generate the initial tied priority level. However, in terms of the secondary criteria used to resolve the tie, there may be significant differences in the priority levels of the previously tied feed conveyors 12. Thus, modified method 38 will tend to utilize priority criteria that generates more significant differences in the priority levels of the various feed conveyors 12.

When confronted with tied priority levels based on the primary criteria, modified method 38 can choose to release the tied feed conveyor 12 that has the highest priority level based on the secondary criteria, or it can use a similar algorithm to that used with the primary criteria. That is, if the secondary criteria also yields priority levels that are within ten percent of each other (or some other specified level of closeness), controller 36 could consider those feed conveyors to be tied and then switch to a tertiary set of criteria for resolving the tie. Still further criteria, such as quaternary criteria, could be used for any ties that remained with respect to the tertiary criteria. Additional levels of tie-breaking and criteria could also be used. Regardless of the specific number of additional criteria used by controller 36 in modified method 38, the determination that close levels of priority are to be treated as ties, along with the use of multiple criteria for resolving the ties, helps ensure that the next feed conveyor 12 to be released is chosen based upon factors that are of relatively more significance.

Speed Control

In another embodiment, an automatic speed control method 68 (FIG. 6) is used to control the speed of sortation conveyor 18. Automatic speed control method 68 is carried out by whatever controller is used in conveying system 10 to control the speed of sortation conveyor 18. In some situations, this may be controller 36. In other situations, this may be a separate controller, such as another PLC, or any other suitable electronic structure capable of controlling the speed of sortation conveyor 18. For purposes of description herein, automatic speed control method 68 will be described herein as being carried out by controller 36, although it will be understood that this aspect of the present invention is not limited to such a case, and, as mentioned, speed control method 68 could be carried out by a separate controller.

In general, speed control method 68 is an algorithm that causes automatic adjustments to the speed of sortation conveyor 18 based upon a usage level of merge subsystem 26 (whether subsystem 26*a*, 26*b*, or some other configuration). When merge subsystem 26 is operating at a high usage level, then sortation conveyor 18 is likewise run at a high speed in order to process the many articles being fed to it through merge subsystem 26. In contrast, when merge subsystem 26 is operating at a relatively low usage level, then sortation conveyor 18 is run at a relatively slower speed so that it is less likely to be underfed by merge subsystem 26. These automatic speed adjustments help reduce the wear and tear, energy consumption, and noise of sortation conveyor 18 to only those levels necessary to efficiently process the articles being delivered to it.

Speed control method 68 begins at a start step 70 and proceeds to a first step 72. At first step 72, controller 36 computes the total number of feed conveyors 12 that are currently efficient, as discussed above. In other words, controller 36 computes the total number of feed conveyors 12 that are currently able to release their respective slugs such that they could be positioned a specified distance 48 behind the next-most downstream slug on merge conveyor 14. From step 72, controller 36 proceeds to step 74 where it computes the total number of feed conveyors 12 that are currently releasing their slug. At step 76, controller 36 sums the totals from steps 72 and 74 together. Stated alternatively, controller 36 computes at step 76 the total number of currently releasing and efficient feed conveyors 12. This total number is referred to as a usage level. At step 78, controller 36 computes an average of the last n usage levels previously calculated during prior iterations of step 78, where n is a number that may be varied substantially according to a desired implementation of speed control method 68. If method 68 has not yet repeated itself n times (such as during the initial start up of the merge subsystem 26), then controller 36 computes at step 78 the average of however many previous usage level calculations controller 36 has made during previous iterations (if any) of step 78.

At step 80, controller 36 computes an average of the last m usage levels, where m is a number less than n, and, like n, can be varied substantially according to the desired implementation of speed control method 68. Similarly, if method 68 has not yet repeated itself m times, then controller 36 computes at step 80 the average usage level from however many previous usage level calculations controller 36 has made at step 76. At step 82, controller 36 chooses the larger of the two averages computed at steps 78 and 80 and multiplies this larger average by a speed conversion factor. The particular value of the speed conversion factor will depend, in part, upon the range of speeds that the particular sortation conveyor 18 can operate at, or that it is desired to operate at. It will also depend upon the desired manner in which the operator of conveyor system 10 wants the speed control method to be implemented. Once the larger of the two averages has been multiplied by the speed conversion factor at step 82, controller 36 proceeds to step 84 where it adjust the speed of sortation conveyor 18 according to the product calculated at step 82. If sortation conveyor 18 is being controller by a controller other than controller 36, controller 36 can alternately send a speed control message to that other controller at step 84, and then the other controller can implement the speed change communicated in the speed control message.

Figure 6:
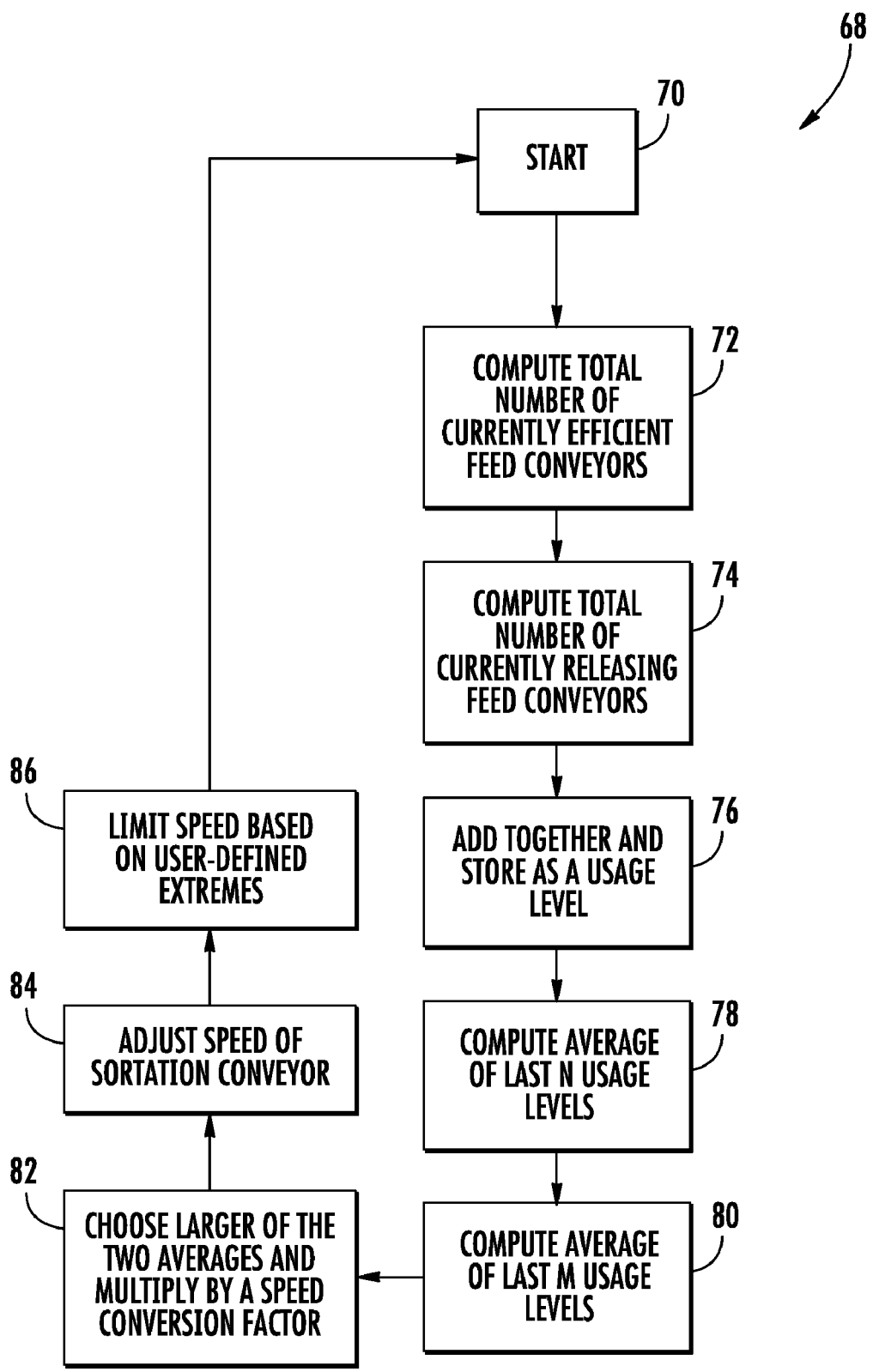
FIG. 6 is a flowchart of an automatic sortation speed control.

As will be discussed more below, speed control method 68 may also include an optional speed limiting step 86 (FIG. 6). If optional step 86 is included, controller 36 limits at step 86 the adjustments made to the sortation conveyor speed at step 84 such that they fall within an acceptable range of speeds for sortation conveyor 18. The acceptable range of speeds may be defined by a user setting the maximum and minimum speeds at which he or she wishes the sortation conveyor 18 to operate at, or a user setting one of these speeds (maximum or minimum) and the other being pre-set by the manufacturer or installer of the sortation conveyor 18, or having them both be pre-set. Other ways of defining the range of speeds are also possible.

Speed control algorithm 68 can be modified in a variety of different manners. For example, it may be modified to remove the calculation of two separate averages, instead using only a single average value of a usage level, or only the current value of the usage level (rather than an average value). Further, the usage level can be modified to be based on different factors besides the number of efficient and releasing feed conveyors 12. One such different factor could be the degree of article accumulation upstream of the feed conveyors wherein the usage level is equal to the number of feed conveyors 12 having at least a threshold amount of article accumulation upstream. Alternatively, the usage level could be based upon a degree of article accumulation at a location downstream of merge subsystem 26 and upstream of sortation conveyor 18. Still further, it could be based upon the amount or frequency of articles exiting merge conveyor 14. Still other factors could be used to calculate the usage level.

Speed control algorithm 68 could further be modified such that the speed adjustments made at step 84 occurred less frequently than controller 36 performed the other steps. Controller 36 thus might send out a new speed command more infrequently, thereby reducing the frequency of accelerations and decelerations undergone by sortation conveyor 18. In yet another alternative, speed control algorithm 68 could be modified such that after controller 36 completed step 76, it proceeded directly to step 82, where it multiplied the usage level computed at step 76 by the speed conversion factor. The resulting product could then be used to issue a speed command at step 84, or an average of a previous number of products computed at step 82 could be used to issue a speed command. Or still further, two averages of the product computed at step 82 could be taken in a manner similar to the two averages computed at steps 78 and 80 where the speed adjustment made at step 84 was based on the larger of the two averages.

The use of the greater of the two different averages in method 68 (or any of the modifications discussed above) causes sortation conveyor 18 to increase its speed relatively quickly in response to a growing usage level of merge subsystem 26 and decrease its speed relatively slowly in response to a decreasing usage of merge subsystem 26. This is due to the fact that when the usage level increases, the m average calculated at step 80 will be greater than the n average calculated at step 78 (due to the n average including older and slower values), and controller 36 will use the greater m average in making the speed adjustment. In contrast, when the usage level decreases, the n average will be greater than the m average because the n average will include older and faster values, and controller 36 will therefore adjust the speed of sortation conveyor 18 based upon the more slowly changing n average. To the extent it was desired to have sortation conveyor 18 slow down relatively quickly in response to a decreasing usage level of merge subsystem 26 and increase its speed relatively slowly in response to an increasing usage level of merge subsystem 26, speed control method 68 could be modified to choose the smaller of the two m and n average values at step 82. Still other variations are possible.

As was noted above, speed control method 68 could be further modified such that the speed adjustments made to sortation conveyor 18 at step 84 are limited at step 86 between a maximum acceptable speed and a minimum acceptable speed. For example, if it is desired to operate sortation conveyor 18 at a range of speeds that does not fall outside of, say 200-450 feet per minute, then method 68 would alter at optional step 86 the speed adjustments made at step 84 such that sortation conveyor 18 never ran slower than 200 feet per minute nor faster than 450 feet per minute. Thus, for example, if the larger average of steps 78 and 80 happened to be four, and the speed conversion factor was 150 feet per minute, the normally expected speed commanded at step 84 would be 600 (4×150). However, because of the limit of 450 feet per minute, controller 36 would respond at step 86 by limiting the speed target of 600 feet per minute (from step 84) to the maximum acceptable speed of 450 feet per minute.

Merge subsystem 26 can be modified such that the maximum and minimum speeds of sortation conveyor 18 can be input by a user of sortation system 10. In that manner, speed control algorithm 68 will simply make adjustments to the speed of sortation conveyor that are within the limits set by the user of sortation system 10. The manner in which a user may input these limits can be accomplished through any suitable human-machine interface, whether the interface communicates directly with controller 36, or indirectly.

It will be understood that the speed control algorithm 68 (and/or its modified versions discussed above) can be used either alone or in combination with merge method 38 discussed above (or any of the modifications to merge method 38 discussed above). That is, conveying system 10 may be constructed to only implement one or the other of these two methods, or it may combine both methods into the same system. Still further, the various modifications to each of the different methods (38 and 68) discussed herein can be combined in a single conveying system 10 in any manner desired. Speed control algorithm 68 and/or merge method 38 may also be combined with any one or more of the features discussed below.

It will also be understood that the methods and conveying systems disclosed herein are not limited to conveying systems that transport articles of any particular size or shape. While the accompanying drawings depict articles that are only square or rectangular in shape, this has been done only for purposes of illustration, and it will be understood that the conveying systems and methods disclosed herein are equally applicable for transporting articles having different shapes. It will also be understood that the systems and methods disclosed herein are applicable to a variety of different conveyor types, such as belt conveyors, roller conveyors, etc. Further, the type of sortation conveyor 18 can be varied and may include any known type of sortation conveyor, whether a linear sorter, such as, illustrated in FIGS. 1-3 and 5, or a carousel type sorter, or some other type of sorter. It will also be understood that, while not illustrated in FIGS. 2, 3, and 5, one or more of feed conveyors 12 may be fed by recirculation line 24, rather than conveyors that transport articles from an initiation or pick area of the facility.

Slug Building

Figure 7:
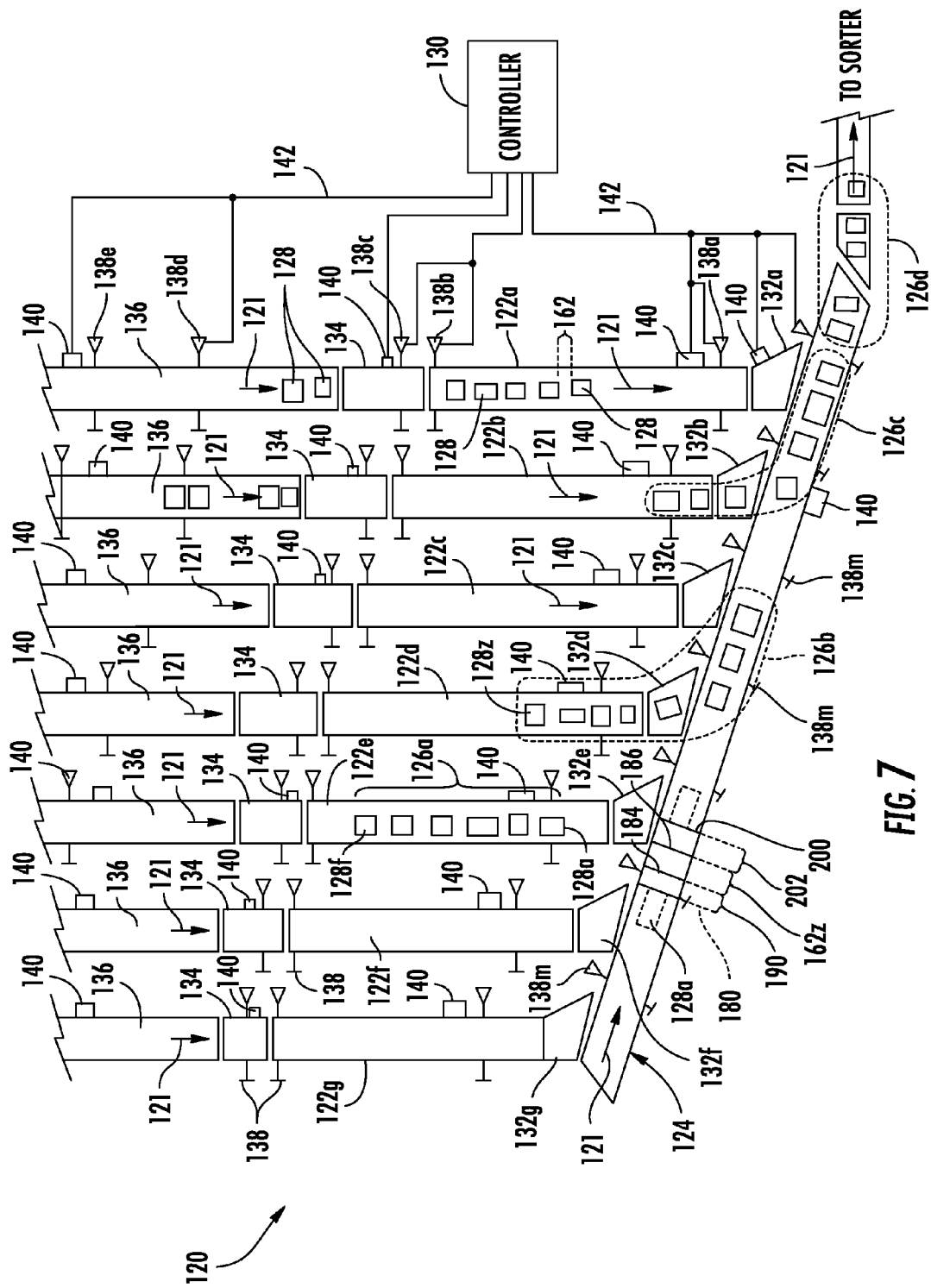
FIG. 7 is a plan view of another illustrative merge subsystem.

An example of another merge subsystem 120 that may include any of the previously mentioned embodiments, as well as the various embodiments and concepts discussed below, is depicted in FIG. 7. While merge subsystem 120 is being separately described from merge subsystem 26 described above, it will be understood that this is merely being done for purposes of illustrating and explaining the slug building and slug release concepts described below. These concepts may be combined into a single merge subsystem that includes the concepts discussed above with respect to merge subsystems 26a and b, or they may be implemented by themselves in a merge subsystem.

Merge subsystem 120 includes a plurality of feed conveyors 122 and a merge conveyor 124. Feed conveyors 122 intermittently feed slugs 126 of articles 128 onto merge conveyor 124, which then carries the articles to a downstream induct area, and thereafter to one or more sortation conveyors (such as, but not limited to, the induct and sortation areas shown in FIG. 7). The movement of articles on feed conveyors 122 and merge conveyor 124 is indicated by a plurality of arrows 121. In the following written description, the term "downstream" will refer to the direction defined by arrows 121, while the term "upstream" will refer to the direction opposite to arrows 121.

Each feed conveyor 122 may receive articles 128 from an adjacent upstream meter conveyor 134. An accumulation conveyor 136 may be positioned upstream of each meter conveyor 134 and adapted to accumulate articles thereon. The accumulated articles 128 on accumulation conveyors 136 are transferred via meter conveyors 134 onto feed conveyors 122 at appropriate times such that slugs 126 of articles are built up on the feed conveyors 122.

A controller 130 determines the order and timing of the feed conveyors' release of slugs 126 onto merge conveyor 124. The timing and order is carried out in a manner such that a generally continuous flow of articles is fed to the downstream induct area. The algorithm(s) controller 130 may use to determine which feed conveyor's slug 126 to release next may be any suitable algorithm, whether conventional or novel. That is, controller 130 may be the same as controller 36 discussed above, or it may be a controller that determines merge priority in a manner different from that described above. Controller 130 also may or may not be set to automatically adjust the speed of a downstream sortation conveyor, as discussed above with respect to method 68.

Merge subsystem 120 may optionally also include a plurality of wedge conveyors 132a-132g (FIG. 7) located in-between merge conveyor 124 and each of feed conveyors 122a-g. Wedge conveyors 132a-132g provide an angled junction between feed conveyors 122 and merge conveyor 124. The use of wedge conveyors 132 may be desirable in certain situations, but is not absolutely necessary. Further, the shape, design, and configuration of wedge conveyors 132 may be varied from that illustrated in FIG. 7. Also, additional conveyors may be interposed between feed conveyors 122 and merge conveyor 124, if desired.

The layout of merge subsystem 120 depicted in FIG. 7 is intended to illustrate one of the many possible layouts of a merge subsystem in which one or more aspects of the present invention may be incorporated. The various aspects of the present invention can be incorporated into conveyor systems having merge subsystem layouts modified substantially from that shown in FIG. 7, including, but not limited to, conveying systems having different numbers, locations, shapes, and configurations of feed conveyors 122, merge conveyors 124, wedge conveyors 132, meter conveyors 134, and accumulation conveyors 136.

As mentioned, merge subsystem 120 may be controlled by a controller 130, which may be a conventional programmable logic controller, a Personal Computer (PC), a plurality of distributed circuit boards with appropriate electronic circuitry, a combination of any of these items, or any other suitable electrical or electronic structure suitable for carrying out the control logic described herein. Controller 130 is in communication with a plurality of sensors, such as, but not limited to, photoeyes 138 and/or pulse-position indicators (not shown). The pulse-position indicators, which may be conventional pulse-position indicators, provide a pulse every time a conveyor advances a known distance, thereby enabling a controller, such as controller 130, to sum the pulses and to determine from the sum how far a particular conveyor has advanced downstream.

Controller 130 is also in communication with a plurality of motor controllers 140 for controlling the various feed conveyors 122, merge conveyor 124, wedge conveyors 132, meter conveyors 134, and accumulation conveyors 136 positioned upstream of the meter conveyors 134. This communication may be accomplished by any suitable wired or wireless technique. FIG. 7 depicts a plurality of wires 142 connecting controller 130 to several of the photoeyes 138 and motor controllers 140. For purposes of clarity, only the wires 142 connecting controller 130 to photoeyes 138 and motor controllers 140 that are used with the most downstream accumulation conveyor 136, meter conveyor 134, feed conveyor 122*a* and wedge conveyor 132*a* are shown, and none of the wires connecting controller 130 to the pulse-position indicators are shown, nor any of the other sensors used to determine how far a particular conveyor has advanced. Additional wires 142 would connect controller 130 to the other photoeyes 138, motor controllers 140, and other sensors and/or actuators necessary to carry out the various aspects of the present invention, as would be known to one skilled in the art in light of the description below. Further, the wiring illustrated in FIG. 7 is but one manner in which the necessary connections can be made to controller 130, and many variations are possible. Instead of a wire 142 running from controller 130 to each individual sensor, actuator, or other component, one or more of the wires 142 may be replaced by network connections, electrical busses, or other suitable communication media that consolidate communications from multiple entities onto a single, or fewer, communication media. Other variations are also possible.

In operation, merge subsystem 120 delivers slugs 126 of articles from feed conveyors 122 onto merge conveyor 124 in a controlled manner such that articles 128 from each of the feed conveyors 122 are merged onto merge conveyor 124 in a single file manner. Generally speaking, merge subsystems 120 will wait to release a particular feed conveyor 122 until the size (i.e. length) of the slug 126 on the particular feed conveyor 122 has reached a minimum threshold size. Thereafter, the feed conveyor 122 will be a candidate for release. If additional articles 128 are available upstream of the particular feed conveyor 122, controller 130 may continue to add articles to the slug 126 until it reaches a maximum size, or it may release the slug onto merge conveyor 124 before the slug reaches its maximum size. Once a slug has reached its maximum size, no further articles are added to the slug and the particular feed conveyor 122 on which the slug is positioned remains idle until controller 130 releases it.

Figure 9:
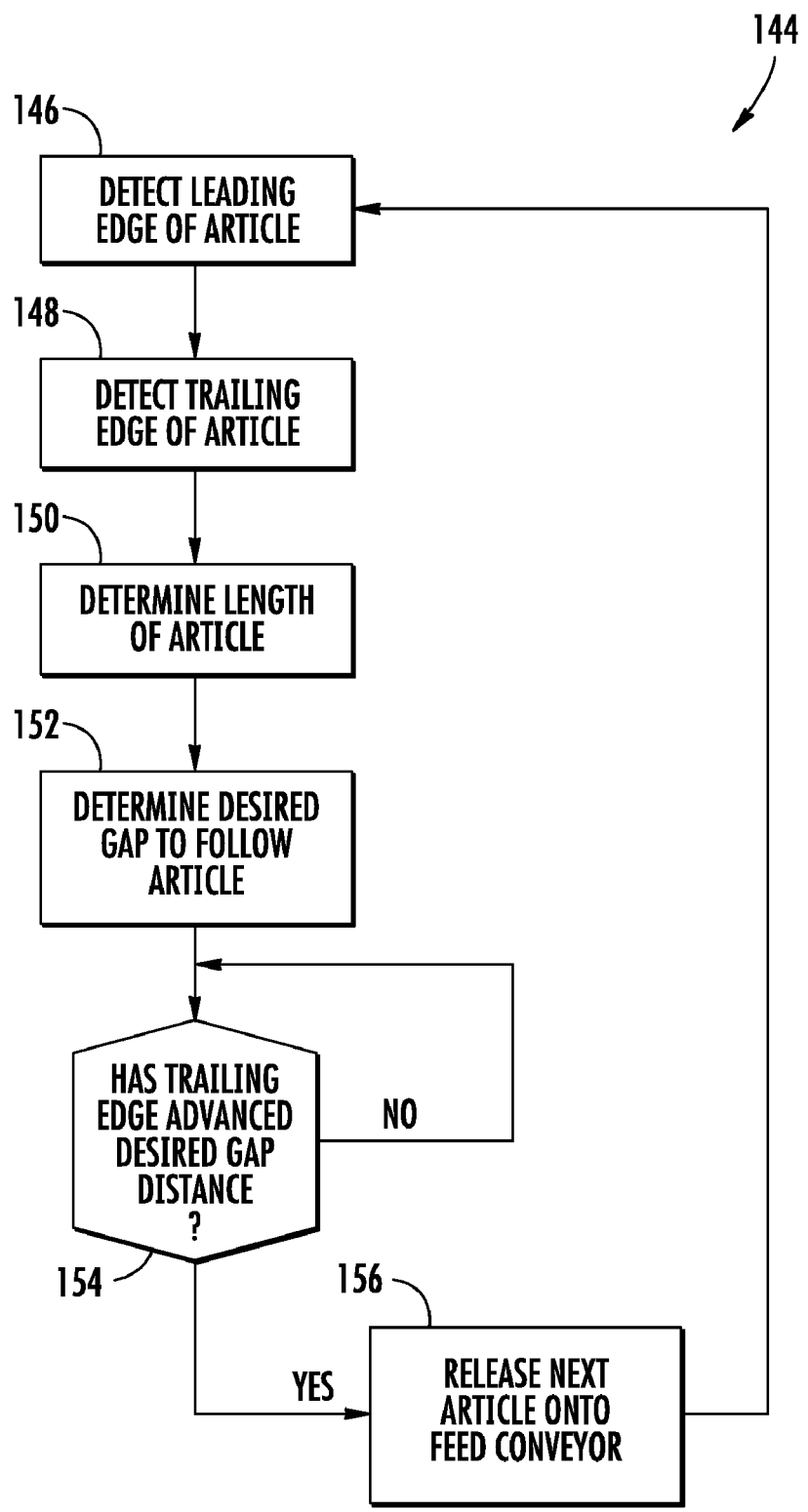
FIG. 9 is a flowchart of a slug building method.

According to one aspect of the present invention, a method for building slugs 144 is provided (FIG. 9). Method 144 is carried out by controller 130 and causes feed conveyors 122 and meter conveyors 134 to operate in such a manner so as to create gaps between the articles 128 within a given slug 126 while the slug is on one of the feed conveyors 122. The gaps that are created may be gaps of fixed length, or they may be gaps having variable lengths. The size (e.g. length) of the gaps may be zero, or it may be non-zero. If the gaps have variable lengths, the lengths may be based, either wholly or partially, upon the length of one or both or the adjacent articles between which the gap is defined.

Referring to FIG. 9, slug building method 144 begins at a step 146 where controller 130 utilizes photoeye 138*b* (FIGS. 7 and 8) to detect a leading edge 158 of an article 128 as the article enters onto feed conveyor 122. Controller 130 then proceeds to step 148 (FIG. 9) where it detects a trailing edge 160 of the same article via photoeye 138*b*. During the interim between steps 146 and 148, controller 130 keeps track of the distance feed conveyor 122 has advanced. This distance may be monitored by a pulse-position indicator (not shown) whose output is communicated to controller 130, by a speed sensor and timer that informs controller 130 of the speeds at which feed conveyor 122 is operating and the time spent at each speed (from which controller 130, or another controller, can calculate a distance), or any other suitable sensor or combination of sensors. By monitoring the distance advanced by feed conveyor 122 in the interim between steps 146 and 148, controller 130 is able to calculate a length of the article at step 150. Step 150 is an optional step, as will be discussed more below. The length of the article is determined at step 150 to be equal to the distance feed conveyor 122 has advanced between the time its leading and trailing edges 158 and 160 are detected. Other methods of determining the length of the article are also possible, including determining the length of the article at locations other than the illustrated location of photoeye 138*b*.

At step 152, controller 130 determines the size (i.e. length) of a gap 162 (FIG. 8) that is to follow behind the article whose length it has just determined at step 150. Step 152 is an optional step that is only utilized if the size of gaps 162 is to be varied. In one embodiment, method 144 uses a constant size for gaps 162, and thus there is no need to determine a gap size at step 152 because the gap size has already been determined and fixed. In the embodiment illustrated in FIG. 9, however, method 144 allows for the possibility of a variable sized gap 162 to be created between articles 128, and thus controller 130 determines a size for the variable gap 162 at step 152.

When method 144 is implemented to create variable sized gaps 162 between articles, controller 130 may determine the variable size of the gap based on any suitable parameter or parameters. One common parameter is the length of one or both of the two articles that surround and define the gap 162. For example, in the arrangement of articles depicted in FIG. 8, the size of gap 162*a* may desirably be based upon the length of either article 128*a* or article 128*b*, or some combination of the lengths of both articles 128*a* and 128*b*. Typically, the use of article lengths for determining the size of variable gaps 162 between articles is based upon the particular sortation conveyor that is downstream of merge conveyor 124 and the induct area (see, e.g. FIG. 1). As is known in the art, sortation conveyors typically operate better when they process articles having certain minimum gaps between the articles wherein the minimum gaps are often dependent upon the length of the articles being sorted. Further, because the throughput of the sortation conveyor generally decreases as the gaps increase, it is often desirable to feed the sortation conveyor with articles that are gapped large enough for the sorter to operate optimally, but not any greater.

Controller 130 may therefore create variable-sized gaps 162 between the articles arriving on feed conveyors 122 that vary in accordance with the specifications of the one or more sortation conveyors located further downstream. In creating these variable-sized gaps 162 between the articles on feed conveyors 122, controller 130 may take into account any changes in gap size that will be introduced by any of the components of the conveying system prior to the articles arriving at the induct area or the sortation conveyor.

For example, controller 130, when creating variable-sized gaps between articles 128 on feed conveyors 122, may take into account changes to the size of those gaps that will be caused by the articles' transition onto wedge conveyor 132 and merge conveyor 124. In some configurations, controller 130 may operate wedge conveyors 132 at a higher speed than feed conveyors 122 (such as at a fixed ratio, although other variations are possible), and merge conveyor 124 may operate at an even higher speed than wedge conveyors 132. Consequently, when an article traverses the junctions between these conveyors, the gaps between the articles will increase. Controller 130 may be configured to take into account these increases in gap size by creating smaller gaps 162 on feed conveyors 122 which will be expanded during the articles' transitions across wedge conveyors 132 and onto merge conveyor 124, or at other locations.

While controller 130 may determine the desired gap size at step 152 in any manner, one such manner may involve the consultation of a table stored in a memory accessible by controller 130. Such a table would correlate desired gap sizes with measured article lengths, or whatever other parameter or parameters that were utilized in determining the length of the gap 162. Such a table may be constructed by the designers of the particular conveying system and may take into account the needs of the particular sortation conveyor, any changes that will be made to the gap size at various conveyor junctions, and/or any other conditions that may be useful to utilize when determining the appropriate gap size for articles on feed conveyors 122. As one alternative, the desired gap size determined at step 152 could be based on one or more formulas that take into account dynamic conditions of one or more aspects of the conveying system. Other alternatives are also possible.

At step 154 (FIG. 9), controller 130 determines whether the feed conveyor 122 has advanced the trailing edge of the last article it received a distance that is equal to the desired gap distance. If conveyor 122 has not advanced the trailing edge of the article this far, controller 130 returns to step 154 and repeats step 154 at a slightly later moment. The amount of time controller 130 waits between repeating step 154 can be varied, but may advantageously be less than a second, and, in cases where controller 130 is a PLC, it may be approximately equal to the scan time of the PLC. Controller 130 will keep repeating step 154 until feed conveyor 122 has advanced the particular article onto feed conveyor 122 a distance equal to the desired gap. As was described above, controller 130 may determine how far the trailing edge of the article has advanced in any suitable manner, such as through the use of a pulse-position indicator, photoeyes (such as photoeye 138*b*), and/or other means.

In carrying out step 154, the distance controller 130 is monitoring is the distance of the trailing edge 160 of the article from an upstream edge 163 (FIG. 8) of the feed conveyor 122. If photoeye 138*b* is used in monitoring this distance, and photoeye 138*b* is not positioned right at the upstream edge 163 of feed conveyor 122, then controller 130 would advantageously be configured to take into account the distance photoeye 138*b* is located from the upstream edge 163 of feed conveyor 122. Controller 130 could then monitor the amount of feed conveyor advancement that occurs after the trailing edge 160 of the article passes by photoeye 138*b* and when that advancement equaled an amount equal to the desired gap size minus the distance of photoeye 138*b* from the upstream edge 163 of feed conveyor 122, controller 130 would proceed to step 156.

Regardless of the precise manner in which controller 130 carries out step 154, it causes the release of another article 128 onto the upstream end of feed conveyor 122 at the moment when the current upstream-most article on conveyor 122 has advanced a distance equal to the desired gap size from the upstream edge 163 of conveyor 122. In this manner, the next article fed onto the upstream end of feed conveyor 122 will be spaced behind the adjacent downstream article a distance that is equal to the desired gap size. Controller 130 releases the next article onto feed conveyor 122 by controlling meter conveyors 134 and/or accumulation conveyors 136 in the appropriate manner, as would be known to one skilled in the art.

Indeed, the release of the next article onto feed conveyor 122 at step 156 may be carried out in a wide variety of different manners, as would be known to one skilled in the art. For example, meter conveyor 134 might be controlled to allow multiple articles on its conveying surface such that after its most downstream article was deposited onto feed conveyor 122, meter conveyor 134 was advanced such that the leading edge 158 of the next article reached the downstream edge of meter conveyor 134. Once there, meter conveyor 134 would stop until controller 130 reached step 156, at which point it would accelerate to deliver the next article onto feed conveyor 122. Meter conveyor 134 would then continue to accelerate and decelerate as necessary to deliver articles to feed conveyor 122 at the appropriate moments. Alternatively, meter conveyor 134 could run without stopping and the flow of articles to feed conveyor 122 could be carried out by suitable acceleration and deceleration of the downstream section of accumulation conveyor 136. Other manners for releasing the next article onto feed conveyor 122 at step 156 are also possible.

After step 156, controller 130 returns to step 146 and repeats method 144, starting again at step 146 where it detects the leading edge of the article that was just released onto feed conveyor 122 at step 156. Thereafter, controller 130 proceeds through method 144 in the same manner as has been described above. Method 144 is carried out for each feed conveyor 122 in the merge subsystem 120, and controller 130 is advantageously configured to carry out method 144 for each feed conveyor 122 simultaneously, or nearly simultaneously, such that multiple slugs of articles with appropriately sized gaps between articles can be built up on any or all of the feed conveyors 122 at the same time.

In summary, method 144 causes controller 130 to accept an article onto the upstream end of a feed conveyor 122 and thereafter advance the article downstream a distance equal to the desired gap size. When the feed conveyor 122 has advanced this distance, feed conveyor 122 accepts another article at its upstream end. This process continues until a slug of articles is built up on the feed conveyor. If another article is not ready for release onto feed conveyor 122 at the moment of step 156, feed conveyor 122 may stop and wait until another article becomes ready for release. In carrying out method 144, controller 130 may be configured to take into account the acceleration and deceleration times of feed conveyors 122, meter conveyors 134, and/or accumulation conveyors 136, as appropriate, such that the next article delivered to the upstream end of feed conveyor 122 will arrive at the desired moment and be positioned upstream of the adjacent downstream article a distance equal to the desired gap.

In carrying out method 144, controller 130 may use an open loop control scheme, or a closed loop control scheme, or some combination of the two. If a closed loop control scheme is used, it may adjust one or more of the speeds of feed conveyors 122, meter conveyors 134, and/or accumulation conveyors 136 such that the next article to be delivered to feed conveyor 122 arrives at the desired distance behind the adjacent downstream article on feed conveyor 122.

Slug Release

After controller 130 has built up a slug 126 of suitable length on a particular feed conveyor 122, the particular feed conveyor 122 becomes a candidate for having its slug released onto merge conveyor 124. As noted, the algorithm or algorithms used by controller 130 to determine when and which feed conveyor 122 to release can be varied, and any suitable algorithm or algorithms may be used. When controller 130 causes a particular feed conveyor 122 to release its slug of articles onto merge conveyor 124, it may use a slug release method 164 according to another aspect of the present invention.

Figure 8:
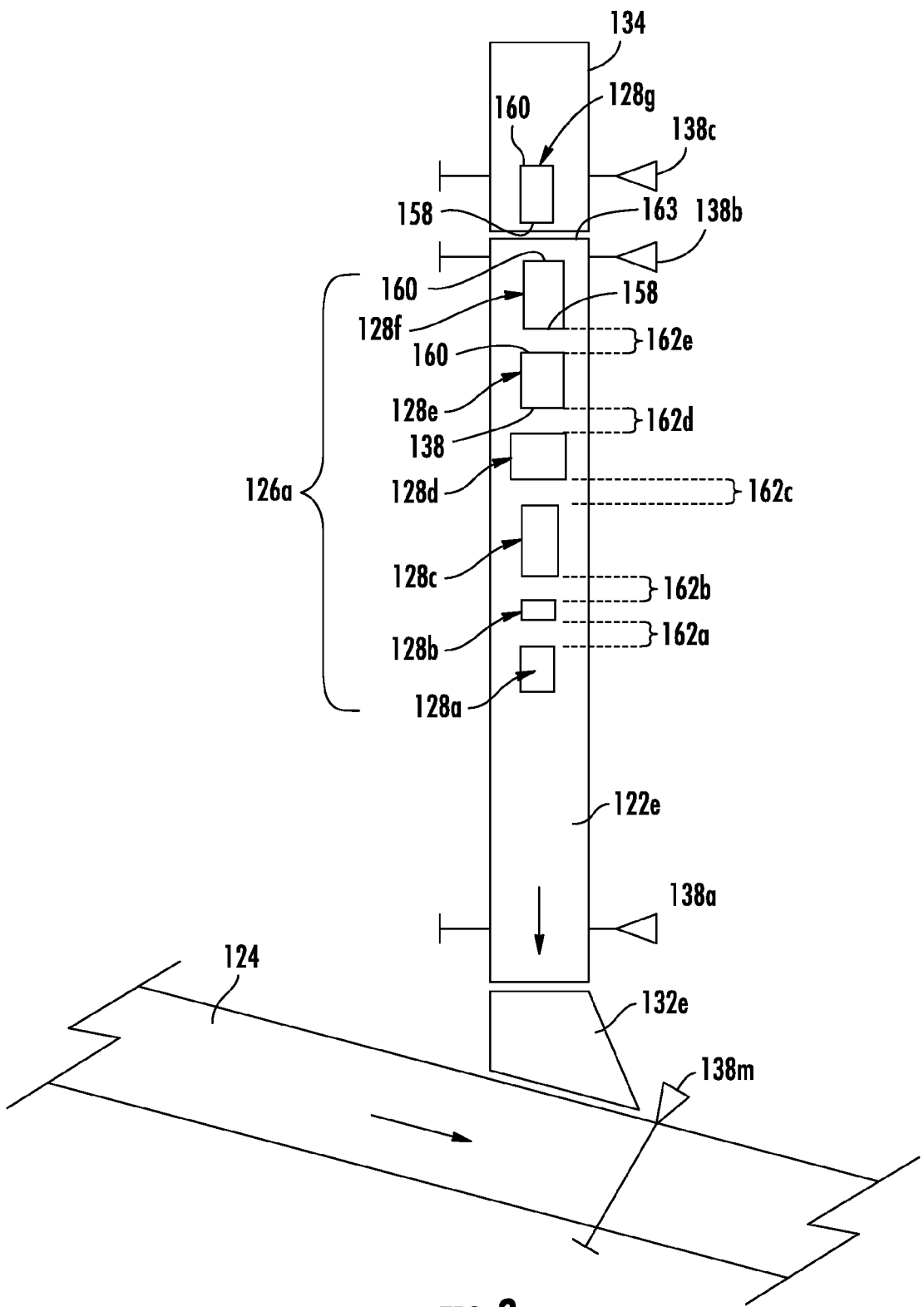
FIG. 8 is a plan view of a portion of the subsystem of FIG. 7; namely, a feed conveyor, a wedge conveyor and a merge conveyor.
Figure 10:
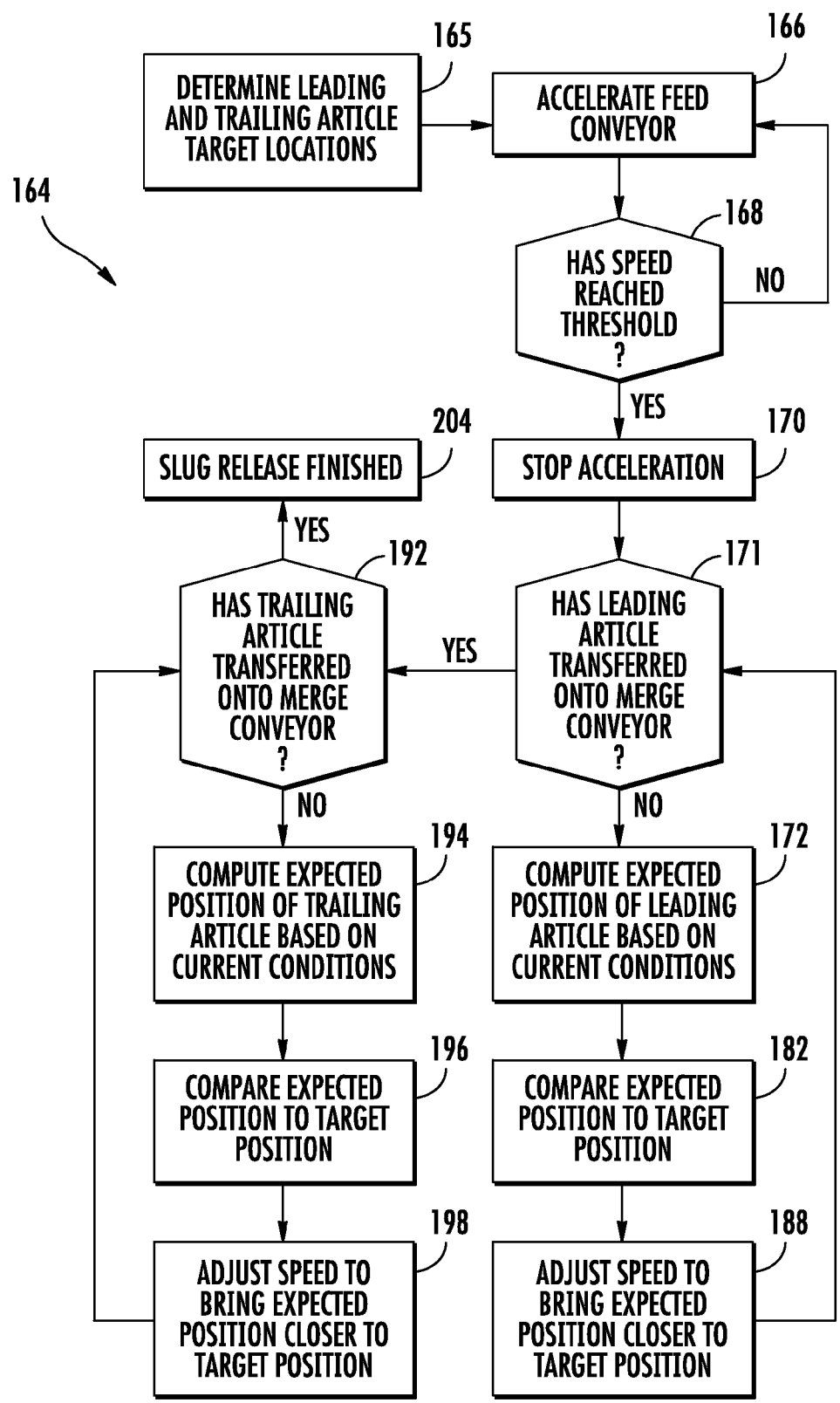
FIG. 10 is a flowchart of a slug release method.
Figure 11:
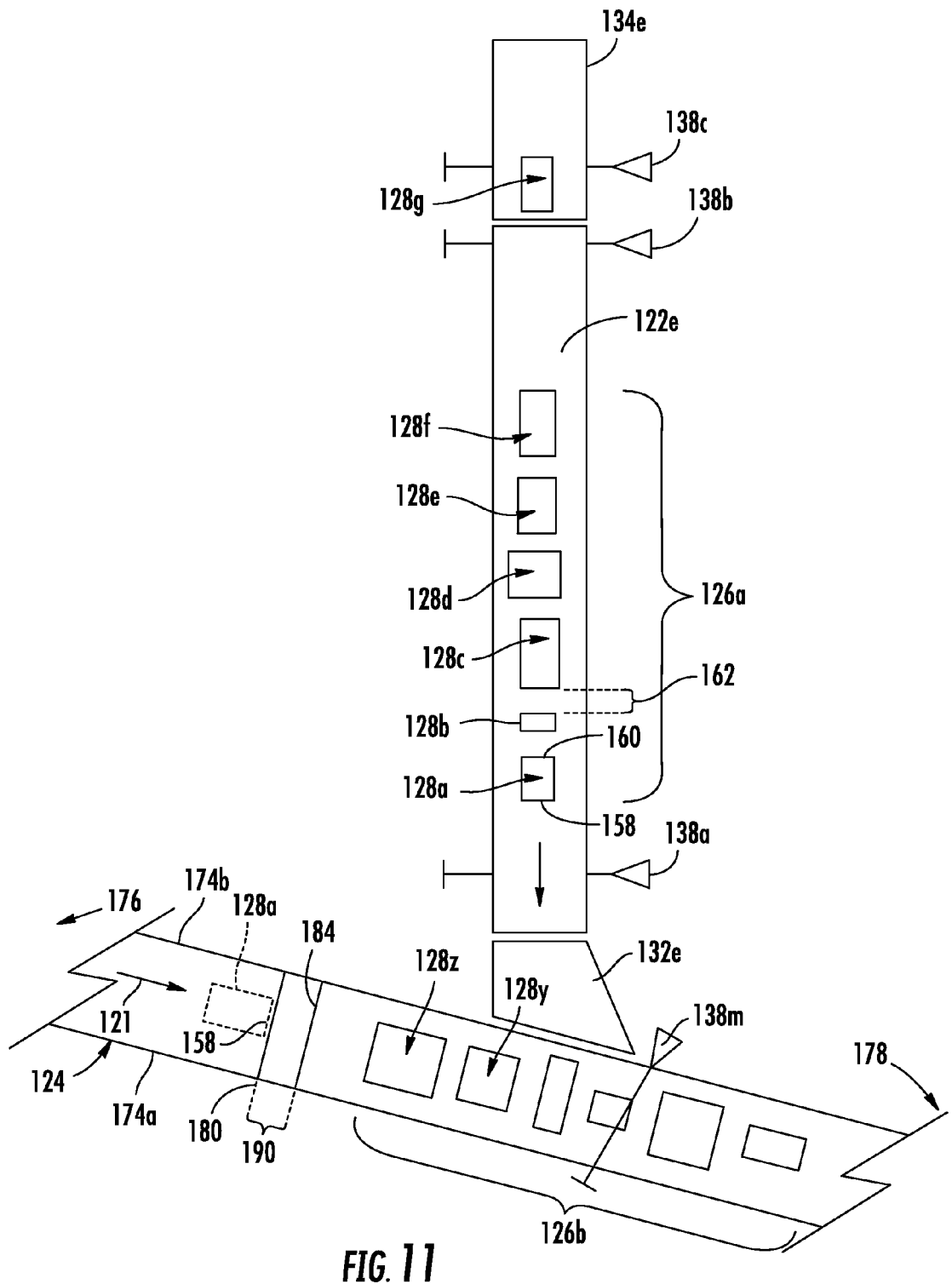
FIG. 11 is a plan view of the feed conveyor, wedge conveyor and merge conveyor of FIG. 8 shown at a moment in time subsequent to that depicted in FIG. 8.

Slug release method 164 is illustrated in block diagram form in FIG. 10. Slug release method 164 may be used in combination with any one of slug building method 144, slug release timing method 38, or speed control method 68, or it may be used separately from any one or more of these methods. When used separately from slug building method 144, slug release method 164 may be used to release slugs 126 that have little or no gaps 162 between the articles 128. In other words, slug release method 164 may release slugs of articles 128 that are gapped, such as is illustrated in FIGS. 7, 8 and 11, or it may release slugs of articles that have zero gap between the individual articles within the slug. Still further, it may be used to release slugs of articles in which some slugs have gaps between their individual articles and some do not, and/or where some of the articles within a particular slug have gaps and some do not. In sum, slug release method 164 can be implemented regardless of the gapping characteristics of the slugs. Further, slug release method 164 can be implemented in conjunction with, or separately from, methods 38 and 68. While slug release method will be explained below with respect to several figures (e.g. FIGS. 7, 8, and 11) that depict slugs 126 having gaps 162 between articles, it will be understood that this illustrated gapping is not a required component of slug release method 164.

Slug release method 164 begins at an initial step 165 where controller 130 determines a leading article target position 184 (FIG. 11) and a trailing article target position 186 (FIG. 12) on merge conveyor. Leading and trailing article target positions 184 and 186 refer to the positions on merge conveyor 124 of the leading and trailing articles of a slug, respectively, at which the leading and trailing articles are expected to arrive. More specifically, target positions 184 and 186 refer to the expected arrival positions of the leading and trailing articles as determined at the moment of the slug's release (or just prior to the release). Leading and trailing target positions 184 and 186 are calculated based upon the positions of the leading and trailing articles on feed conveyor 122 at the time of slug release, as well as the known speed profiles of feed conveyor 122 and wedge conveyor 132. Thus, controller 130 calculates where the leading and trailing articles of a slug will arrive on merge conveyor 124 at the very moment a slug is first released. These calculations, as noted, take into account the known speed profiles of feed conveyors 122 and wedge conveyors 132.

The known speed profiles refer to the expected accelerations of feed conveyors 122 and wedge conveyor 132, including the rate of these accelerations. The known speed profiles also take into account the current positions of the leading and trailing articles on feed conveyor 122, the current distance of these articles from the downstream end of feed conveyor 122, the length of wedge conveyor 132, and any other factors that may be useful for determining the expected arrival positions of the leading and trailing articles on merge conveyor 124.

While other speed profiles are possible, one embodiment of the present utilizes a speed profile in which, at the moment a slug 126 is released, feed conveyor 122 accelerates at a constant rate toward a known threshold speed. Once that known threshold speed is achieved, feed conveyor 122 ceases acceleration and maintains the threshold speed until the slug 126 has exited off of feed conveyor 122 and the adjacent wedge conveyor 132. Thereafter, the speed of feed conveyor 122 is adjusted in order to build up the next slug of articles. The speed adjustments made to build up the next slug of articles are not part of the speed profile since these do not affect the position of the slug that just departed from feed conveyor 122 and wedge conveyor 132. For purposes of illustrating various aspects of the present invention, the following description of slug release method 164 will assume, unless otherwise explicitly stated, that the aforementioned speed profile is used by feed conveyors 122 and wedge conveyors 132, although it will be understood that the embodiment may be varied.

The threshold speed to which feed conveyor 122 is accelerated upon releasing a slug of articles can be set to any desirable speed, and in one embodiment may be set to a speed that is slightly less than the speed of merge conveyor 124. For example, in one embodiment, the threshold speed of feed conveyors 122 can be set to be about eighty percent of the speed of merge conveyor 124. Other threshold speeds, of course, can be used.

During the release of a slug from a feed conveyor 122, the speed of the adjacent wedge conveyor 132 may be controlled to be the same as that of the upstream, adjacent feed conveyor 122, or the speed may be controlled to be different. Further, the ratio between the speeds of any particular feed conveyors 122 and its adjacent wedge conveyor 132 may be variable or it may be fixed. In at least one embodiment, wedge conveyors 132 operate at a speed that is greater than the speed of feed conveyors 122 by a fixed ratio, but less than the speed of merge conveyor 124. Thus, in one embodiment, if feed conveyor 122 had a threshold speed of, say, eighty percent of the speed of merge conveyor 124, wedge conveyor 132 might be set to operate at a speed of ninety percent of the speed of merge conveyor 124, although other speeds could be used.

Regardless of the particular speed settings of feed conveyors 122, wedge conveyor 132, and merge conveyor 124, controller 130 is in communication with suitable sensors to know the speeds of each of these conveyors and to use the speed information in the appropriate manner for carrying out the control steps described herein. For purposes of the following description, it will be assumed, unless otherwise explicitly stated, that wedge conveyors 132 are controlled to operate at a speed that is a fixed ratio of the speed of the upstream feed conveyor 122. Consequently, any changes made by controller 130 to the speed of a feed conveyor 122 will likewise be made, multiplied by the fixed ratio, to the adjacent downstream wedge conveyor 132.

FIG. 11 illustrates an example of a slug 126*a* being released from a feed conveyor 122*e* according to method 164. Slug 126*a* is being released such that it will follow behind a slug 126*b* already positioned on merge conveyor 124. As can be seen in FIG. 11, target position 184 for leading article 128*a* is located on merge conveyor 124 at a position upstream of a trailing article 128*z* of slug 126*b*. Controller 130, as noted, calculates leading target position 184 at step 165 at the moment slug 126*a* is going to be released. Further, as can be seen in FIG. 11, leading target position 184 is identified as a line extending across merge conveyor 124 in a direction perpendicular to a direction of conveyance indicated by arrow 121. Leading target position 184 identifies a longitudinal position on merge conveyor 124. That is, leading target position 184 identifies a particular location along the longitudinal axis of merge conveyor 124 (i.e. an axis extending from the upstream end 176 to the downstream end 178 of merge conveyor 124 in a direction parallel to sides 174*a* and *b* of merge conveyor 124). The reference point along this axis from which the leading target position 184 is calculated can be chosen to be any suitable point.

The line illustrated in FIG. 11 corresponding to leading target position 184 may correspond to the target location of any particular part of the leading article 128*a*. That is, leading target position 184 may identify the target position for the leading edge 158 of article 128*a*, the trailing edge 160 of article 128*a*, the center of article 128*a*, or some other portion of article 128*a*. For purposes of the following description, it will be assumed that leading target position 184 refers to the target position for the leading edge 158 of article 128*a* (or, if referring to a slug other than slug 126*a*, the leading edge of whatever the leading article is in that slug).

At step 166 (FIG. 10), controller 130 accelerates the feed conveyor 122 that is being released. At step 168, controller 130 checks to see if the speed of the accelerated feed conveyor 122 has reached the threshold speed. This threshold speed is the same threshold speed discussed above with respect to the speed profile. That is, the threshold speed may be set to any suitable speed, but at least in one embodiment, the threshold speed is set to a value that is slightly less than the speed of merge conveyor 124, such as a speed that is eighty percent of merge conveyor 124's speed. If controller 130 determines at step 168 that feed conveyor 122 has not yet attained the threshold speed, it returns to step 166 where it continues to accelerate the feed conveyor, and cycle through steps 166 and 168, as necessary, until feed conveyor 122 reaches the threshold speed. Once controller 130 determines that feed conveyor 122 is traveling at the threshold speed, it proceeds to step 170 where it stops accelerating feed conveyor 122 and maintains feed conveyor 122 at the threshold speed (subject to subsequent speed adjustments that may be made, as discussed below).

While the speed of feed conveyors 122 may be controlled in any suitable manner, one suitable implementation of feed conveyors 122 utilizes variable frequency drives (VFD) for driving the conveying surface of feed conveyors 122. Such VFDs may be driven by associated VFD motor controllers (not shown). When feed conveyors 122 are controlled by VFD motor controllers, controller 130 may control the speed of the feed conveyor 122 by issuing high level speed commands to the VFD motor controller, rather than the low level signals that would otherwise be required were controller 130 to directly control the variable frequency motor of the feed conveyor 122. The high level speed commands may simply contain a desired speed at which the feed conveyor should operate, leaving the VFD motor controller to issue the low-level signals to the VFD necessary to implement the commanded speed.

When utilizing some VFD motor controllers, it has been found that issuing a speed command to the VFD motor controller causes the VFD motor to approach the commanded speed in an asymptotic manner. That is, as the feed conveyor 122 accelerates toward the commanded speed, its rate of acceleration decreases as it nears the commanded speed, causing the feed conveyor 122 to gradually approach the commanded speed. Such asymptotic approaches to the commanded speed delay the amount of time it takes for the feed conveyor 122 to reach the commanded speed. If such delays are not desired, controller 130 can be configured to issue a speed command that is higher than the threshold speed, and then implement the speed monitoring of steps 166 and 168. By issuing a speed command higher than the threshold speed, the speed of feed conveyor 122 may reach the threshold hold speed more quickly than it otherwise would have had controller 130 issued a speed command equal to the threshold speed.

Regardless of the command, or commands, that controller 130 may transmit to the motor controller for feed conveyor 122, controller 130, as noted, terminates the acceleration of the feed conveyor 122 at step 170. Thereafter, controller 130 makes adjustments, as appropriate, to the speed of feed conveyor 122 (and wedge conveyor 132, if so configured) in a closed-loop manner that attempts to cause the slug of articles to be delivered onto merge conveyor 124 in positions that match the trailing and leading targets 184 and 186, respectively, as will be discussed in more detail below.

At step 171, controller 130 determines whether or not leading article 128*a* has transferred onto merge conveyor 124. If it has, controller 130 proceeds to step 192 and takes further action that will be discussed in more detail below. If leading article 128*a* has not yet transferred onto merge conveyor 124, then controller 130 proceeds to step 172.

At step 172, controller 130 computes the expected position 180 of the slug's leading article on merge conveyor 124. Expected position 180 may, like target positions 184 and 186, refer to a longitudinal location on merge conveyor 124 that identifies the expected position of a portion of article 128*a* on merge conveyor 124, such as the leading edge, trailing edge, center, or other portion of article 128*a*. In the example of FIG. 11, a dashed box corresponding to the outline of article 128*a* is illustrated on merge conveyor 124. This dashed box is labeled 128*a* and refers to the location on merge conveyor 124 at which article 128*a* is expected to be delivered. As can be seen, expected position 180 corresponds to the leading edge 158 of article 128*a*. For purposes of the following description, expected position 180 will refer to the expected position of the leading edge of the leading article with a particular slug.

The expected position 180 for leading article 128*a* is calculated based on the then current conditions relevant to leading article 128*a*'s position and speed. In other words, the calculation of expected position 180 takes into account, and uses the same criteria, as the calculation of leading target position 184. The difference between the calculations of leading target position 184 and expected position 180 is the timing of the calculations. Leading target position 184 was calculated right before, or at the moment of, the release of the article slug. Expected position 180 is calculated after the feed conveyor 122 has accelerated to the threshold speed. Were feed conveyors 122's actual acceleration to perfectly match the anticipated accelerated that was used during the calculation of leading target position 184, expected position 180 and leading target position 184 would not differ. However, because of various different factors, such as the varying loads on feed conveyor 122 varies, the responsiveness of the motor for feed conveyor 122, etc, expected position 180 may very well differ from target position 184.

After controller 130 has calculated the expected position of article 128*a* at step 172, controller 130 proceeds to determine, at step 182, the difference, if any, between the expected position 180 of article 128*a* on merge conveyor 124 and leading target position 184. This difference represents an error value 190 (FIG. 11). Error value 190 can, of course, be a zero value, in which case the expected position 180 of article 128*a* on merge conveyor 124 is equal to the leading target position 184 for article 128*a*. However, in the example illustrated in FIG. 11, error value 190 has a non-zero value. More specifically, in the example illustrated in FIG. 11, controller 130 would determine that article 128*a* is expected, at the moment shown and based on its current speed profile, to be delivered to merge conveyor 124 too far upstream on merge conveyor 124.

At step 188 (FIG. 10), controller 130 adjusts the speed of the releasing feed conveyor 122 if error value 190 is not zero. The adjustment may be based on any form of closed-loop control, such as an adjustment based on a proportional feedback controller, an integral feedback controller, a derivative feedback controller, or any combination or subcombination, including a P-I-D controller (proportional, integral, derivative). The adjustment is intended to change the speed of the releasing feed conveyor 122 (and/or wedge conveyor 132) in such a way as to bring the expected position 180 closer to leading target position 184. Thus, for example, in the situation illustrated in FIG. 11, where leading article 128a has an expected position 180 upstream of leading target position 184, controller 130 would increase the speed of feed conveyor 122 (and/or wedge conveyor 132), in order to deliver article 128a to wedge conveyor 124 sooner (and thus at a more downstream location on merge conveyor 124).

After controller 130 has made the appropriate speed adjustment at step 188, it returns to step 171, where it determines whether or not the leading article has transferred onto merge conveyor 124. If it has not, controller 130 proceeds to step 172 again, where it re-calculates the expected position 180 of the leading article based on the then-current conditions (including the prior speed adjustment made at step 188). This newly calculated expected position 180 should be closer to leading target position 184 than the previously calculated expected position (although, even if it isn't, controller 130 still proceeds to step 182). At step 182, controller 130 compares the newly calculated expected position 180 to the leading target position 184 and computes a new error value 190. Based on the new error value 190, an appropriate speed adjustment, if any, is then made at step 188 in the same manner as has been previously described. From step 188, controller 130 returns to step 171 again.

The closed-loop cycle of calculating new error values 190 and implementing appropriate speed changes continues via steps 172, 182, and 188 for as long as the speed changes will continue to impact the leading article's eventual position on merge conveyor 124. That is, once the leading article arrives on merge conveyor 124, any speed changes made to either feed conveyor 122 and/or wedge conveyor 132 will no longer alter the position of the leading article. Consequently, controller 130 repeatedly checks at step 171 to see if the leading article has transferred onto merge conveyor 124 and, if it has, discontinues the close-loop speed adjustments of steps 172, 182, and 188. It should be noted that when feed conveyors 122 and wedge conveyors 132 are configured such that the speed of the wedge conveyor 132 is a fixed ratio of that of its upstream feed conveyor 122, then the speed adjustments made to feed conveyor 122 at step 188 will automatically result in corresponding speed adjustments made to the adjacent wedge conveyor. Further, controller 130 will tale into account the speed of wedge conveyor 132 (along with the time the leading article will spend on wedge conveyor 132) when calculating both expected position 180 and target position 184, and when implementing any necessary speed adjustments at step 188.

Method 164, however, can be modified such that feed conveyors 122 and their adjacent wedge conveyors 132 operate at speeds that are not fixed ratios of each other. With such a modification, controller 130 would take into account the various speeds of each conveyor 122 and 134, as well as the position of the leading article vis-a-vis these two conveyors, and any speed adjustments made at step 188 could be limited to only that conveyor (122 or 134) on which the leading article was currently positioned.

When controller 130 determines at step 171 that the leading article has arrived on merge conveyor 124, it proceeds to step 192. At step 192, controller 130 determines whether the trailing article in the slug being released (article 128f in the FIGS. 11 and 12 example), has yet been transferred onto merge conveyor 124. If it has not, controller 130 proceeds to steps 194, 196, and 198, as will be discussed in detail below. In general, steps 194, 196, and 198 implement a closed-loop control of the speed of the trailing article (whether on feed conveyor 122 or wedge conveyor 132) such that it arrives on merge conveyor 124 at a position that coincides, as nearly as possible, with trailing target position 186.

At step 194, controller 130 computes an expected position 200 (FIG. 12) on merge conveyor 124 of the trailing article within the slug undergoing release (such as article 128f). The computations of the expected position 200 are the same as that discussed previously for calculating trailing target position 186, except for the timing. While, as noted above, trailing target position 186 is computed at the moment a slug is first released (step 165) and is based on the assumption that one or more speed profiles (for conveyors 122 and/or 134) will be followed with error-free fidelity, expected position 200 is not calculated until after the leading article within the slug has been transferred onto merge conveyor 124, as detected at step 171. The calculation of trailing expected position 200 thus takes place subsequently to the calculation of trailing target position 186 and uses the current conditions, such as speed and position, of the trailing article at the moment of step 192, rather than at the moment of step 165. Among other factors, the result of the calculation of trailing expected position 200 at step 192 will be influenced by any speed adjustments that were made previously at step 188 (i.e. speed adjustments at step 188 to change the arrival position on merge conveyor 124 of leading article 128a will also effect the arrival position of trailing article 128f on merge conveyor 124).

In an alternative embodiment, the computation of the expected position 200 may be made sooner than step 194 and the result of the computation not utilized until the leading article within the slug has been transferred onto merge conveyor 124 (or at least not until a sufficient portion of the leading article has been transferred onto merge conveyor 124 such that its speed is no longer controlled by feed conveyor 122 or wedge conveyor 132). In such an embodiment, the computation of expected trailing position 200 may be made substantially at the moment of release of the slug, or at any other suitable moment.

Figure 12:
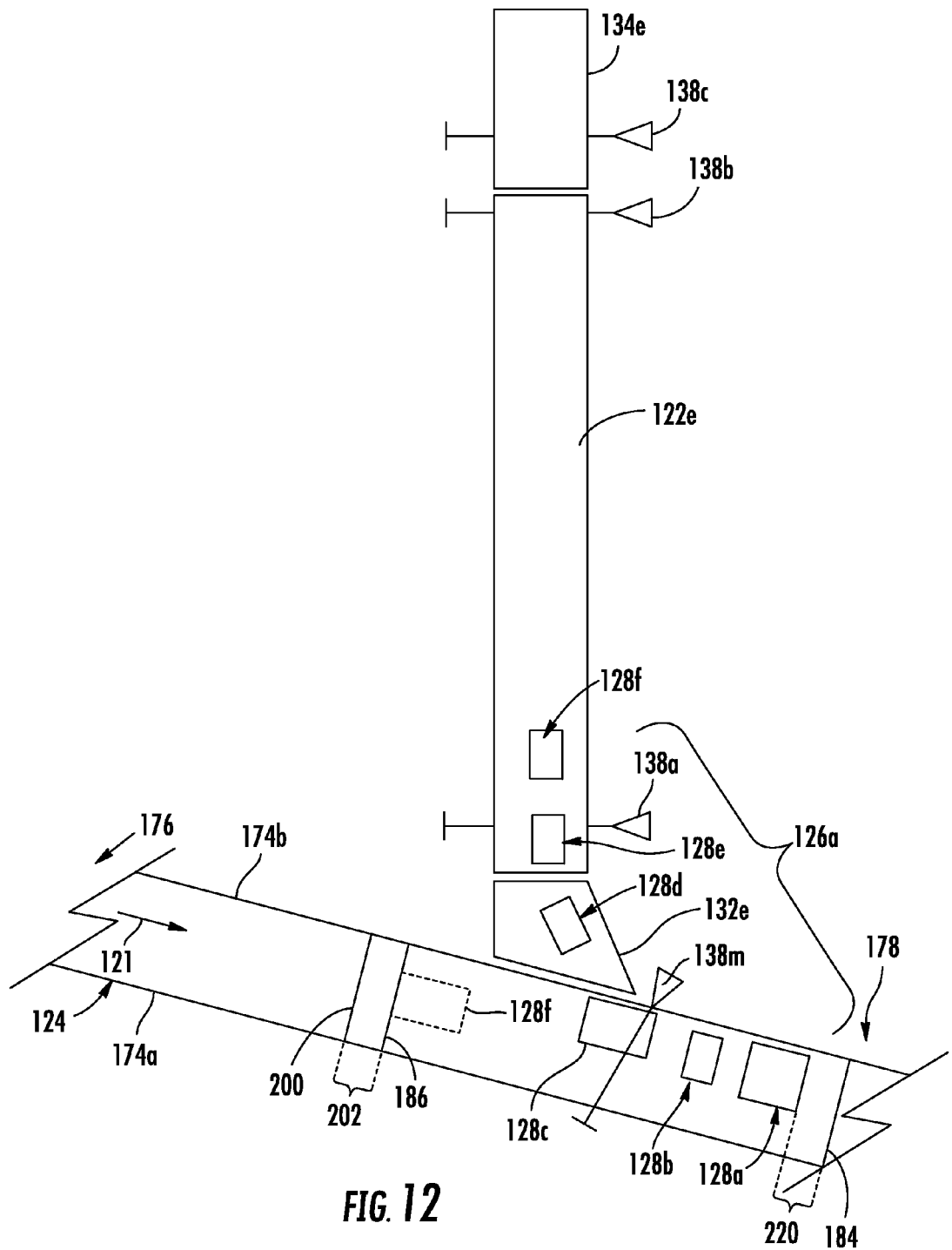
FIG. 12 is a plan view of the conveyors of FIG. 11 shown at a moment in time subsequent to that depicted in FIG. 11.

Subsequent to step 194, controller 130 compares the expected trailing article position 200 to the target trailing position 186 at step 196. The comparison results in an error value 202 (FIG. 12). Trailing error value 202, like leading error value 190, may be zero or non-zero. At step 198, controller 130 adjusts the speed of feed conveyor 122 (and/or wedge conveyor 132) in a closed-loop manner in light of error value 202 computed at step 196. The speed adjustment is intended to reduce error value 202. That is, the speed adjustment is intended to change the expected trailing position 200 such that it is brought closer to the target trailing position 186. In the example of FIG. 12, target trailing position 186 is downstream of expected trailing position 200, and thus controller 130 would in this case speed up feed conveyor 122 such that article 128f arrived sooner than currently expected.

The closed-loop feedback control of conveyors 122 and/or 134 may be based upon any suitable type of feedback mechanism, such as a proportional-integral-derivative controller (PID), or a controller using only one or two of these feedback components. Further, the precise feedback mechanism may be the same as that used by controller 130 for adjusting the speeds at step 188, or it may be different.

After controller 130 completes the speed adjustment at step 198, it returns to step 192 where it once again checks to see if the trailing article has yet entered onto merge conveyor 124. If it has not, controller 130 repeats steps 194-198, calculating a new expected trailing position 200 and a new error value 202 that takes into account the current conditions (including the speed changes made during the previous iteration of step 198). While the adjustments made at step 198 to the speed of feed conveyor 122 and/or 134 will change the gap 162 between those articles on merge conveyor 124 and those still on feed conveyor 122 or wedge conveyor 132, these changes in gap size are, in at least one embodiment, ignored by controller 130. In other embodiments, controller 130 could be configured to take into account these changes in gap when adjusting the speed at step 198.

After cycling through steps 192-198 as many times as it takes for the trailing article to reach merge conveyor 124 (at a frequency that may be varied, but usefully would be at least multiple times a second), controller 130 finally completes the slug release at step 204 when the trailing article in the slug has moved onto the merge conveyor 124. Thereafter, controller 130 resumes controlling feed conveyor 122 in a manner to build up another slug 126 on its conveying surface. After another slug is built, either completely or partially, the slug (either whole or partial) becomes a candidate for release again onto merge conveyor 124. When so released, controller 130 implements slug release method 164 again. Slug release method 164 is thus followed each time a slug is released from a particular feed conveyor 122. Moreover, controller 130 may be simultaneously overseeing the release of multiple slugs onto merge conveyor 124 at the same time, such as that in the situation illustrated in FIG. 7, where slugs 126*a*, *b*, and *c* are being released. In those situations of multiple, overlapping slug releases, controller 130 implements release method 164 for each slug 126 being released.

In summary, release method 164 initially implements open-loop control of feed conveyor 122 via the acceleration of step 166. Thereafter, controller 130 implements closed-loop control of the position of the leading article within a slug 126 onto merge conveyor 124. After the article is positioned on merge conveyor 124, release method 164 switches to a closed-loop control of the position of the trailing article within the slug. The utilization of closed-loop control for both the leading and trailing articles within a slug enables the slug to be more accurately positioned on merge conveyor 124. This allows controller 130 to achieve greater accuracy in the gapping of the articles delivered onto merge conveyor 124. Alternatively, if merge subsystem 120 does not insert gaps between articles within a slug while the slug is on a feed conveyor 122, slug release method 164 allows controller 130 to pack together slugs 126 more closely because there is greater confidence that the trailing article of one slug will not be delivered to a location on merge conveyor 124 already occupied by the leading article of another slug, or vice versa.

It will be noted that the target trailing and leading positions 186 and 184 are calculated based on the assumption that feed conveyor 122 will accelerate at a known rate to the threshold speed and thereafter remain at the threshold speed while the entire slug is delivered onto merge conveyor 124. One of the reasons why the expected leading and expected trailing positions 180 and 200 will differ from target positions 184 and 186, respectively, is that the known rate of acceleration used in the calculation of target positions 184 and 186 may not match the actual rate of acceleration undergone by feed conveyor 122. Thus, target positions 184 and 186 may vary from the expected positions 180 and 200 whenever the loading on feed conveyors 122 (or other factors) causes its actual acceleration to differ from its predicted acceleration.

Those skilled in the art will recognize that slug release method 164 can be modified in a variety of different manners. As one example, leading and trailing target positions 184 and 186 could be calculated in alternative manners. One such alternative manner is to define leading and trailing target positions 184 and 186 with respect to adjacent downstream or upstream articles. Leading target position 184 could thus be defined as a desired distance for the slug's leading article from the neighboring article that will be immediately downstream of the slug's leading article on merge conveyor 124. Similarly, trailing target position 186 could be defined as a desired distance for the slug's trailing article from the neighboring article that will be immediately upstream of the slug's trailing article on merge conveyor 124. For either of these definitions, the desired distance could be zero, or non-zero. In still other variations, the leading and trailing target positions 184 and 186 could dynamically change during the course of the slug's release from feed conveyor 122. Still other manner of defining leading and trailing target positions 184 and 186 can be used.

While not necessarily part of slug release method 164, controller 130 may utilize calculations made during slug release method 164 in determining when to release the next slug. For example, controller 130 may choose to release a slug such that the leading article within the slug will be spaced a desired gap size behind the expected position of the trailing article in the downstream slug. Such an example is illustrated in FIG. 7. In FIG. 7, the target trailing position 186 for article 128*z* in slug 126*b* is illustrated on merge conveyor 124 at a distance downstream from leading target position 184 for leading article 128*a* of slug 126*a*. Specifically, it is illustrated downstream from leading target position 184 a distance equal to gap 162*z*, which designates the desired size gap between the leading article 128*a* of slug 126*a* and the trailing article 128*z* of slug 126*b*. Thus, controller 130 may choose to release slug 126*a* at a moment when the leading target position 184 for article 128*a* will be upstream of trailing target position 186 (for article 128*z*) by a distance equal to gap 162*z*.

However, as noted above, while slug release method 164 has been illustrated in the several drawings as being used with slugs 126 that include gaps 162 between articles 128, slug release method 164 may be utilized with slugs 126 having no gaps between the articles 128 within a given slug. That is, controller 130 may choose to release a slug when the leading target position 184 for the slug is the same as the trailing target position 186 for the trailing article of the adjacent, downstream slug. In that manner, no gap will be deliberately introduced between slugs.

Regardless of the zero or non-zero size of any gaps between slugs, it may be advantageous for controller 130 to utilize the more upstream value of trailing target position 186 and expected trailing position 200 for the immediately adjacent downstream slug. For example, when controller 130 releases slug 126*a* in FIG. 7 it may be advantageous to choose to release slug 126*a* at the moment when slug 126*a*'s leading target position 184 coincides with the more upstream of slug 126*b*'s trailing target position 186 or trailing expected position 200. This will help prevent the possibility of there being more than one article trying to be delivered onto the same space on merge conveyor 124.

In the example of FIG. 7, slug 126*b*'s trailing target position 186 is more upstream than its trailing expected position 200. Thus, controller 130 would, in at least one embodiment, choose to release slug 126*a* at the moment when slug 126*a*'s leading target position 184 coincided with slug 126*b*'s trailing target position 186. However, if during the release of slug 126*b*, controller 130 calculated that trailing article 128*z* in slug 126*b* had an expected trailing position 200 that was upstream of target position 186 on merge conveyor 124, then it could be advantageous to wait to release slug 126*a* until slug 126*a*'s leading target position 184 coincides with slug 126*b*'s trailing expected position 200. Delaying the release in this manner would help accommodate for the possibility that controller 130 might not be able to make sufficient speeds adjustments (at step 198) to deliver trailing article 128z onto merge conveyor 124 precisely at its trailing target position 186. Thus, stated alternatively, controller 130 may, in at least one embodiment, utilize error value 202 in determining when to release a subsequent slug, particularly when error value 202 indicates an expected trailing position 200 that is upstream of the target trailing position 186.

Figure 13:
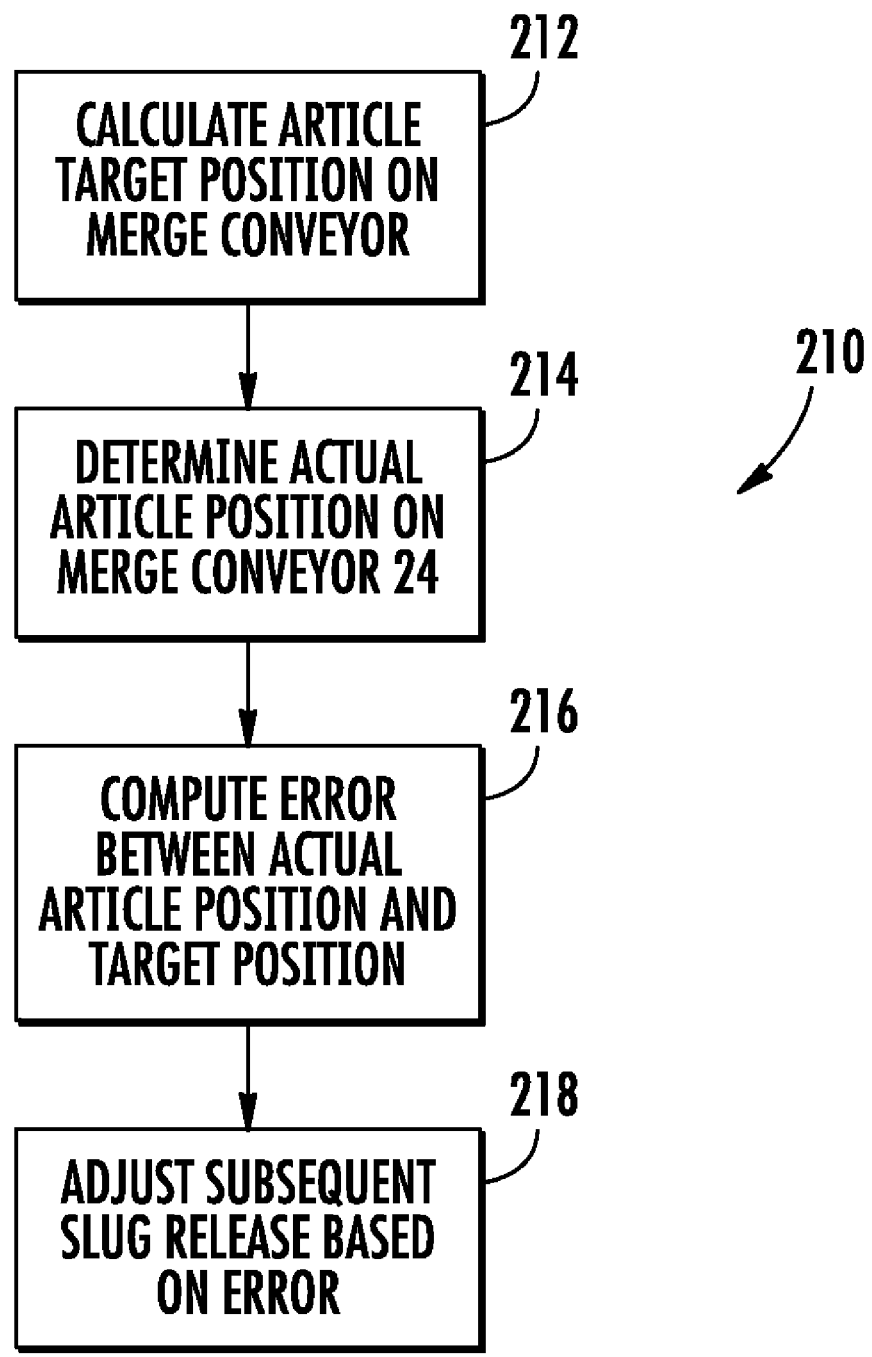
FIG. 13 is a flowchart of a slug release adjustment method.

A slug release adjustment method 210 is illustrated in block diagram form in FIG. 13. Slug release adjustment method 210 is a method that, like the other methods described herein, may be used on its own, or may be used in any combination with the other methods described herein (including but not limited to, methods 38, 68, 144, and/or 164). That is, slug release adjustment method 210, slug building method 144, slug release method 164, slug release timing method 38, and speed control method 68 constitute five separate methods that may be individually incorporated into a merge subsystem by themselves without the addition of the other four. Alternatively, any four, three, or two of the five methods may be combined with each other without utilizing the remaining methods. Further, it is also possible to implement all five methods in the same merge subsystem, as well as any of the methods discussed in more detail below.

Slug release adjustment method 210 begins at an initial step 212 where controller 130 calculates an article target position on merge conveyor 124. In one embodiment, this article target position is the same as leading target position 184 and is calculated in the same manner as leading target position 184. That is, the article target position calculated at step 212 is calculated at the moment a slug is about to be released, and is based on the expected speed profile for the leading article. In other words, the article target position calculated at step 212 is based on the assumption that feed conveyor 122 will accelerate to the threshold speed (discussed with respect to step 168) in a known amount of time and will thereafter remain at the threshold speed until the article is actually delivered onto merge conveyor 124. While the article target position calculated at step 212 can be based on articles other than the lead article of a given slug, for purposes of the following description, it will be assumed, unless explicitly stated otherwise, that the target position calculated at step 212 is for the leading article of a particular slug.

At step 214, controller 130 determines the actual position that the leading article was delivered onto merge conveyor 124. Step 214 thus occurs after step 212 by an amount of time equal to however long it takes for the leading article to be delivered onto merge conveyor 124. The determination of the actual position of the leading article on merge conveyor 124 may be either a calculation based upon the speeds, accelerations, and/or distances traveled by the leading article, or it may be a determination made by one or more sensors on merge conveyor 124, such as photoeyes 138 m (FIG. 7, 8, 11, or 12). If based on a calculation, controller 130 may use the last calculation of the leading article's expected position 180 performed by controller 130 at step 172, or it may perform a separate calculation.

Regardless of the manner in which controller 130 determines the actual location of the leading article on merge conveyor 124, controller 130 proceeds to step 216 where it determines an error value 220 (FIG. 12) between the target position calculated at step 212 and the actual position determined at step 214. At step 218, controller 130 uses the error value 220 determined from step 216 in future releases of slugs 126 from that particular feed conveyor 122. In other words, controller 130 utilizes slug release adjustment release method 210 for each individual feed conveyor 122 (and calculates an error value for each individual feed conveyor 122). The errors 220 from one feed conveyor 122 are used for the subsequent slug releases from that same feed conveyor 122, not for the releases of slugs from different feed conveyors 122.

The manner in which controller 130 utilizes error value 220 in adjusting subsequent slug releases can be varied widely within the scope of the invention. In one embodiment, controller 130 adjusts the timing of the slug releases in order to compensate for the previous error value. That is, if a particular feed conveyor 122 delivered its leading article to merge conveyor 124 at a position downstream of its target position, then controller 130 might release the subsequent slug earlier than it otherwise would in anticipation that this will help reduce the error value of the subsequent slug release. In contrast, if the particular feed conveyor 122 delivered its leading article to merge conveyor 124 at a position upstream of its target position (such as is the case for article 128a in FIG. 12), then controller 130 might release the subsequent slug later than it otherwise would in anticipation that this will help reduce the error value of the subsequent slug release. As another alternative, controller 130 could be configured to alter the threshold speed it operates at in order to help reduce the anticipated error in the subsequent slug release (i.e. by increasing the threshold when the previous release delivered the leading article too far upstream on merge conveyor 124, and by decreasing the threshold when the previous release delivered the leading article too far downstream on merge conveyor 124).

Slug release adjustment method 210 helps account for errors in positioning articles on merge conveyor 124 that may arise from the conveyor belts or rollers of feed conveyors 122 and/or wedge conveyors 132 being sticky, slow, sluggish, or otherwise unable to deliver articles to their intended positions because of coldness, heaviness, overloading, or slipping. For example, if a particular feed conveyor 122 has a cold motor that is just starting and not as responsive as it otherwise would be, it may, until it warms up, continue to deliver articles to merge conveyor 124 at a position upstream of where it is intended. By compensating for future slug releases using slug release adjustment method 210, this slowness can be accounted for so that the releasing of slugs from other feed conveyors 122 is done in a manner that prevents articles from colliding with each other on merge conveyor 124.

While many variations are possible, slug release adjustment method 210, in one embodiment, looks at the error value 220 computed only during the previous iteration of step 216 when it adjusts the subsequent slug release at step 218. That is, controller 130, when releasing a slug, makes adjustments to the slug release at step 218 only based on the error 220 detected during the immediately previous slug release from that particular feed conveyor. Errors detected from slug releases that occurred before the immediately previous release are not utilized by controller 130. Consequently, controller 130 will use the error value it calculates at step 216 only once.

In an alternative embodiment, controller 130 may store the error values it calculates at step 216 and use all of these error values, or multiple ones of these error values, when making adjustments in subsequent slug releases at step 218. The manner in which controller 130 makes adjustments at step 218 based on prior error values can be implement in any suitable manner. In one embodiment, the various previous errors are weighted according to their level of recentness, with the more recent levels being weighted more heavily than the older releases. Further, the magnitude of the multiple errors may be a factor that is used to weight the influence of the multiple errors on future releases. Other variations are also possible.

Slug release adjustment method 210 may also be implemented to carry out the adjustments at step 218 by creating variably-sized gaps between slugs. Such gaps may be based on the error value determined at step 216, and/or they may be based upon the amount of time that has elapsed since the immediately previous slug release. If the immediately previous slug release was a relatively short time ago, then controller 130 may be configured to add little or no gap to the subsequent slug release, the theory being that the feed conveyor's motor and operating conditions haven't changed much since the immediately previous slug release. However, if the immediately previous slug release was a relatively long time ago, controller 130 may be configured to add a larger gap between the releasing slug and the downstream slug in order to account for the greater possibility that the motor has cooled off in the interim between slug releases, or that other conditions have changed in the interim such that the subsequent slug release may otherwise result in a greater error than the immediately previous slug release. The gaps can thus vary according to the expected confidence that the motors and conveyors will operate in a subsequent release in a manner similar to how they operated during the previous release. Where there is less confidence, extra gap may be added. Where there is more confidence, less gap (or zero gap) may be added.

The manner in which gap can be added between slugs can be varied. In one embodiment, controller 130 adds gap between slugs 126 by delaying the time at which it otherwise would release a slug 126. In another embodiment, controller 130 adds gap by releasing the slug 126 at the same time it otherwise would, but uses a reduced threshold speed, or otherwise slows down the conveyance speed of the leading article within the slug.

Slug release adjustment method 210 may be modified such that, either in addition to, or in lieu of, the error value 220 generated at step 216, controller 130 uses the amount of time that has elapsed since the prior release in determining the adjustments to make at step 218. In other words, controller 130 may be configured to look only at the total error value 220 of a prior slug release when making adjustments at step 218, or controller 130 may be configured to look at the total error value 220 and the amount of time that has lapsed since the prior release when making adjustments at step 218. Other factors may also be considered at step 218.

It will be understood by those skilled in the art that the physical construction of feed conveyors 122, wedge conveyors 132 (if used), and merge conveyor 124 can be varied. In one embodiment, these conveyors are belted conveyors having a conveying surface defined by an endless belt that is wrapped around a pair of rollers at each end of the conveyor. In other embodiments, one or more of these conveyors may be rollered conveyors in which the conveying surface is defined by a plurality of rollers and the articles contact the rollers directly. Other types of conveyors may also be used.

Accumulation

Figure 14:
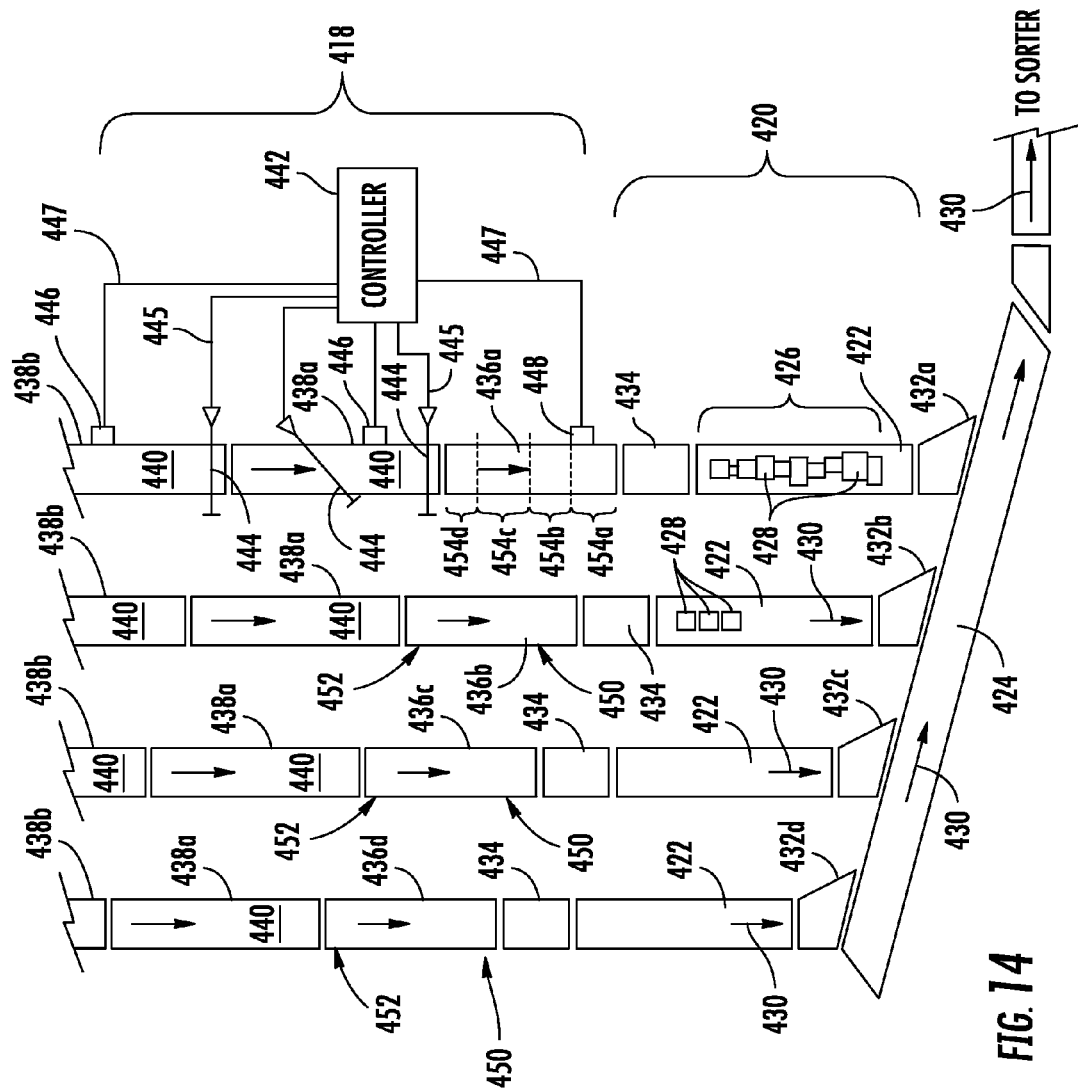
FIG. 14 is a plan view of another merge subsystem.

An accumulation system 418 for accumulating articles on conveyors according to one embodiment is depicted in FIG. 14. Accumulation system 418 may be used in conjunction with a conveyor system that incorporates any one or more of the methods discussed above (e.g. methods 38, 68, 144, 164, and/or 210), or it may be used by itself in a system that incorporated none of the previously discussed methods. Accumulation system 418 is depicted in FIG. 14 in combination with a merge subsystem 420 located downstream of accumulation system 418. It will be understood that the location of accumulation system 418 within an overall conveying system can be varied from that illustrated in FIG. 14 and that accumulation system 418, in at least some embodiments, is not limited to being used in locations immediately upstream of a conveyor merge subsystem. For purposes of describing the various aspects of the invention below, however, reference will be made to merge subsystem 420 with the understanding that this reference is merely for purpose of aiding an understanding of the disclosed embodiment, and is not a critical component of various aspects of the present invention. Further, it will be understood that merge subsystem 420 may be the same as, or different from, the merge subsystems 26 and 120 discussed previously.

Accumulation system 418, in one embodiment, includes an accumulation conveyor 436, at least one transport conveyor 438 positioned upstream of accumulation conveyor 436, and a controller 442. In the example illustrated in FIG. 14, accumulation system 418 includes four accumulation conveyors 436a-d, each of which includes at least two transport conveyors 438a and b. The number of accumulation conveyors 436 and transport conveyors 438 can be varied from that shown. It will be understood that accumulation system 418 may include as few as one accumulation conveyor 436 and one transport conveyor 438 (along with a controller 442), or as many accumulation conveyors 436 and transport conveyors 438 as desired.

Before turning to the detailed operation of accumulation system 418, a brief discussion of merge subsystem 420 will be provided. Merge subsystem 420 may be of the type known in the art and includes a plurality of feed conveyors 422 and a merge conveyor 424. Each feed conveyor 422 receives articles 428 from an adjacent upstream meter conveyor 434. Feed conveyors 422 build slugs 426 from the articles 428 they receive from meter conveyor 434 and intermittently feed those slugs 426 onto merge conveyor 424, which then carries the articles to a downstream induct area (not shown), and thereafter to one or more sortation conveyors (also not shown). The movement of articles on feed conveyors 422 and merge conveyor 424 is indicated by a plurality of arrows 430.

Merge subsystem 420 may optionally also include a plurality of wedge conveyors 432a-432d (FIG. 14) located in-between merge conveyor 424 and each of feed conveyors 422a-d. Wedge conveyors 432a-432d provide an angled junction between feed conveyors 422 and merge conveyor 424. The use of wedge conveyors 432 may be desirable in certain situations, but is not absolutely necessary. Further, the shape, design, and configuration of wedge conveyors 432 may be varied from that illustrated in FIG. 14. Also, additional conveyors may be interposed between feed conveyors 422 and merge conveyor 424, if desired.

The layout of merge subsystem 420 depicted in FIG. 14 is intended to illustrate one of the many possible layouts of a merge subsystem that may be used in conjunction with accumulation system 418. To the extent accumulation system 418 is used in conjunction with a merge subsystem, the merge subsystem may have layouts modified substantially from that shown in FIG. 14, including, but not limited to, conveying systems having different numbers, locations, shapes, and configurations of feed conveyors 422, merge conveyors 424, wedge conveyors 432, and meter conveyors 434.

Accumulation conveyors 436a-d are positioned immediately upstream of, and adjacent to, meter conveyors 434. Accumulation conveyors 436 are adapted to accumulate articles 428 on their conveying surface 440 and accumulation conveyors 436 may be conventional accumulation conveyors. One suitable accumulation conveyor 436 that may be used in accordance with the present invention is a model 1265 Narrow Belt Live Roller APC available from Dematic Corp., a company having a place of business at 507 Plymouth, Ave. Grand Rapids, Mich., 49505. Other suitable accumulation conveyors include those disclosed in U.S. Pat. No. 6,478,142 issued to Cotter et al. and entitled Contact Assembly for Accumulation Conveyors, and U.S. Patent Publication No. 2006/0272930 filed by Cotter et al. and entitled Belt Conveyor, the complete disclosures of which are both hereby incorporated by referenced herein.

Figures 17, 18A, 18B, 18C:
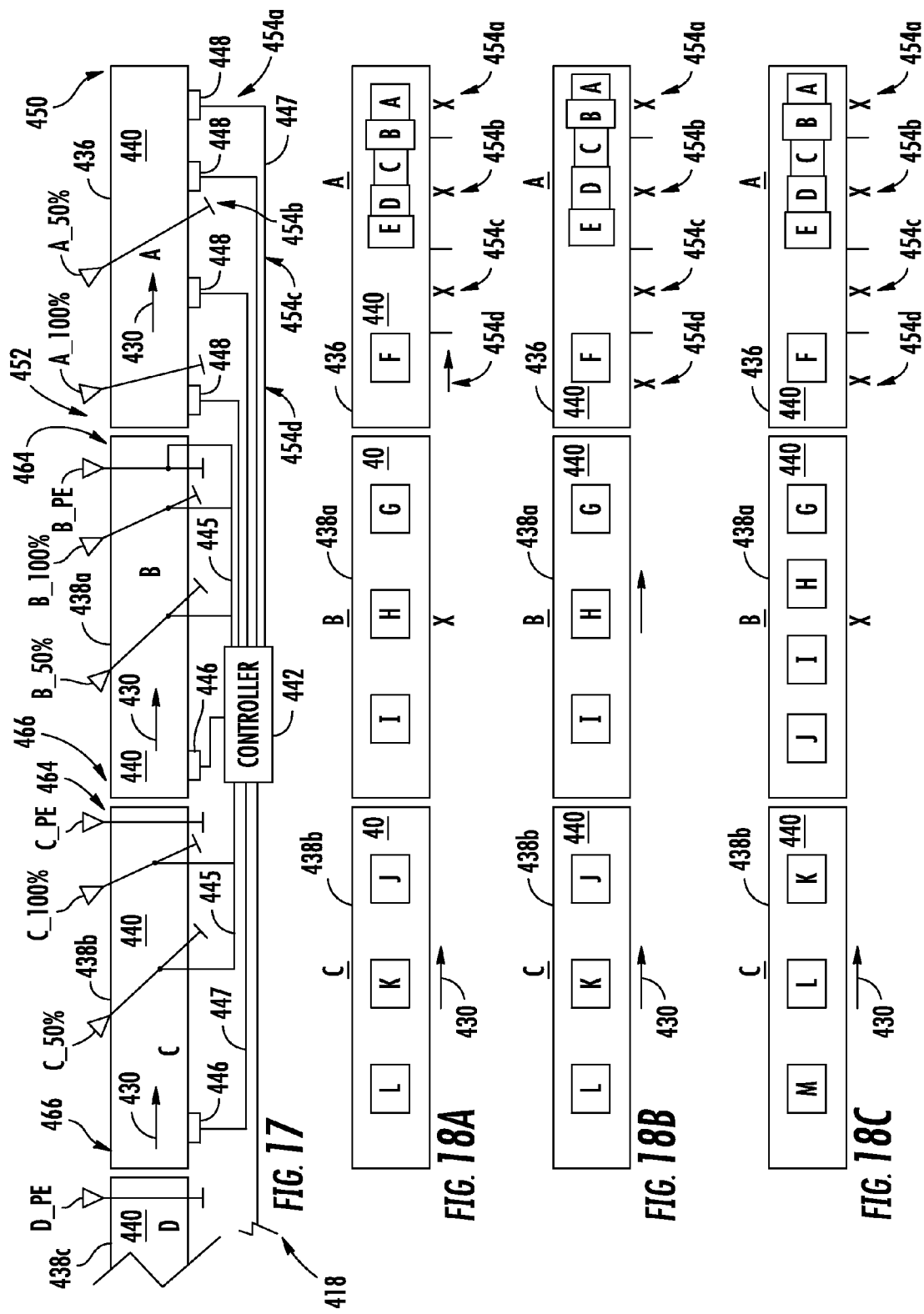
FIG. 17 is a plan view of an accumulation system having a plurality of conveyors and a controller.
FIG. 18A is a plan view of the accumulation system of FIG. 17 illustrated with an arbitrary initial arrangement of articles A-L positioned thereon at a first moment in time.
FIGS. 18B-18P are plan views of the accumulation system of FIG. 18A at subsequent moments in time wherein the movement of articles is illustrated when the conveyors are controlled according to the ladder logic diagrams of FIGS. 15 and 16.

Conveying surface 440 of accumulation conveyors 436 may be divided into a plurality of zones 454 (FIGS. 14, 17, and 18). In the following discussion, it will be assumed that accumulation conveyors 436 have their conveying surfaces 440 divided into four zones 454*a-d*, although it will be understood that this choice is merely arbitrary and the described embodiment can be modified to use accumulation conveyors 436 having different numbers of zones.

Figures 20A, 20B:
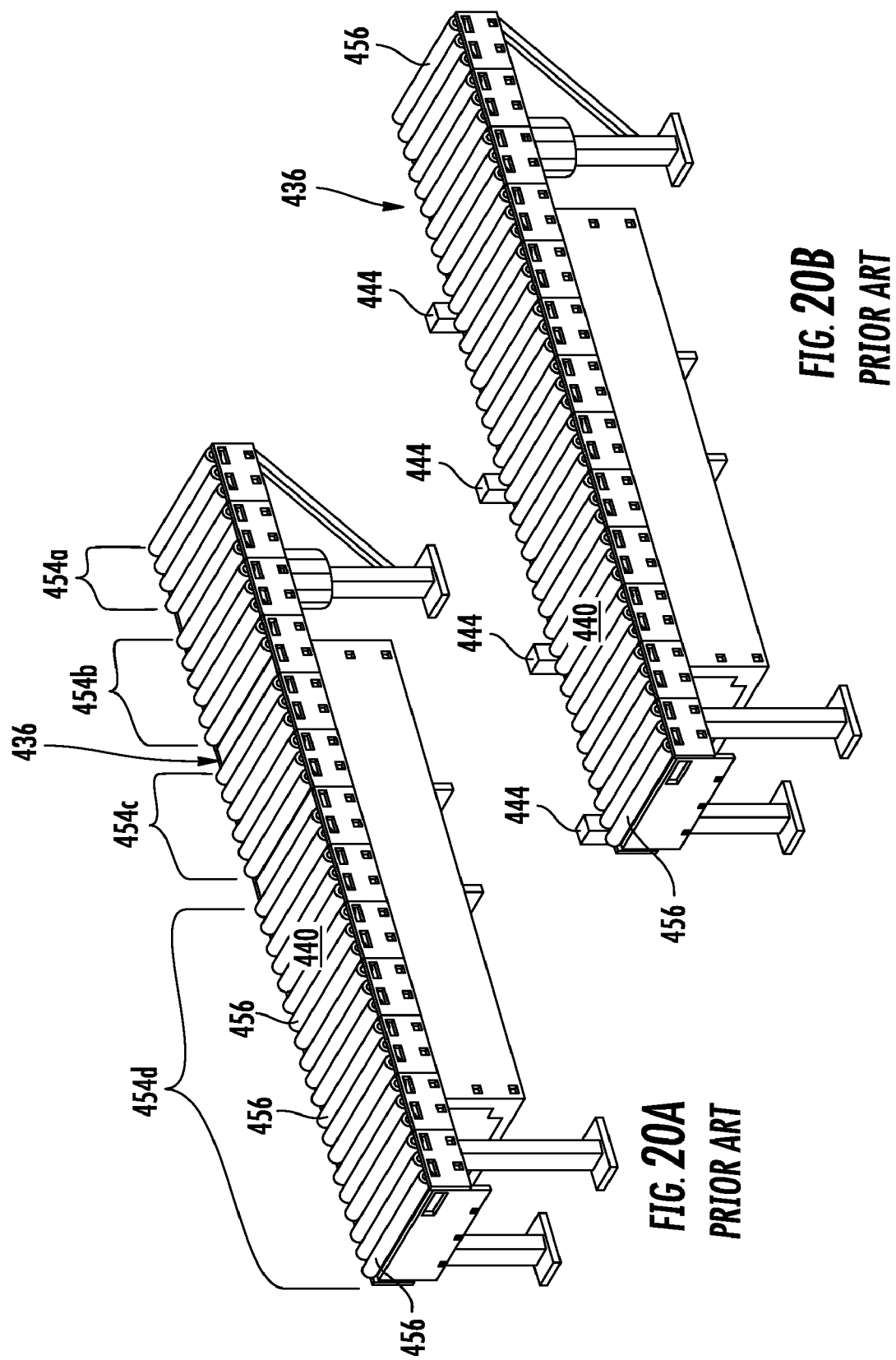
FIGS. 20A and 20B are perspective views of conventional accumulation conveyors that may be incorporated into the accumulation systems shown in FIG. 14 and/or FIG. 17.

FIGS. 20A and 20B depict perspective views of two different variations of an accumulation conveyor 436 that may be used in accordance with the present invention. In both variations, the accumulation conveyor 436 has its conveying surface 440 defined by a plurality of rollers 456, and the article conveying surface 440 is divided into four zones 454*a-d*. In the first variation (FIG. 20A), the presence of articles 428 within a particular zone is sensed by mechanical sensors (not shown), while in the second variation (FIG. 20B), the presence of articles 428 within a particular zone is sensed by an electronic sensor such as photoeye 444. The illustrated embodiment may be practiced with either type of accumulation conveyor 436, as well as other types. Further, there are a variety of known algorithms which the accumulation conveyor 436 may use to control the rollers in each individual zone 454*a-d* in order to accumulate articles. Accordingly, further description of the accumulation conveyors 436 and the manner of controlling them will not be provided.

Upstream of each accumulation conveyor 436 are one or more transport conveyors 438. Transport conveyors 438 may be constructed to have a conveying surface 440 defined by an endless belt reeved around a pair of rollers (not shown) positioned at the upstream and downstream ends of the conveyor, as is known in the art. Rotation of one or more of the rollers causes the endless belt to move, thereby transporting articles 428 positioned on the conveying surface 440 in the direction of conveyance 430. However, it is also possible to incorporate various aspects of the illustrated embodiment utilizing conveyors having different types of conveying surfaces and different physical constructions. As one example, transport conveyors 438 could be rollered conveyors having their conveying surfaces 440 defined by a plurality of spaced apart rollers that, upon rotation, cause articles positioned on the rollers to move in the direction of conveyance 430. Still other types of conveyor constructions and types are possible.

Transport conveyors 438 are constructed as physically separate beds. That is, they are unlike accumulation conveyors 436 in that accumulation conveyors 436 may be a single conveyor bed divided into a plurality of independently controllable conveying surface zones. An individual transport conveyor 438 is not divided into independently controllable zones wherein the conveying surface of a zone is controllable independently of the conveying surface of another zone because the conveying surface of a transport conveyor 438 is controlled as a unitary entity.

Transport conveyors 438 generally operate in one of two modes: a transportation mode and an accumulation mode. In the transportation mode, transport conveyors 438 serve to transport articles 428 to accumulation conveyors 436 where articles are accumulated. If articles 428 are removed sufficiently fast from accumulation 436 by delivering them to the adjacent downstream meter conveyor 434, then transport conveyors 438 will generally remain in the transportation mode where they will continue to run without interruption. However, as will be explained in greater detail below, if articles 428 accumulate to a certain threshold level on accumulation conveyor 436, then the adjacent upstream transport conveyor 438 will switch to the accumulation mode in which it will begin accumulating articles on its conveying surface 440.

In the accumulation mode, transportation conveyors 438 will slow down and speed up (and/or stop and start) in such a manner so as to accumulate articles on their respective conveying surfaces 440. Should article accumulation on the first transport conveyor 438 upstream of accumulation conveyor 436 (transport conveyor 438*a* in the example of FIG. 14) reach a threshold level, the next upstream transport conveyor (438*b* in FIG. 14) will switch to the accumulation mode and commence article accumulation on its conveying surface 440. If articles accumulate on transport conveyor 438*b* to a threshold level, then the next upstream transport conveyor (438*c* in FIG. 14) will switch to the accumulation mode and article accumulation will commence on transport conveyor 438*c*. The transition of transport conveyors 438 from a transportation mode to an accumulation mode will continue upstream in a cascading fashion for as many transport conveyors 438 as there are in the particular conveying system (assuming articles 428 are not being delivered fast enough to meter conveyor 434 to cause the transport belts to revert back to their transportation modes).

The number of transport conveyors 438 that may be controlled in accordance with the principles disclosed herein is not limited. Also, the various principles disclosed herein can be applied to only a single transport conveyor 438 positioned upstream of an accumulation conveyor 436, if desired. These principles can therefore be applied to one or more transport conveyors 438, thereby enabling the principles to be applied to a wide variety of different conveying system layouts and facilities.

Accumulation conveyors 436 and/or transport conveyors 438 are controlled by a controller 442 (FIGS. 14 and 17), which may be a conventional programmable logic controller, a Personal Computer (PC), a plurality of distributed circuit boards with appropriate electronic circuitry, a combination of any of these items, or any other suitable electrical or electronic structure suitable for carrying out the control logic described herein. If system 418 is part of a conveyor system that implements any one or more of the methods described above (e.g. 38, 68, 144, 164, and/or 210), controller 442 may be the same controller that carries out all, or a portion of, any one or more of these methods in addition to the control aspects discussed below with respect to system 418. Alternatively, controller 442 may be separate from any one or more controllers (e.g. controller 36 and/or 130) that carry out any of the previously described methods.

Controller 442 is in communication with a plurality of sensors, such as, but not limited to, photoeyes 444 and/or conventional pulse-position indicators (not shown) via communications links 445, which may be wires, a wireless connection, a bus, or other suitable communication media. For purposes of visual clarity, FIG. 14 only illustrates some of the photoeyes 444 that are in communication with controller 442. FIG. 17 provides a more complete illustration of photoeyes 444 and links 445.

Controller 442 controls the speed of transport conveyors 438 either via signals issued directly to the associated motors (not shown) for transport conveyors 438, or via commands issued to a plurality of transport conveyor motor controllers 446. Controller 442 may also be in communication with motor controllers 448 that control accumulation conveyor 436, although the control of accumulation conveyors 436 can be carried out by a different controller. In general, accumulation conveyors 436 may be controlled in any manner in which articles 428 initially accumulate at a downstream end 450 of accumulation conveyor 436 and then accumulate in an upstream direction toward upstream end 452 of accumulation conveyor 436. Controller 442 communications with motor controllers 446 and 448 via communication links 447, which may be wires, busses, wireless connections, or other suitable communication media.

Figure 16:
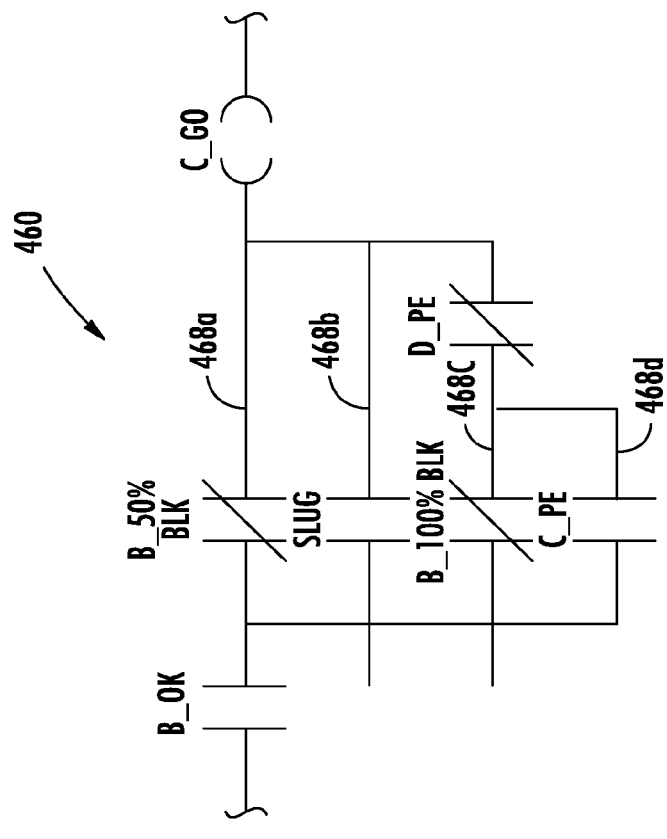
FIG. 16 is another ladder logic diagram that may be used to control a conveyor adjacent to, and upstream of, the conveyor controlled by the ladder logic diagram of FIG. 15.
Figure 15:
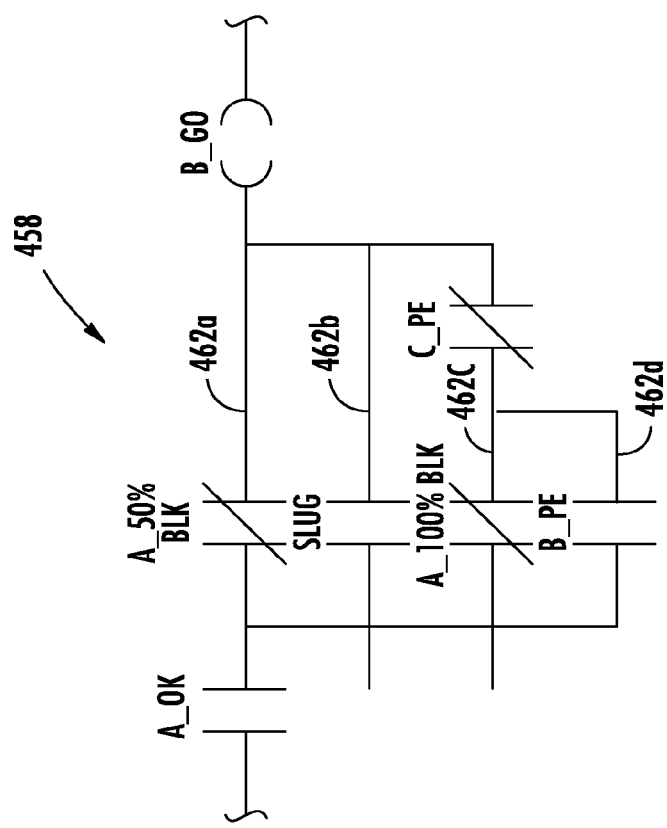
FIG. 15 is a ladder logic diagram illustrating logic that may be followed by a conveyor controller.

FIG. 15 illustrates a ladder diagram 458 that may be used by controller 442 in controlling the operation of transport conveyor 438a. FIG. 16 illustrates another ladder diagram 460 that may be used by controller 442 in controlling the operation of transport conveyor 438b. While ladder diagrams are often used with PLC's, FIGS. 15 and 16 are not intended to imply that controller 442 needs to be limited to a PLC. As noted, controller 442 may be any type of controller capable of carrying out the control logic illustrated in FIGS. 15 and/or 16, or variations thereof.

Ladder diagrams 458 and 460 will be explained below with reference to FIG. 17. FIG. 17 depicts a plan view of an accumulation system 418 made up of accumulation conveyor 436, which is also labeled with an "A," a pair of upstream transport conveyors 438a and b (which are also labeled with a "B" and a "C," respectively), and controller 442. Additional transport conveyors 438 may be positioned upstream of transport conveyor 438b (such as the one labeled "D") and incorporated into accumulation system 418. As can be seen, controller 442 controls the motor controllers 446 of each of the transport conveyors 438. It also optionally controls the motor controllers 448 for each of the zones 454a-d of accumulation conveyor 436.

Ladder diagram 458 (FIG. 15) illustrates the logic that dictates whether transport conveyor 438a (conveyor "B" in FIG. 17) will run (i.e. transport articles on its conveying surface 440 in the direction of conveyance 430) or stop. Ladder diagram 458 includes four rungs 462a-d that connect an input A_OK to an output B_GO. The A_OK input refers to the status of accumulation conveyor 436 (conveyor "A" in FIG. 4); that is, a logic high or true value will be provided to A_OK whenever accumulation conveyor 436 is operating normally. The B_GO output of ladder diagram 458 refers to a signal that causes transport conveyor 438a (conveyor "B" in FIG. 17) to run whenever it takes on a logic high or true value. Thus, it can be seen that, as long as the A_OK signal is provided, controller 442 will cause transport conveyor 438a (conveyor "B" in FIG. 17) to run provided at least one of the logical conditions in the four rungs 462a-d is true. Generally speaking, rungs 462a and b correspond to the transportation mode of transport conveyor 438 while rungs 462c and d correspond to the accumulation mode. The logical conditions of each of these four rungs will now be described with reference to FIGS. 15 and 17.

The logic of top rung 462a is dictated by a photoeye labeled "A_50%." The A_50% photoeye is depicted in FIG. 17 and refers to a photoeye that is located approximately midway (i.e. 50%) between downstream end 450 and upstream end 452 of accumulation conveyor 436. Photoeye A_50% is suitably positioned alongside conveying surface 440 of accumulation conveyor 436 such that it senses articles 428 as they pass by (for purposes of clarity, no articles 428 are shown in FIG. 17). Photoeye A_50%, along with all of the other photoeyes discussed herein, may be conventional photoeyes that detect the presence of articles by passing a beam of light and/or other electromagnetic radiation from one side of the conveyor to a sensor positioned on the opposite side of the conveyor. When an article passes by, the beam of electromagnetic energy is interrupted and the presence of an article can be detected. Photoeye A_50%, along with the other photoeyes discussed herein, may be oriented such that its beam of electromagnetic energy crosses the conveyor at an angle other than ninety-degrees. As is known to those skilled in the art, such angled orientations help avoid mistaken signals (such as might occur if a perpendicular beam of electromagnetic energy were to pass between a small gap between accumulated articles and thereby miss detecting the accumulated articles). The degree of angular orientation can be varied, as would be known to one skilled in the art.

Photoeye A_50% detects whether articles have accumulated on accumulation conveyor 436 to at least the fifty-percent level (i.e. they have accumulated from downstream end 450 toward upstream end 452 for at least half of the length of conveyor 436). FIG. 20A illustrates articles A-E on accumulation conveyor 436 that have accumulated to approximately fifty-percent of the length of accumulation conveyor 436. Thus, in the example illustrated in FIG. 20A, the electromagnetic beam emitted by photoeye A_50% would be blocked (such as by article E).

Returning to ladder diagram 458, the logical status of rung 462a is dictated by the blocked or unblocked status of photoeye A_50%. More specifically, a A_50% BLK "not" contact dictates whether rung 462a will output a logical true (e.g. high) value to output B_GO. If photoeye A_50% is blocked (i.e. it detect accumulation on conveyor 436 of at least 50%), then lung 462a will not pass the A_OK input onto the B_GO output. Conversely, any time the A_OK signal is true and articles have not accumulated to the 50% level on accumulation conveyor 436 (conveyor "A" in FIG. 4), controller 442 will run transport conveyor (conveyor "B" in FIG. 17) at its normal speed. Transport conveyor 438a will be in its transportation mode and will convey articles along its conveying surface 440 to accumulation conveyor 436.

It should be noted that the A_50% BLK "not" contact of rung 462a will advantageously have a timer associated with it in order to filter out the blocked conditions that are detected by the normal movement of articles on conveying surface 440. That is, the A_50% BLK "not" contact won't change to the true status until the electromagnetic beam emitted by photoeye A_50% has been blocked for a threshold period of time, such as several seconds. This prevents controller 442 from misinterpreting the transitory passage of articles by the A_50% photoeyes as a 50% full condition. The threshold amount of time may be varied and will likely be influenced by such factors as the operating speeds of the accumulation conveyor 436, the angle of photoeye A_50%, the longest articles expected to be transported, and other factors, as would be known by one skilled in the art. When a conveyor, such as conveyor "A" is stopped (or the portion of the conveyor adjacent the photoeye is stopped), the threshold amount of time may be extended for as long as the conveyor is stopped in order to distinguish article accumulation from temporary blockage due to the conveying surface having stopped moving.

In summary, the use of a threshold timer causes the A_50% BLK "not" contact to change to a true value only when articles have actually accumulated to the 50% level, and not when an article merely passes by (such as when the article either is accumulated downstream of the 50% level, or is transported onto the conveyor downstream of accumulation conveyor 436, such as meter conveyor 434). Because the A__50% contact is a "not" contact, as indicated by the slash in the diagram of FIG. 15, the blockage of the A__50% photoeye by article accumulation causes rung 462a to deliver a false (or logic low) signal to output B_GO. This false signal will cause conveyor "B" (transport conveyor 438a) to stop running, provided a true signal is not delivered to output B_GO from one of the other ladder rungs 462b-d. Stated alternatively, in the absence of rungs 462b-d, rung 462a would cause transport conveyor 438a (conveyor "B" in FIG. 17) to otherwise stop running as soon as articles had accumulated to the 50% level on accumulation conveyor 436.

Ladder rung 462b provides another logical condition for operating transport conveyor 438a when the A_OK signal is true. Ladder rung 462b includes a "slug" contact. The slug contact refers to a condition in which it is desired for transport conveyor 438a to immediately switch to the transportation mode (if is isn't already in it). Such a condition may be useful when the articles on accumulation conveyor 436 are discharged onto the downstream conveyor, or when it is otherwise desirable to clear out the articles on transport conveyor 438a's conveying surface 440, or in still other situations. Regardless of the reason for the condition, the switching of the slug contact to a logical true state causes transport conveyor 438a (conveyor "B") to convey articles in the direction of conveyance 430 (provided the A_OK input still has a true state). The slug contact may be tied to a user-interface wherein a human operator can input a command causing the slug contact to become true, or it may be tied one or more signals received by controller 442 from another controller, device, or other electrical or electronic component that transmits such one or more signals when it is useful for transport conveyor 438a to run. The "slug" contact is an optional feature of ladder diagram 458 and may be omitted.

Ladder rungs 462c and 462d represent the accumulation mode for transport conveyor 438a. That is, instead of running continuously, as transport conveyor 38a does when controlled by either of rungs 462a or b, rungs 462c and 462d cause transport conveyor 438a to start and stop (or accelerate and decelerate) in a manner that tends to accumulate articles on its conveying surface 440. The logic of these two rungs is discussed below.

Turning first to ladder rung 462c, it includes two contacts arranged in series. The first is an A__100% BLK "not" contact. This contact refers to the photoeye labeled A__100% in FIG. 17, which is a photoeye positioned near upstream end 452 of accumulation conveyor 436. The A__100% photoeye detects when articles have accumulated for approximately the entire length of accumulation conveyor 436 (conveyor "A"). This contact, like the A__50% contact, may advantageously be tied to a timer so as to distinguish between articles temporarily passing by the upstream end 452 of accumulation conveyor 436 and an article stopped adjacent upstream end 452 due to accumulation conveyor 436 being full. When photoeye A__100% detects article accumulation, it will generate a logical true value, but because contact A__100% BLK is a "not" contact, the A__100% BLK contact will switch to a false state. Thus, when accumulation conveyor 436 is filled with accumulated articles, the A__100% BLK contact will not pass a true value to the C_PE contact of rung 462c.

On the other hand, if accumulation conveyor 436 is not filled with articles, the C_PE "not" contact will receive a true signal from the A__100% BLK contact. The state of the C_PE "not" contact is determined by a photoeye labeled C_PE in FIG. 17. The C_PE photoeye is positioned at a downstream end 464 of transport conveyor 438b. The C_PE photoeye generates a logical false signal when it detects an article. As a consequence, the C_PE "not" contact will switch to a true state when an article is detected. Therefore, ladder rung 462c will cause conveyor 438a (conveyor "B") to run if accumulation conveyor 436 is not full and an article is detected at the downstream end 464 of transport conveyor 438b. In contrast, if no article is detected by photoeye C_PE (and rungs 462a and b are not operative), controller 442 will stop transport conveyor 438a. The C_PE photoeye contact (which is shared by rungs 462c and d) thus acts as an indexing contact for indexing forward conveyor 438a each time an article is detected at the downstream end 464 of transport conveyor 438b. This indexing builds up (i.e. accumulates) articles on conveyor 438a, starting at its upstream end 466 and moving in a downstream direction. This accumulation continues until both the A__100% photoeye detects that accumulation conveyor 436 is full and the condition of rung 462d becomes false, as will now be discussed.

Rung 462d of ladder diagram 458 (FIG. 17) includes only a single contact labeled B_PE. The B_PE contact assumes a logical state that is dictated by a B_PE photoeye positioned at the downstream end of transport conveyor 438a (conveyor "B" in FIG. 17). When the B_PE photoeye senses an article, it causes the B_PE contact to transition to a false state. Therefore, ladder rung 462 will present an open contact if an article is detected at the downstream end of transport conveyor 438a.

The logic for controlling transport conveyor 438a (conveyor "B") in accordance with ladder diagram 458 is summarized in the following chart. This chart is based on the assumption that the A_OK input is true and that the optional slug contact (rung 462b) is not being utilized (i.e. rung 462b has an open contact). Given these assumptions, conveyor 438a will run if any one or more of the three conditions listed below are satisfied, and conveyor 438a will stop if any one or more of the two conditions listed below are satisfied.

| Conveyor 438a ("B") runs when: | Conveyor 438a ("B") stops when: |
| --- | --- |
| (1) Accumulation conveyor 436 is less than 50% full; or | (1) Accumulation conveyor 436 is at least 50% full (but not 100% full) and no article is detected at the downstream end of transport conveyor 438b; or |
| (2) An article is detected at the downstream end of transport conveyor 438b and no article is detected at the downstream end of transport conveyor 438a; or | (2) Accumulation conveyor 436 is 100% full and an article is detected at the downstream end of transport conveyor 438a. |
| (3) An article is detected at the downstream end of transport conveyor 438b and accumulation conveyor 436 is not 100% full. | |

FIG. 16 illustrates ladder logic diagram 460 which is used to control the operation of transport conveyor 438b (conveyor "C" in FIG. 17). Ladder logic diagram 460 includes four rungs 468a-d that are comparable to rungs 462a-d of logic diagram 458. Ladder logic diagram 460 is conceptually the same as ladder logic diagram 458 except that diagram 460 bases its logic on the conditions of upstream and downstream neighboring conveyors 438a and 438c, while ladder logic diagram 458 was based on the conditions of upstream and downstream neighboring conveyors 436 and 438b. Thus, for example, ladder rungs 462a and 468a have their logical states determined by the fullness level (specifically the 50% fullness level) of the neighboring downstream conveyor. In the case of ladder diagram 460, this neighboring downstream conveyor is conveyor "B" (transport conveyor 438*a*), while in the case of ladder diagram 458, this neighboring conveyor is accumulation conveyor 436 (conveyor "A"). Similar types of correlations exist between ladder rungs 462*c* and 468*c*, as well as 462*d* and 468*d*.

In light of the similarity between ladder diagrams 458 and 460, a less detailed explanation of the contacts of diagram 460 will be provided than was provided above for diagram 458. Ladder rung 468*a* has a single B__50% BLK "not" contact, whose state is determined by the B__50% photoeye positioned generally in the middle of transport conveyor 438*a* (FIG. 17). Ladder rung 468*b* includes a slug contact, which has its state determined by a "slug" command that may originate from any suitable source, as discussed above. Thus, ladder rung 468*b* will assume a state that matches ladder rung 462*b*.

Ladder rung 468*c* includes two contacts: a B__100% BLK "not" contact and a D_PE "not" contact. The B__100% BLK "not" contact has a state that is dictated by a B__100% photoeye positioned generally near the downstream end of transport conveyor 438*a*. The D_PE "not" contact has a state that is dictated by a B_PE photoeye positioned adjacent the downstream end of transport conveyor 438*c* (FIG. 17). The logical operation of ladder rung 468*c* corresponds to the logical operation of ladder rung 462*c*. That is, ladder rung 468*c* will deliver a logical true signal to output C_GO (causing conveyor "C" to run) whenever conveyor B (i.e. transport conveyor 438*a*) is not 100% full, as detected by photoeye B__100%, and an article is detected at the downstream end of conveyor D (i.e. transport conveyor 438*c*), as detected by photoeye D_PE.

Ladder rung 468*d* has a single contact C_PE. This contact assumes a logical state dictated by photoeye C_PE, which is positioned at the downstream end of conveyor "C" (transport conveyor 438*b*).

Assuming that conveyor B is in a normal, operational state (i.e. input B_OK is true), and assuming that no slug signal or command is present (i.e. the slug contact of rung 468*b* remains false), conveyor 438*b* will run if any one or more of the three conditions listed below are satisfied, and conveyor 438*b* will stop if any one or more of the two conditions listed below are satisfied.

| Conveyor 438b ("C") runs when: | Conveyor 438b ("C") stops when: |
|---|---|
| (1) Transport conveyor 438a (conveyor "B") is less than 50% full; or | (1) Transport conveyor 438a (conveyor "B") is at least 50% full (but not 100% full) and no article is detected at the downstream end of transport conveyor 438c; or |
| (2) An article is detected at the downstream end of transport conveyor 438c and no article is detected at the downstream end of transport conveyor 438b; or | (2) Transport conveyor 438a (conveyor "B") is 100% full and an article is detected at the downstream end of transport conveyor 438b. |
| (3) An article is detected at the downstream end of transport conveyor 438c and transport conveyor 438a (conveyor "B") is not 100% full. | |

Additional ladder diagrams similar to those shown in FIGS. 15 and 16 can be provided for controlling additional transport conveyors 438*c, d,* etc upstream of transport conveyor 438*b*. Such additional ladder diagrams would be conceptually the same as the diagram illustrated in FIG. 16, except all of the letter designations would be advanced by one or more letters beyond what is shown in FIG. 16. In other words, for example, transport conveyor 438*c* could be controlled by a ladder logic diagram identical to that illustrated in FIG. 16 with the exception that all the letter identifiers were advanced by one. Thus, the B_OK input would be replaced by a C_OK input; the C_GO output would be replaced by a D_GO output, the B__50% BLK "not" contact would be replaced by a C__50% BLK "not" contact, and so on. The changed letter designations would refer to the appropriate conveyor letter designations (with accumulation conveyor 436 being conveyor "A" and each successive upstream transport conveyor 438 being designated with a succeeding letter). The arrangement of the photoeyes for transport conveyor 438*c* would generally be the same as that shown for transport conveyors 438*a* and 438*b*.

As has been described above, the various embodiments of the present invention may utilize any number of transport conveyors 438 positioned upstream of accumulation conveyor 436 and controlled in accordance with the logic of FIG. 15 or 16, or variations thereof. Thus, in one embodiment, for example, accumulation system 418 may include only accumulation conveyor 436, transport conveyor 438*a*, and controller 442. In such an embodiment, only ladder diagram 458 would be used (or a variant thereof). The conveyor upstream of transport conveyor 438*a* (i.e. conveyor 438*b*) could be controlled in any suitable manner. Indeed, the immediately adjacent conveyor upstream of accumulation system 418, no matter what the specific makeup of system 418, can be controlled in any suitable manner.

Thus, for example, if conveyor "B" were controlled by diagram 458 and conveyor "C" were controlled by diagram 460, conveyor "D" could be controlled in any suitable manner. Such a suitable manner might include control algorithms that work in tandem with conveyor "D" such that conveyor "D" can commence article accumulation at the appropriate times. In still other embodiments, additional transport conveyors 438 upstream of conveyors "B" and "C" could be controlled by logic comparable to that of FIG. 15 or 16.

Figure 18L:
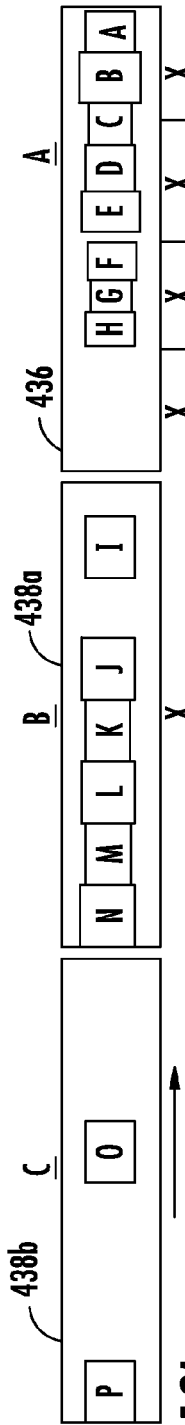
Figure 18M:
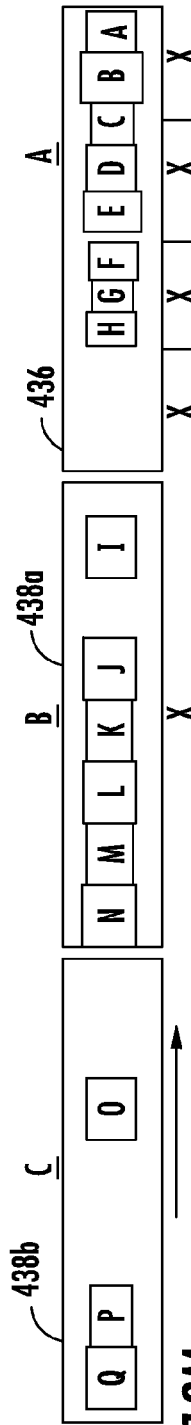
Figure 18N:
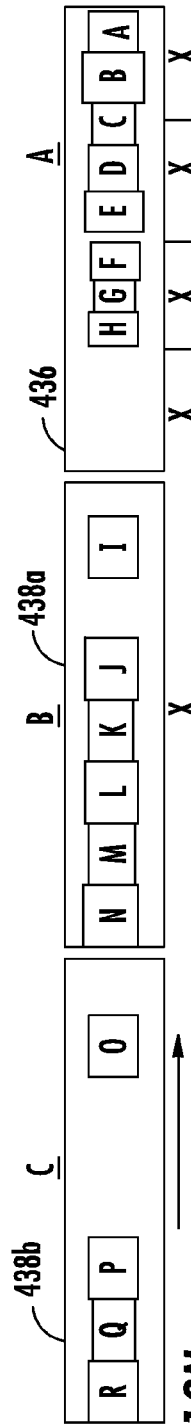
Figure 18O:
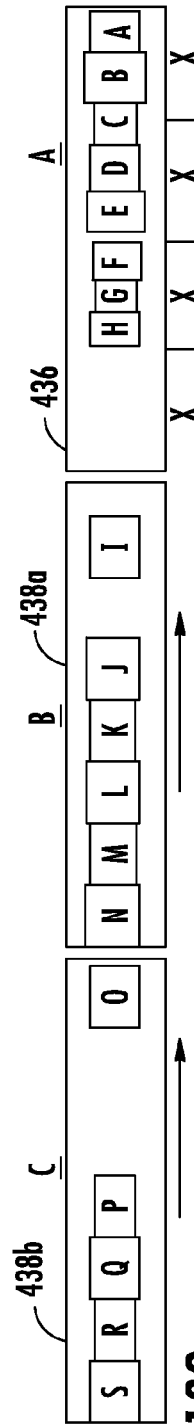
Figure 18P:
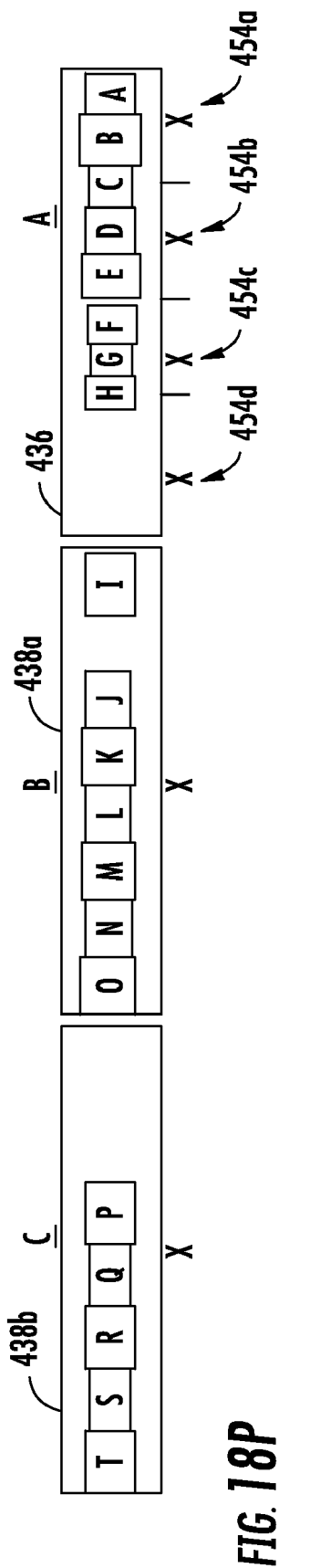

An arbitrary example illustrating the general effects of controlling conveyors B and C of FIG. 17 in accordance with the logic of FIGS. 15 and 16 is illustrated in FIGS. 18A-18P. FIGS. 18A-18P sequentially illustrate the movement of various articles A-S on conveyors "A," "B" and "C," which are short-hand labels for accumulation conveyor 436 and transport conveyors 438*a* and *b*, respectively. For purposes of clarity, the various photoeyes depicted in FIG. 17 have been removed from FIGS. 18A-18P, but it will be understood that these photoeyes would be present in the locations indicated in FIG. 17. FIG. 18A illustrates a first moment in time, and FIG. 18P illustrates the accumulation of the movements shown in FIGS. 18A-18O. A general description of the movement of the articles will now be described.

FIG. 18A illustrates accumulation conveyor 436 having accumulated articles to the 50% full level. Conveyor "A" is advancing article F forward from zone 454*d* to zone 454*c*, although other algorithms for controlling the zones of conveyor "A" may be used that may not activate zone 454*d* in the situation illustrated. In accordance with ladder logic diagram 458, the accumulation of articles on accumulation conveyor 436 to a 50% full level causes the A__50% BLK "not" contact to assume a false state, thereby leaving it to one of rungs 462*b-d*, if any, to cause conveyor "B" to operate (for purposes of describing FIGS. 18A-18P, it will be assumed that no slug command is issued, thereby leaving the slug contacts of rungs 462*b* and 468*b* in a false state.) However, conveyor "B" in FIG. 18A is stopped (indicated by the "X") because none of rungs 462*b-d* have overall true states. This can be seen by examining photoeye C_PE, which is not detecting any articles at the downstream end of conveyor "C" (and there is no slug command). Because the C_PE contact is common to both rungs 462c and c, the false state of this contact prevents conveyor "B" from operating. Conveyor "C," in FIG. 18A, however, is operating because, at a minimum, the B_50% photoeye on conveyor "B" is not blocked (article H in FIG. 18A may temporarily be blocking photoeye B 50%, but the timer associated with the B_50% photoeye is increased while conveyor "B" is stopped such that the blocked B_50% photoeye does not register as an indication that articles have accumulated to the 50% level on conveyor "B").

In FIG. 18B, all of the zones 454a-d of conveyor "A" have stopped. Conveyor "B" is operating because an article (article J) has been detected at the downstream end of conveyor "C" and conveyor "A" has not accumulated articles to the 100% full level (thus making both contacts on rung 462c true). Conveyor "C" is also running for the same reasons discussed above with respect to FIG. 18A; namely, articles haven't yet accumulated to the 50% level on conveyor "B," thus making rung 468a true.

In FIG. 18C, all the zones of conveyor "A" have stopped, along with conveyor "B." Conveyor "B" has stopped because no articles are detected at the downstream end of conveyor "C" (thus causing "not" contact C_PE to be false, which prevents either rung 462c or 462d from being true), and articles have accumulated at least to the 50% level on conveyor "A" (thus causing rung 462a to be false). Conveyor "C" in FIG. 18C is moving because, at a minimum, articles haven't yet accumulated to the 50% level on conveyor "B," thus making rung 468a true.

In FIG. 18D, all of the zones 454a-d of accumulation conveyor "A" remain stopped. Conveyor "B" is operating because an article (article K) is detected at the downstream end of conveyor "C" and conveyor "A" is not 100% filled (thus giving the entire rung 462c a true state). Conveyor "C" in FIG. 18C is moving because, at a minimum, articles haven't yet accumulated to the 50% level on conveyor "B," thus making rung 468a true.

In FIG. 18E, all of the zones 454a-d of accumulation conveyor "A" remain stopped. Conveyor "B" has stopped because no articles are detected at the downstream end of conveyor "C" (thus causing "not" contact C_PE to be false, which prevents either rung 462c or 462d from being true), and articles have accumulated at least to the 50% level on conveyor "A" (thus causing rung 462a to be false). Conveyor "C" is moving because, at a minimum, articles haven't yet accumulated to the 50% level on conveyor "B," thus making rung 468a true.

In FIG. 18F, zone 454d of accumulation conveyor "A" is moving in order to accept article G from conveyor "B," while all the other zones 454a-c remain stopped. Conveyor "B" is operating because an article (article L) is detected at the downstream end of conveyor "C" and conveyor "A" is not 100% filled (thus giving the entire rung 462c a true state). Conveyor "C" is moving because, at a minimum, articles haven't yet accumulated to the 50% level on conveyor "B, thus making rung 468a true.

In FIG. 18G, zone 454d is moving in order to transfer article G to zone 454c. All of the remaining zones 454a-c of accumulation conveyor "A" remain stopped. Conveyor "B" has stopped because no articles are detected at the downstream end of conveyor "C" (thus causing "not" contact C_PE to be false, which prevents either rung 462c or 462d from being true), and articles have accumulated at least to the 50% level on conveyor "A" (thus causing rung 462a to be false). Conveyor "C" is moving because, at a minimum, articles haven't yet accumulated to the 50% level on conveyor "B," thus mating rung 468a true.

In FIG. 18H, all of the zones 454a-d of accumulation conveyor "A" remain stopped. Conveyor "B" is operating because an article (article M) is detected at the downstream end of conveyor "C" and conveyor "A" is not 100% filled (thus giving the entire rung 462c a true state). Conveyor "C" is moving because, at a minimum, articles haven't yet accumulated to the 50% level on conveyor "B," thus making rung 468a true.

In FIG. 18I, all of the zones 454a-d of accumulation conveyor "A" remain stopped. Conveyor "B" has stopped because no articles are detected at the downstream end of conveyor "C" (thus causing "not" contact C_PE to be false, which prevents either rung 462c or 462d from being true), and articles have accumulated at least to the 50% level on conveyor "A" (thus causing rung 462a to be false). Conveyor "C" is moving because, at a minimum, articles haven't yet accumulated to the 50% level on conveyor "B," thus making rung 468a true.

In FIG. 18J, zone 454d of accumulation conveyor "A" is moving in order to accept article H from conveyor "B," while all the other zones 454a-c remain stopped. Conveyor "B" is operating because an article (article N) is detected at the downstream end of conveyor "C" and conveyor "A" is not 100% filled (thus giving the entire rung 462c a true state). Conveyor "C" is moving because, at a minimum, articles haven't yet accumulated to the 50% level on conveyor "B," thus making rung 468a true.

In FIG. 18K, zone 454d is moving in order to transfer article H to zone 454c. All of the remaining zones 454a-c of accumulation conveyor "A" remain stopped. Conveyor "B" has stopped because no articles are detected at the downstream end of conveyor "C" (thus causing "not" contact C_PE to be false, which prevents either rung 462c or 462d from being true), and articles have accumulated at least to the 50% level on conveyor "A" (thus causing rung 462a to be false). Conveyor "C" has switched to the accumulation mode because conveyor "B" has been filled to 50% (article J in FIG. 18K occupies the 50% region of conveyor "B"). Conveyor "C" is moving because, although articles on conveyor "B" have accumulated to the 50% level, an article (article P of FIG. 18L) is deemed to be waiting at the downstream end of the conveyor immediately upstream of conveyor "C." In other words, FIG. 18K illustrates the situation where it is assumed an article on what would be conveyor "D" is blocking the D_PE photoeye (FIG. 17) and the B_100% BLK photoeye is not blocked (the timer would override any temporary blocking by article I), thus making, at a minimum, rung 468c of diagram 460 true.

In FIG. 18L, all of the zones 454a-d of accumulation conveyor "A" remain stopped. Conveyor "B" has stopped because no articles are detected at the downstream end of conveyor "C" (thus causing "not" contact C_PE to be false, which prevents either rung 462c or 462d from being true), and articles have accumulated at least to the 50% level on conveyor "A" (thus causing rung 462a to be false). Conveyor "C" is moving because, although articles on conveyor "B" have accumulated to the 50% level (article J in FIG. 18K occupies the 50% region of conveyor "B"), an article (article Q of FIG. 18M) is deemed to be waiting at the downstream end of the conveyor immediately upstream of conveyor "C." In other words, FIG. 18L illustrates the situation where it is assumed an article on what would be conveyor "D" is blocking the D_PE photoeye and the B_100% BLK photoeye is not blocked (the timer would override any temporary blocking by article I), thus making, at a minimum, rung 468*c* of diagram 460 true.

In FIG. 18M, all of the zones 454*a-d* of accumulation conveyor "A" remain stopped. Conveyor "B" has stopped because no articles are detected at the downstream end of conveyor "C" (thus causing "not" contact C_PE to be false, which prevents either rung 462*c* or 462*d* from being true), and articles have accumulated at least to the 50% level on conveyor "A" (thus causing rung 462*a* to be false). Conveyor "C" is moving because an article (article R of FIG. 18N) is deemed to be waiting at the downstream end of the conveyor immediately upstream of conveyor "C," thus making, in combination with the B_100% BLK photoeye not being blocked (the timer would override any temporary blocking by article I), rung 468*c* of diagram 460 true.

In FIG. 18N, all of the zones 454*a-d* of accumulation conveyor "A" remain stopped. Conveyor "B" has stopped because no articles are detected at the downstream end of conveyor "C" (thus causing "not" contact C_PE to be false, which prevents either rung 462*c* or 462*d* from being true), and articles have accumulated at least to the 50% level on conveyor "A" (thus causing rung 462*a* to be false). Conveyor "C" is moving because an article (article S of FIG. 18O) is deemed to be waiting at the downstream end of the conveyor immediately upstream of conveyor "C," thus making, in combination with the B_100% BLK photoeye not being blocked (the timer would override any temporary blocking by article I), rung 468*c* of diagram 460 true.

In FIG. 18O, all of the zones 454*a-d* of accumulation conveyor "A" remain stopped. Conveyor "B" is operating because an article (article O) is detected at the downstream end of conveyor "C" and conveyor "A" is not 100% filled (thus giving the entire rung 462*c* a true state). Conveyor "C" is moving because an article (article T of FIG. 18P) is deemed to be waiting at the downstream end of the conveyor immediately upstream of conveyor "C," thus making, in combination with the B_100% BLK photoeye not being blocked (the timer would override any temporary blocking by article I), rung 468*c* of diagram 460 true.

In FIG. 18P, all of the zones 454*a-d* of accumulation conveyor "A" remain stopped. Conveyor "B" is stopped because no article is detected at the downstream end of conveyor "C." Conveyor "C" is stopped because it is assumed that there are no articles immediately upstream of conveyor "C," i.e. at the downstream end of conveyor "D," thus causing the D_PE contact of rung 468*c* to be false.

As articles continued to accumulate on conveyor "C," they would eventually reach the downstream end of conveyor "C," thereby causing conveyor "B" to advance forward and accept as many of the articles as it could (article I would move on to accumulation conveyor 436). Thus, as can be seen, the algorithms of ladder diagrams 458 and 460 allow for close packing of articles on transport conveyors 438*a* and *b*.

While the physical construction of transport conveyors 438*a* and *b* can take on any form, transport conveyor 438*a* and *b* may be relatively long belt conveyors, such as conveyors from approximately 20 feet long up to 200 feet or more. The ladder logic of FIGS. 15 and/or 16 is especially useful for accumulating articles on relatively long belts that are primarily used for transporting articles. Such belt conveyors include only a single endless belt that spans the entire length of the transport conveyor bed's length. Because such conveyors include only a single belt, the movement of the belt cannot be used to adjust inter-package spacing of two or more articles that are both simultaneously resting on the belt surface (and under the control of the belt), unlike a roller conveyor bed where individual (or groups of) rollers may be moved at different speeds from other rollers within the same conveyor bed. The reason why such belt conveyors cannot adjust the article spacing between articles already on the belt conveyor is because all of the articles rest on the same belt of the conveyor bed and any changes to the speed of the belt will change the speed of each article uniformly, thus preserving the inter-article spacing on that particular belt conveyor. The ladder logic of FIGS. 15 and/or 16 helps reduce the often-present gaps between articles that exist at the moment a relatively long transport belt is switched into an accumulation mode. The algorithms of FIGS. 15 and/or 16, of course, can also be applied to conveyor beds of shorter length and/or of non-belted construction, such as these having multiple, independently-controllable zones within individual conveyor beds.

Further, while the ladder diagrams 458 and 460 have been described above with respect to photoeyes that measure 50% and 100% fullness levels, it will be understood that these threshold levels can be varied significantly. These threshold levels might vary from about 40% and 60% for ladder rungs 462*a* and 468*a*, although wider variations can be used, including using threshold thresholds on the different transport conveyors 438 within a given accumulation system 418. The 100% blocked contacts of rungs 462*c* and 468*c* could be replaced with contacts initializing different thresholds, such as about 90% to 100%, although variations outside this can be used. Further, additional contacts can be inserted into any of the rungs 462*a-d* and/or 468*a-d*, as desired, in order to modify or enhance the functionality of the conveyor control. Additional rungs 462 and/or 468 may also be added.

In at least one embodiment, additional control logic can be added to ensure that when a transport conveyor is operating to accept an upstream article, the upstream conveyor carrying that article is also operating. For example, in the situation illustrated in FIG. 18O, conveyor "C" could be commanded to run in order to transfer article O onto conveyor "B," regardless of whether the D_PE photoeye is detecting an article (which it is assumed to be doing in FIG. 18O). Other modifications are also possible.

Figure 19:
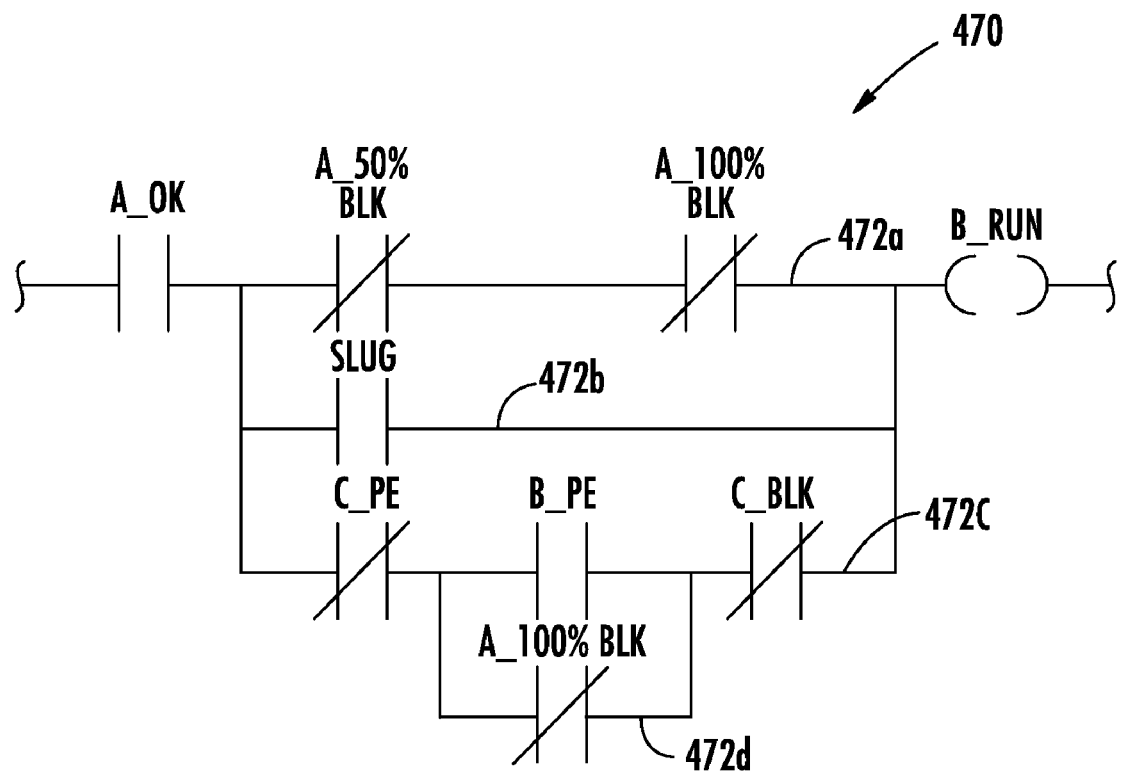
FIG. 19 is an alternative ladder logic diagram that may be followed in lieu of the diagrams of FIG. 15 and/or FIG. 16.

FIG. 19 illustrates a specific example of an alternative ladder logic diagram 470 that may be used by one or more transport conveyors 438 in lieu of the ladder logic of FIGS. 15 and 16. Ladder diagram 470 includes four rungs 472*a-d* that determine whether the input A_OK will be applied to the output B_RUN. The input A_OK and output B_RUN refer to the same inputs and outputs discussed above with respect to diagrams 458 and 460. Rung 472*a* includes two contacts: one labeled A_50% BLK and one labeled A_100% BLK. These are the same contacts that were discussed above with respect to diagrams 458 and 460 and need not be described further herein. Suffice it to say, rung 472*a* only assumes an overall true state if neither of photoeyes A_100% or A_50% are detecting article accumulation. Stated conversely, rung 472*a* will switch to an overall false state if either of photoeyes A_100% or A_50% detect article accumulation (as opposed to transitory article passage).

Rung 472*b* is the same as rungs 462*b* and 468*b* of diagrams 458 and 460 discussed above and therefore need not be discussed further. Rung 472*c* includes three contacts: a C_PE "not" contact, a B_PE contact, and a C_BLK "not" contact. The first two, the C_PE "not" and the B_PE contact, refer to the same contacts discussed above with respect to diagrams 458 and 460, and need not be explained further. The C_BLK "not" contact has a logic state dictated by the C_PE photoeye and an associated timer. The timer operates such that only if the C_PE photoeye is blocked for a threshold minimum amount of time will the C_BLK contact become false.

Rung 472d is tied to the A_100% BLK photoeye discussed above, and therefore need not be discussed in detail further. Ladder diagram 470 can be duplicated for additional transport conveyors upstream of conveyor "B" by advancing all of the letter designations in the various contacts forward by one letter for each respective transport conveyor 438 that is upstream of conveyor "B." The advanced letter designations would correspond to the photoeyes that were shifted upstream one conveyor from those utilized in diagram 470. As many transport conveyors 438 as desired could be controlled by the general logic of diagram 470.

While the present invention has been described in terms of the embodiments discussed in the above specification, it will be understood by one skilled in the art that the present invention is not limited to these particular embodiments, but includes any and all such modifications that are within the spirit and scope of the invention as defined more particularly within the following claims.

What is claimed is:

1. A conveyor system comprising:
a merge subsystem adapted to merge articles from a plurality of feed conveyors onto a merge conveyor;
a sortation conveyor downstream of said merge subsystem, said sortation conveyor adapted to transport articles that have passed through said merge subsystem to selected ones of a plurality of takeaway conveyors;
a sensor adapted to detect a usage level of said merge subsystem; and
a controller adapted to adjust a speed of said sortation conveyor based upon a value of the usage level of said merge subsystem, wherein said controller repetitively determines the value of the usage level of said merge subsystem and calculates an average of said value over a time period, said controller adapted to adjust the speed of said sortation conveyor based upon said average.

2. The system of claim 1 wherein said controller adjusts said speed of said sortation conveyor between a minimum speed and a maximum speed, said minimum and maximum speeds both being adjustable by a user of said conveyor system.

3. The system of claim 1 wherein the value of the usage level is based at least partially upon a degree to which articles have accumulated in an area upstream of the feed conveyors.

4. The system of claim 1 wherein said controller increases the speed of said merge subsystem when the speed of the sortation conveyor is increased, and said controller decreases the speed of said merge subsystem when the speed of the sortation conveyor is decreased.

5. A conveyor system comprising:
a merge subsystem adapted to merge articles from a plurality of feed conveyors onto a merge conveyor;
a sortation conveyor downstream of said merge subsystem, said sortation conveyor adapted to transport articles that have passed through said merge subsystem to selected ones of a plurality of takeaway conveyors;
a sensor adapted to detect a usage level of said merge subsystem; and
a controller adapted to adjust a speed of said sortation conveyor based upon a value of the usage level of said merge subsystem, wherein said controller repetitively determines the value of the usage level of said merge subsystem and calculates a first average of said value over a first time period and a second average of said value over a second time period, said first and second time periods partially overlapping each other, and said controller adjusts the speed of said sortation conveyor based upon whichever one of said first and second averages is greater.

6. A conveyor system comprising:
a merge subsystem adapted to merge articles from a plurality of feed conveyors onto a merge conveyor;
a sortation conveyor downstream of said merge subsystem, said sortation conveyor adapted to transport articles that have passed through said merge subsystem to selected ones of a plurality of takeaway conveyors;
a sensor adapted to detect a usage level of said merge subsystem; and
a controller adapted to adjust a speed of said sortation conveyor based upon a value of the usage level of said merge subsystem, wherein the value of the usage level is based at least partially on calculations of whether slugs of articles on said feed conveyors can be transported onto said merge conveyor such that leading articles of said slugs can be positioned on said merge conveyor within a desired distance from an adjacent downstream article on said merge conveyor.

7. In a conveyor system having merge subsystem adapted to merge articles from a plurality of feed conveyors onto a merge conveyor, and a sortation conveyor downstream of the merge subsystem wherein the sortation conveyor is adapted to transport articles that have passed through the merge subsystem to selected ones of a plurality of takeaway conveyors, a method of controlling the sortation conveyor comprising:
repetitively determining a value of a usage level of the merge subsystem using a plurality of sensors;
calculating an average of said repetitive determinations of said value; and
adjusting a speed of the sortation conveyor based upon said average.

8. The method of claim 7 wherein determining the value of the usage level includes determining a degree of accumulation of articles in an area upstream of each of said feed conveyors.

9. The method of claim 7 further including reducing a speed of the merge subsystem when the speed of the sortation conveyor is decreased and increasing the speed of the merge subsystem when the speed of the sortation conveyor is increased.

10. In a conveyor system having a merge subsystem adapted to merge articles from a plurality of feed conveyors onto a merge conveyor, and a sortation conveyor downstream of the merge subsystem wherein the sortation conveyor is adapted to transport articles that have passed through the merge subsystem to selected ones of a plurality of takeaway conveyors, a method of controlling the sortation conveyor comprising:
repetitively determining a value of a usage level of the merge subsystem using a plurality of sensors;
calculating a first average of said repetitive determination of said value over a first time period;
calculating a second average of said repetitive determinations of said value over a second time period wherein said first and second time periods partially overlap each other; and adjusting a speed of the sortation conveyor based upon the greater of the first and second averages.

11. In a conveyor system having a merge subsystem adapted to merge articles from a plurality of feed conveyors onto a merge conveyor, and a sortation conveyor downstream of the merge subsystem wherein the sortation conveyor is adapted to transport articles that have passed through the merge subsystem to selected ones of a plurality of takeaway conveyors, a method of controlling the sortation conveyor comprising:

determining a value of a usage level of the merge subsystem using a plurality of sensors, said determining of the value of the usage level including determining whether a slug of articles on a particular feed conveyor can be transported onto the merge conveyor such that a leading article of said slug can be positioned on the merge conveyor within a desired distance from an adjacent downstream article on the merge conveyor; and adjusting a speed of the sortation conveyor based upon a value of the usage level of the merge subsystem.

12. A method of merging articles from a plurality of feed conveyors onto a merge conveyor comprising:

accumulating articles on said plurality of said feed conveyors;

releasing a first slug of articles from a selected one of said feed conveyors onto said merge conveyor, said first slug of articles including a leading article and a trailing article;

determining a set of feed conveyors, that include another slug of articles able to be delivered to said merge conveyor such that a leading article in said another slug is able to be positioned on said merge conveyor at a specified distance behind the trailing article of said first slug;

releasing, from one of said feed conveyors in said set, said another slug of articles onto said merge conveyor such that a leading article in said another slug of articles is positioned on said merge conveyor at a specified distance behind the trailing article of said first slug; and transporting said first slug and said another slug to a sortation conveyor adapted to sort the articles.

13. The method of claim 12 further including adjusting a speed of the feed conveyors such that gaps between articles within the slugs are adjusted toward a non-zero target length while the slugs are on the feed conveyors wherein the non-zero target length is based on a length of an article adjacent to a particular gap.

14. The method of claim 12 wherein releasing the another slug of articles onto the merge conveyor includes accelerating the one of said feed conveyors in said set toward a threshold speed while controlling the one of said feed conveyors in said set in an open loop manner, and, after reaching the threshold speed, controlling the one of said feed conveyors in said set in a closed loop manner with respect to a target position on the merge conveyor for a particular article in the another slug whereby an estimated position for said particular article is adjusted toward said target position.

15. The method of claim 12 further including determining an actual location on the merge conveyor of a particular article within the another slug, comparing said actual location to a target location and using said comparison to adjust the speed of the one of said feed conveyors in said set during at least one subsequent release of slugs onto the merge conveyor by said one of said fee conveyors in said set.

16. A conveyor system comprising:

a plurality of feed conveyors, each said feed conveyor having an upstream end and a downstream end, and each said feed conveyor adapted to transport articles from said upstream end to said downstream end;

a merge conveyor positioned within a vicinity of said downstream ends of said plurality of feed conveyors such that articles exiting said feed conveyors are delivered to said merge conveyor;

a plurality of sensors adapted to determine locations of articles on said feed conveyors and on said merge conveyor;

a sortation conveyor downstream of the merge conveyor, said sortation conveyor adapted to sort the articles; and a controller adapted to control said feed conveyors such that slugs of articles tend to accumulate on said feed conveyors, said controller also adapted to use said plurality of sensors to determine a set of feed conveyors having a slug that is able to be positioned on said merge conveyor at a specified distance behind a particular article on said merge conveyor, and said controller further adapted to select from said set of feed conveyors a particular conveyor to release its slug based upon a priority level assigned to each of said feed conveyors in said set.

17. The system of claim 16 wherein said priority level is based upon at least two of the following criteria:

(1) a degree of article accumulation upstream of each feed conveyor in said set;

(2) a number of articles in a wave of articles remaining to be delivered by each feed conveyor in said set to said merge conveyor;

(3) a size of the slug in each feed conveyor in said set; and (4) an amount of time a slug has remained on each feed conveyor in said set.

18. The subsystem of claim 17 wherein said controller is further adapted to release the slugs from said feed conveyors by accelerating the feed conveyors toward a threshold speed in an open loop manner, and, after reaching said threshold speed, controlling said feed conveyors in a closed loop manner with respect to a target position on the merge conveyor for a particular article in the slug whereby said controller adjusts an estimated position for said particular article toward said target position.

19. A method of merging articles from a plurality of feed conveyors onto a merge conveyor comprising:

accumulating slugs of articles on said plurality of said feed conveyors;

releasing a slug of articles from a selected one of said feed conveyors onto said merge conveyor, said slug of articles including a leading article and a trailing article;

controlling a speed of the selected one of said feed conveyors during the release of the slug of articles in order to position said leading article on said merge conveyor at a target location on said merge conveyor;

determining an actual location of the leading article on the merge conveyor;

comparing said actual location to said target location and using the comparison to adjust an aspect of a subsequent release of the selected one of said feed conveyors; and transporting said slug of articles to a sortation conveyor positioned downstream of said merge conveyor, said sortation conveyor adapted to sort the articles.

20. The method of claim 19 further including, after said leading article in said slug has reached said merge conveyor, adjusting a speed of the selected one of said feed conveyors such that the trailing article in the slug tends to be positioned on said merge conveyor at a trailing target location on the merge conveyor.

21. The method of claim 19 wherein said aspect of a subsequent release is one of a speed of the selected one of said feed conveyors and a time at which said selected one of said feed conveyors is accelerated.

22. The method of claim 19 wherein releasing the slug of articles from the selected one of said feed conveyors includes accelerating the selected one of said feed conveyors toward a threshold speed while controlling said selected one of said feed conveyors in an open loop manner, and, after reaching said threshold speed, controlling said selected one of said feed conveyors in a closed loop manner with respect to a leading target position on said merge conveyor for a particular article in the slug whereby an estimated position for said particular article is adjusted toward said leading target position.

23. The method of claim 22 wherein controlling said selected one of said feed conveyors in a closed loop manner further includes, after a leading article in said slug has moved onto said merge conveyor, controlling said selected one of said feed conveyors in a closed loop manner with respect to a trailing target position on said merge conveyor whereby an estimated position for a trailing article within said slug is adjusted toward said trailing target position.

24. A method of merging a slug of articles from a feed conveyor onto a merge conveyor wherein said slug includes a leading article and a trailing article, said method comprising:
    determining a leading target position for said leading article on said merge conveyor;
    controlling said feed conveyor such that said leading article moves toward said merge conveyor;
    determining an estimated position for said leading article on said merge conveyor;
    comparing said leading target position to said estimated position;
    adjusting the speed of said feed conveyor in a manner in which any differences between said estimated position and said leading target position are reduced; and
    transporting the slug of articles to a sortation conveyor downstream of said merge conveyor, said sortation conveyor adapted to sort the articles.

25. The method of claim 24 further including determining a trailing target position for the trailing article in said slug;
    determining when said leading article has exited said feed conveyor and, after said leading article has exited said feed conveyor, determining an estimated position for said trailing article on said merge conveyor, comparing said estimated position for said trailing article to said trailing target position, and adjusting the speed of said feed conveyor in a manner in which any differences between said estimated position for said trailing article and said trailing target position are reduced.

26. A conveyor system comprising:
    an accumulation conveyor;
    a transport conveyor upstream of said accumulation conveyor;
    a second transport conveyor upstream of said transport conveyor;
    a merge subsystem downstream of said accumulation and transport conveyors, said merge subsystem merging a plurality of feed conveyors into a merge conveyor;
    a sortation conveyor downstream of said merge subsystem; and
    a controller adapted to accumulate articles on said accumulation conveyor until articles have accumulated to a first threshold level on said accumulation conveyor, said first threshold level being less than an entirety of said accumulation conveyor, said controller further adapted to commence accumulating articles on said transport conveyor after articles have accumulated to said first threshold level on said accumulation conveyor;
    wherein said controller is further adapted to commence accumulation of articles on said second transport conveyor when articles have accumulated to a second threshold level on said transport conveyor, said second threshold level being less than an entirety of said transport conveyor; and
    wherein said controller is further adapted to transport a downstream article at a downstream end of said transport conveyor to said accumulation conveyor if the accumulation conveyor has not yet accumulated articles to a higher threshold level, said higher threshold level being higher than said first threshold level.

27. The system of claim 26 wherein said controller stops accumulating articles on said transport conveyor when both: (1) articles have accumulated to said higher threshold level on said transport conveyor, and (2) an article is detected at the downstream end of said transport conveyor.

28. The system of claim 26 wherein said second transport conveyor has a conveying surface defined by an endless belt, and each of said transport and second transport conveyors have a length of at least fifty feet.

29. The system of claim 26 wherein said accumulation conveyor is a rollered accumulation conveyor having a plurality of rollers that define a conveying surface wherein said rollered accumulation conveyor includes a plurality of conveying zones that may be operated at different speeds from each other.

* * * * *

UNITED STATES PATENT AND TRADEMARK OFFICE
CERTIFICATE OF CORRECTION

PATENT NO. : 7,909,155 B2  
APPLICATION NO. : 12/206011  
DATED : March 22, 2011  
INVENTOR(S) : Lupton et al.

Page 1 of 1

It is certified that error appears in the above-identified patent and that said Letters Patent is hereby corrected as shown below:

Column 29
Line 44, "tale" should be --take--

Column 33
Line 53, "FIG." should be --FIGS.--

Column 40
Line 35, "lung" should be --rung--

Column 44
Line 18, "FIG." should be --FIGS.--;
Line 37, "FIG." should be --FIGS.--;
Line 42, ""B"" should be --B,--

Column 45
Line 7, "B 50%" should be --B_50%--

Column 46
Line 3, "mating" should be --making--

Column 50
Line 23, Claim 7, insert --a-- before "merge"

Signed and Sealed this
Seventh Day of June, 2011

David J. Kappos
*Director of the United States Patent and Trademark Office*